US009734465B2

(12) United States Patent
Phillips et al.

(10) Patent No.: US 9,734,465 B2
(45) Date of Patent: Aug. 15, 2017

(54) DISTRIBUTED WORKFLOW-ENABLED SYSTEM

(75) Inventors: Daja Phillips, Palo Alto, CA (US); Max E. McFarland, Sunnyvale, CA (US); Andrea Mariotti, San Carlos, CA (US); Haixia Yu, Santa Clara, CA (US); Michael G. E. Griffin, Redwood City, CA (US); Bradley J. Rhodes, Alameda, CA (US); Sergey Chemishkian, Cupertino, CA (US); Edward L Schwartz, Sunnyvale, CA (US); Patty Case, Saratoga, CA (US); Stephen R. Savitzky, San Jose, CA (US)

(73) Assignee: Ricoh Co., Ltd, Tokyo (JP)

( * ) Notice: Subject to any disclaimer, the term of this patent is extended or adjusted under 35 U.S.C. 154(b) by 533 days.

(21) Appl. No.: 12/135,706

(22) Filed: Jun. 9, 2008

(65) Prior Publication Data

US 2009/0077164 A1 Mar. 19, 2009

Related U.S. Application Data

(60) Provisional application No. 60/972,562, filed on Sep. 14, 2007.

(51) Int. Cl.
*G06F 15/16* (2006.01)
*G06Q 30/00* (2012.01)
*G06Q 10/06* (2012.01)

(52) U.S. Cl.
CPC .................................... *G06Q 10/06* (2013.01)

(58) Field of Classification Search
CPC . G06Q 30/0269; G06Q 10/06; H04N 21/2668
(Continued)

(56) References Cited

U.S. PATENT DOCUMENTS 6,583,888 B1 6/2003 Salgado et al.
6,647,432 B1 11/2003 Ahmed et al.
(Continued)

FOREIGN PATENT DOCUMENTS

WO WO0130766 5/2001

OTHER PUBLICATIONS

United States Notice of Allowance, U.S. Appl. No. 12/135,725, dated Feb. 13, 2012.
(Continued)

*Primary Examiner* — Phuoc Nguyen
*Assistant Examiner* — Kishin G Belani
(74) *Attorney, Agent, or Firm* — Patent Law Works LLP

(57) ABSTRACT

A distributed workflow-enabled system includes: a workflow-enabled provider and a workflow-enabled client communicatively coupled by a network. The workflow-enabled provider and the workflow-enabled client include a workflow unit. The workflow unit allows the workflow-enabled provider and the workflow-enabled client to communicate, distribute processes and present a user interfaces by providing a communication manager, a process control module and a user interface module. The present invention also includes a number of novel methods including a method for communication, a method for processing by a process control module, a method for creating and presenting the user interface and a method for retrieving processes executable by the process control module.

30 Claims, 43 Drawing Sheets

(58) Field of Classification Search
USPC .................................................. 709/202, 203
See application file for complete search history.

(56) References Cited

U.S. PATENT DOCUMENTS

| | | | | |
|---|---|---|---|---|
| 6,687,018 | B1 | 2/2004 | Leong | |
| 7,574,498 | B2 | 8/2009 | Fukao et al. | |
| 8,234,387 | B2 * | 7/2012 | Bradley ............. | G06Q 20/1235 709/223 |
| 2002/0109858 | A1 | 8/2002 | Bruce | |
| 2002/0109861 | A1 | 8/2002 | LeClair et al. | |
| 2002/0127020 | A1 | 9/2002 | Childers | |
| 2002/0138543 | A1 * | 9/2002 | Teng et al. ..................... | 709/102 |
| 2003/0078965 | A1 * | 4/2003 | Cocotis et al. ............... | 709/203 |
| 2004/0064568 | A1 | 4/2004 | Arora et al. | |
| 2004/0073684 | A1 | 4/2004 | Jodra et al. | |
| 2004/0088348 | A1 * | 5/2004 | Yeager et al. ................ | 709/202 |
| 2005/0055583 | A1 | 3/2005 | Tanaka et al. | |
| 2005/0071209 | A1 * | 3/2005 | Tatavu et al. ..................... | 705/7 |
| 2005/0071444 | A1 | 3/2005 | Motoyama | |
| 2005/0154741 | A1 | 7/2005 | Hebert et al. | |
| 2005/0286075 | A1 | 12/2005 | Ryu et al. | |
| 2006/0072144 | A1 | 4/2006 | Dowling et al. | |
| 2006/0288110 | A1 * | 12/2006 | Alden et al. .................. | 709/228 |
| 2007/0013943 | A1 | 1/2007 | Sawayanagi et al. | |
| 2007/0038946 | A1 * | 2/2007 | Grieshaber et al. .......... | 715/762 |
| 2008/0059295 | A1 * | 3/2008 | Schauser et al. ............... | 705/14 |
| 2009/0009802 | A1 | 1/2009 | Shaw | |
| 2009/0043632 | A1 | 2/2009 | Ricketts | |
| 2010/0217746 | A1 | 8/2010 | Kumhyr et al. | |

OTHER PUBLICATIONS

U.S. Office Action, U.S. Appl. No. 12/135,735, Mar. 22, 2011, 22 pages.

Jini Architectural Overview, Internet Citation, Jan. 1999 (Jan. 1999), XP002217546, Retrieved from the Internet: URL:http://www.sun.com/software/jini/white papers/architecture.pdf [retrieved on Jan. 1, 1999].

The Jini Print Service API. Draft Standard Version 1.0, Internet Citation, May 23, 2000 (May 23, 2000), XP007912924, Retrieved from the Internet: URL:http://www.jini.org/files/specs/print-api/overview-summary.htm, [retrieved on May 4, 2010].

Kumar et al., Aladdin—The Jini Service Browser, Proceedings of the National Conference on Communications Proceedings NCC, XX, XX Jan. 29, 2000 (Jan. 29, 2000), pp. 100-108, XP007912926.

Extended European Search Report, Application No. 08163946.0-1243/2040165, Jun. 7, 2010, 6 pages.

US Office Action, U.S. Appl. No. 12/135,715, Mar. 17, 2010, 25 pages.

US Office Action, U.S. Appl. No. 12/135,715, Sep. 1, 2010, 24 pages.

US Office Action, U.S. Appl. No. 12/135,725, Jun. 14, 2010, 16 pages.

US Office Action, U.S. Appl. No. 12/135,735, Apr. 16, 2010, 19 pages.

US Office Action, U.S. Appl. No. 12/135,735, Oct. 1, 2010, 22 pages.

United States Office Action, U.S. Appl. No. 12/135,735, Aug. 25, 2011.

Office Action for U.S. Appl. No. 12/135,735, dated May 9, 2013, 23 pages.

Non-Final Office Action for U.S. Appl. No. 12/135,715 dated Jul. 18, 2013, 12 pages.

Final Office Action for U.S. Appl. No. 12/135,726 dated Nov. 27, 2013.

Notice of Allowance for U.S. Appl. No. 12/135,715 dated Dec. 6, 2013, 12 pages.

Notice of Allowance for U.S. Appl. No. 12/135,735, dated May 9, 2014, 7 pages.

* cited by examiner

1600

DISTRIBUTED WORKFLOW-ENABLED SYSTEM

CROSS REFERENCE TO RELATED APPLICATIONS

This application claims priority under 35 U.S.C. §119(e) from U.S. Provisional Patent Application No. 60/972,562, titled "Distributed Workflow Enabled System," filed Sep. 14, 2007, which is incorporated by reference herein in its entirety.

BACKGROUND OF THE INVENTION

The present invention relates to distributed computing systems. More particularly, the present invention relates to systems and methods for distributing processing between provider devices and client devices. Still more particularly, the present invention relates to distributed workflow-enabled systems that provide automatic discovery, that provide a pre-define interface among providers and clients, that is customizable by the user, and that allocates processing between providers and clients.

A variety of peripheral devices that each provides a specific function is common for most office environments. For example, most offices include one or more of the following office devices such as a printer, a scanner and a fax machine, a photocopier, multifunction peripheral (MFP) or some variation of these devices. Office environments have been known to include several of these devices coupled together via a network. The communication network may take a variety of different formats including but not limited to a local area network, wide-area network, a 3G network or a wireless network. However, one problem with existing configurations of these devices is that in order to use each device on the network, the user must know about the device's existence, must load different software or other drivers to communicate with each device, and has no flexibility on how to interact with the devices. Thus, users typically only interact with a small number of devices on the network and do not use many resources available on the network.

The landscape of computing devices used in conjunction with these peripheral devices has also changed from a small homogeneous set of computing devices such as desktop computers to a large heterogeneous set of computing devices with significantly varying functionality and computational power. For example, there are any number of computing devices such as but not limited to personal computers, personal digital assistants, smart phones, laptop computers and digital cameras that are coupled for use with the peripheral devices. While many of these devices have an ability to communicate over a network whether it be wired or wireless, their ability to interface with peripheral devices is significantly limited because each peripheral device requires compliance with different data communication protocols, has its own application interface and data has to be in a format specific to that peripheral and often different from the format of other peripherals.

One particular problem with current environments for using computing devices with peripheral devices is that each time a new peripheral device is added to the landscape, each existing device that wants to communicate with the new peripheral device typically must be modified or new software added to it. For example, if a new printer is added to the network, each computing device that wants to use that new printer must download and add software drivers that allow the computing device to communicate data and control commands to the new printer. Additionally, there is often no way for any new device added to the landscape to communicate its functional capabilities to other devices on the network.

Another problem even more basic than communication with new devices on the network is discovering the existence of available peripherals. For many networks, there is not a mechanism for automatically detecting devices on the network and automatically setting up the computing devices and peripheral devices for interaction. In this same way, there is also often no mechanism to automatically determine what the processing capabilities (e.g., scanning, printing, binding, etc.) of a peripheral device are.

SUMMARY OF THE INVENTION

The present invention overcomes the deficiencies of the prior art with a distributed workflow-enabled system. The system is particularly advantageous because it allows computing devices and peripherals to work together more efficiently. In particular, the present invention allows the computation workload to be divided among a peripheral and a computing device, each depending on the computational capabilities of the other. For example, where a computing device has limited computational power such as a mobile phone, the printer or MFP undertakes more of the computational responsibility. In contrast, if the computing device has greater or unused computation capabilities, as might be the case for a desktop computer communicating with a stand-alone printer, the computing device undertakes more the computational responsibility.

In one embodiment, the system of the present invention includes: a workflow-enabled provider and a workflow-enabled client communicatively coupled by a network. The workflow-enabled provider and the workflow-enabled client include a workflow unit. The workflow unit allows the workflow-enabled provider and the workflow-enabled client to communicate, distribute processes and present user interfaces. In one embodiment, the workflow unit comprises: a communication manager, a process control module and a user interface module. The communication manager is coupled to a network, establishes a link with other workflow units and facilitates the transfer of data and commands to and from the other workflow units. The process control module is coupled to the communication manager and to the respective provider or client. The process control module performs one of a plurality of processing functions. The user interface module is coupled to the process control module and dynamically generates user interfaces for display by the associated provider or client. In another embodiment, the system includes a workflow manager to facilitate communication between the workflow-enabled provider and the workflow-enabled client.

The present invention also includes a number of novel methods including a method for communication, a method for processing by a process control module, a method for creating and presenting the user interface, and a method for retrieving processes executable by the process control module.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1A:
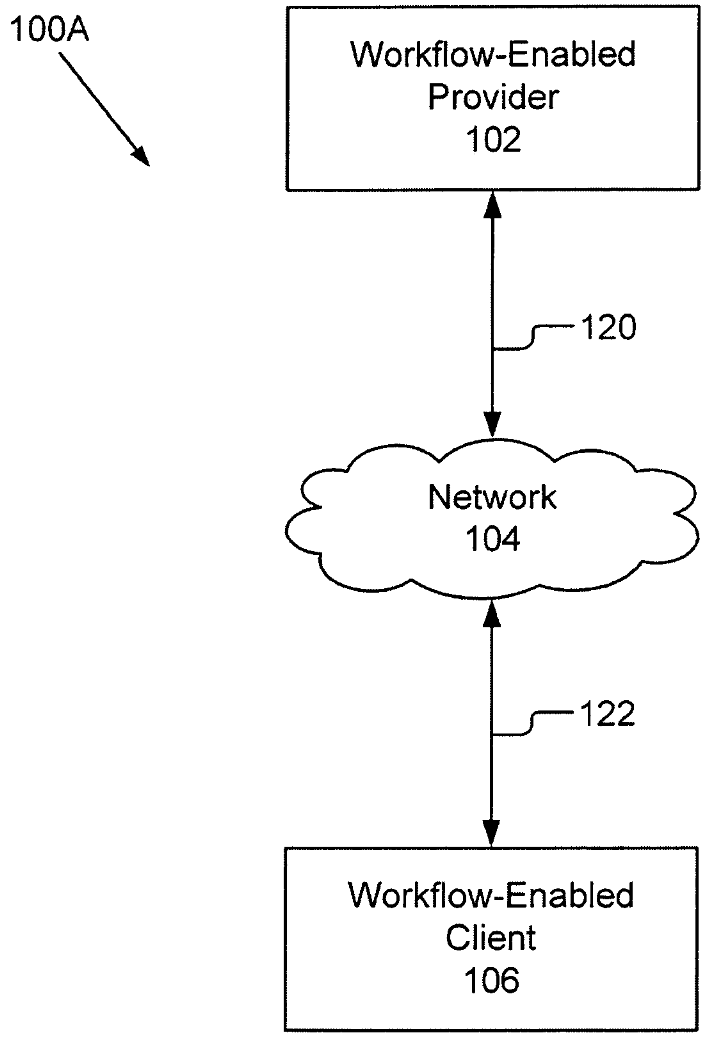
FIG. 1A is a block diagram of a first embodiment of distributed workflow-enabled system configured in accordance with the present invention.

A distributed workflow-enabled system 100 is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to a java, the HTTP request/response protocol, user interfaces and particular hardware. However, the present invention applies to any type of computing device that can receive a data and commands, and any peripheral devices providing services.

Reference in the specification to "one embodiment" or "an embodiment" means that a particular feature, structure, or characteristic described in connection with the embodiment is included in at least one embodiment of the invention.

The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to any particular programming language. It will be appreciated that a variety of programming languages may be used to implement the teachings of the invention as described herein.

System Overview

FIGS. 1A-1E show various embodiments of a distributed workflow-enabled system 100A-100E configured in accordance with the present invention. Referring now to FIG. 1A, a first embodiment of the distributed workflow-enabled system 100A comprises: a workflow-enabled provider 102, a network 104 and a workflow-enabled client 106. FIG. 1A illustrates a minimal configuration for the distributed workflow-enabled system 100 of the present invention with one workflow-enabled provider 102 and one workflow-enabled client 106. The workflow-enabled provider 102 is coupled communicatively to the network 104 by signal line 120. The workflow-enabled client 106 communicatively is coupled by signal line 122 to the network 104. The workflow-enabled provider 102 can perform any variety of service operations depending on its hardware, software and connectivity. The service operations of the workflow-enabled provider 102 include but are not limited to scanning, print, photographing, copying, facsimile transmission, optical character recognition, image capture, image generation, image processing, etc. A workflow-enabled provider 102 is any device with the software running on it (or hardware integrated as part of it) to provide communication capabilities and user interfaces of the present invention. The workflow-enabled provider 102 is adapted for communication, interaction and cooperation with the workflow-enabled client 106. The workflow-enabled client 106 is software operating on a computing device and may have any level of computing capability. The workflow-enabled client 106 is any client software that is designed to perform a specific task and communicate using a method of the present invention. The workflow-enabled client 106 and the workflow-enabled provider 102 communicate with each other to distribute processes and workflow, and generate and present user interfaces.

The distributed workflow-enabled system 100 of the present invention is particularly advantageous because it provides a number of benefits. First, it allows the workflow-enabled provider 102 and the workflow-enabled client 106 to work more efficiently. In particular, the present invention allows the computation workload to be divided amongst the workflow-enabled provider 102 and the workflow-enabled client 106. This workload division is based upon the capabilities (both functionality and available computational power) of the workflow-enabled provider 102, the capabilities of the workflow-enabled client 106, and the demands by others on the workflow-enabled provider 102. Second, the present invention creates a communication standard for communication between the workflow-enabled provider 102 and the workflow-enabled client 106. This enables distribution of workload, but also provides a mechanism to control and create new workflows for processing information among multiple workflow-enabled providers 102. Third, the present invention allows creation and presentation of user interfaces, for example graphic user interfaces (GUIs), which are specifically customized to the user and adapted to the workflow, the capability of the workflow-enabled client 106, and the capability of the workflow-enabled provider 102. More specifically for one embodiment, a GUI that is common on both the workflow-enabled provider 102 and the workflow-enabled client 106 can be used to create a common interface or experience even though using different providers and different clients.

Referring now to FIGS. 1B-1E, various configurations of a second embodiment of the distributed workflow-enabled system 100B-100E in accordance with the present invention are shown. In a second embodiment of the distributed workflow-enabled system 100B-100E, communication between the workflow-enabled providers 102 and the workflow-enabled clients 106 uses an advertisement/discovery protocol and also includes a workflow manager 108 that assists with communication between the workflow-enabled provider 102 and the workflow-enabled client 106. In one embodiment, the workflow manager 108 maintains a directory of workflow-enabled clients 106, a list of IP addresses for workflow-enabled providers 102 that have activated workflow-enabled clients 106, and other information; assists the workflow-enabled client 106 with advertisement of its availability; translates a transaction from a workflow-enabled provider 102 into multiple transactions suitable for the workflow-enabled client 106, and handles security and authentication. The functionality of the workflow manager 108 will be described in more detail below with reference to FIG. 6. Those skilled in the art will recognize that while the present invention will be described with the workflow-enabled clients 106 advertising their availability and the workflow-enabled providers 102 discovering the advertisements, in another embodiment their roles could be reversed, with the workflow-enabled providers 102 advertising their availability and the workflow-enabled clients 106 discovering the advertisements.

Figure 1B:
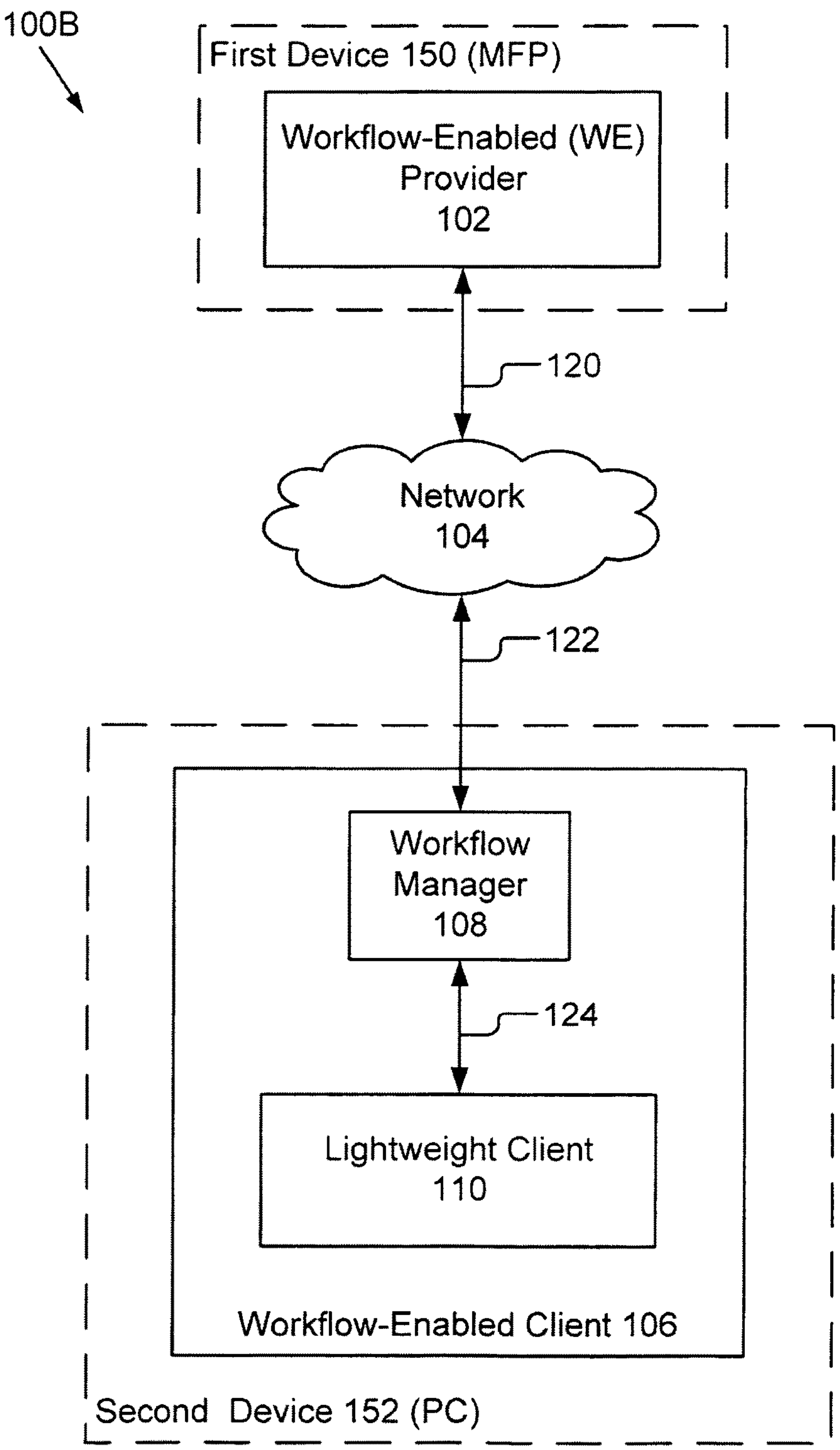
FIGS. 1B-1E are block diagrams of various configurations of a second embodiment of distributed workflow-enabled system in accordance with the present invention.

FIG. 1B shows the first and preferred configuration of the second embodiment for the distributed workflow-enabled system 100B in which the components of the system 100B are software operational on multiple devices. In this first configuration, a first device 150, for example a MFP, includes the workflow-enabled provider 102 while the second device 152, for example a personal computer, includes the workflow-enabled client 106. The workflow-enabled client 106 further comprises a workflow manager 108 and a lightweight client 110. The workflow-enabled provider 102 is coupled by signal line 120 to the network 104. The workflow-enabled client 106, in particular the workflow manager 108, is coupled by signal line 122 to the network 104. The workflow manager 108 is in turn coupled for communication by signal line 124 to the lightweight client 110. The workflow-enabled client 106 is operational on the personal computer. Although only a single lightweight client 110 is shown, those skilled in the art will recognize that the second device 152 may include a plurality of such lightweight clients 110A-110N all coupled to the workflow manager 108 as shown in the fifth configuration 100E of FIG. 1E by signal lines 124A-124N, respectively. Furthermore, the first device 150 and the second device 152 may be any computing device and the MFP and personal computer are used only by way of example.

Figure 1C:
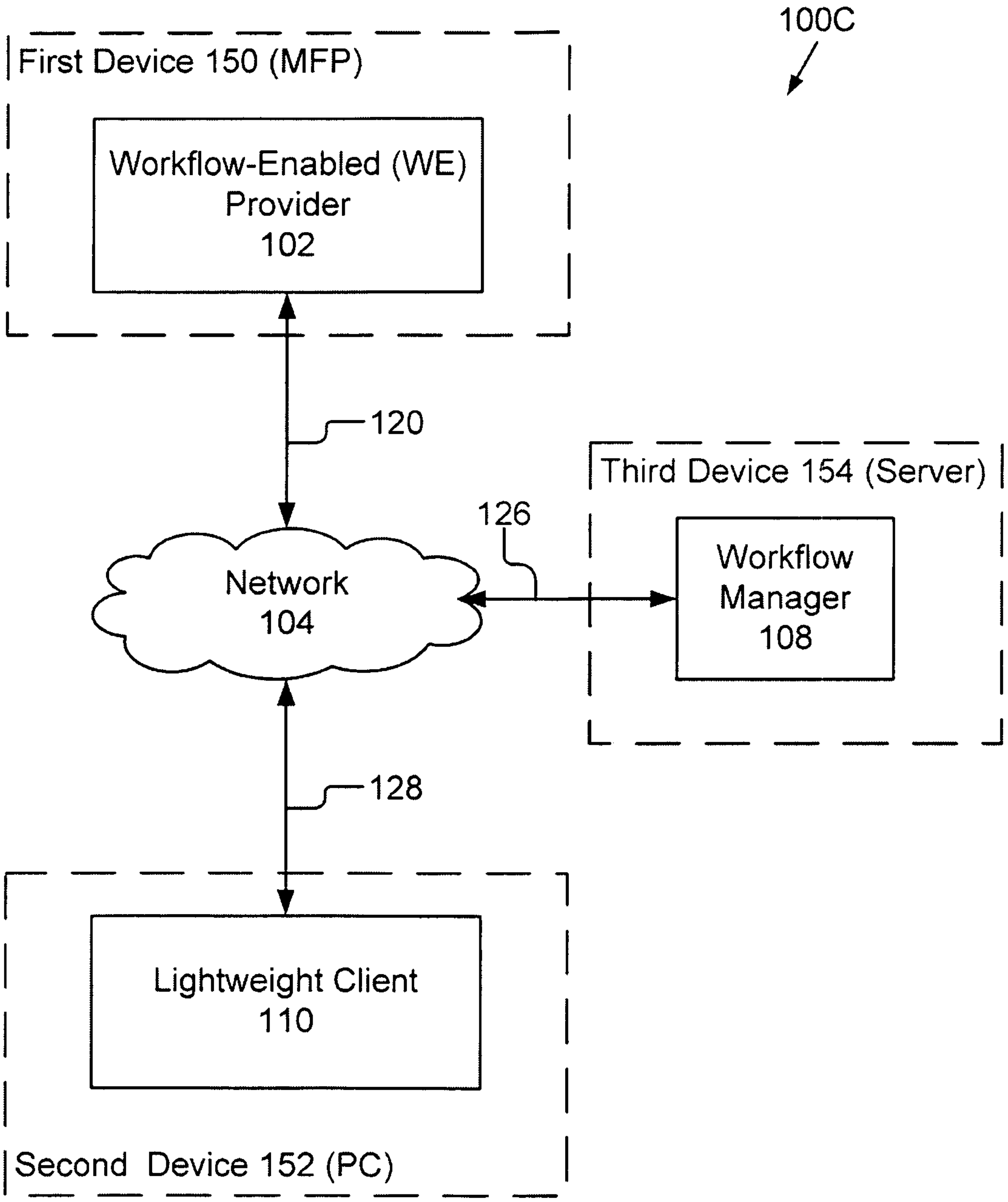

FIG. 1C shows the second configuration of the second embodiment for the distributed workflow-enabled system 100C. In this configuration, the first device 150 includes the workflow-enabled provider 102 as has been described above with reference to FIG. 1B. However, this second configuration has the second device 152 that includes the lightweight client 110 only, with the workflow manager 108 operational on and included as part of a third device 154. The workflow manager 108 is coupled to the network 104 by signal line 126. The lightweight client 110 is coupled for communication by signal line 128 to the network 104. This implementation is advantageous because the second device 152 need only download and install the lightweight client 110 and have access to the network 104 to enable the functionality of the present invention. The lightweight client 110 in this embodiment communicates with the workflow manager 108 over the network 104 as compared to a direct coupling of FIG. 1B. In other words, putting the workflow manager 108 on a separate, third device 154 (server) coupled to the network 104 allows the workflow manager 108 to be shared by several devices that have the smaller, lightweight clients 110.

Figure 1D:
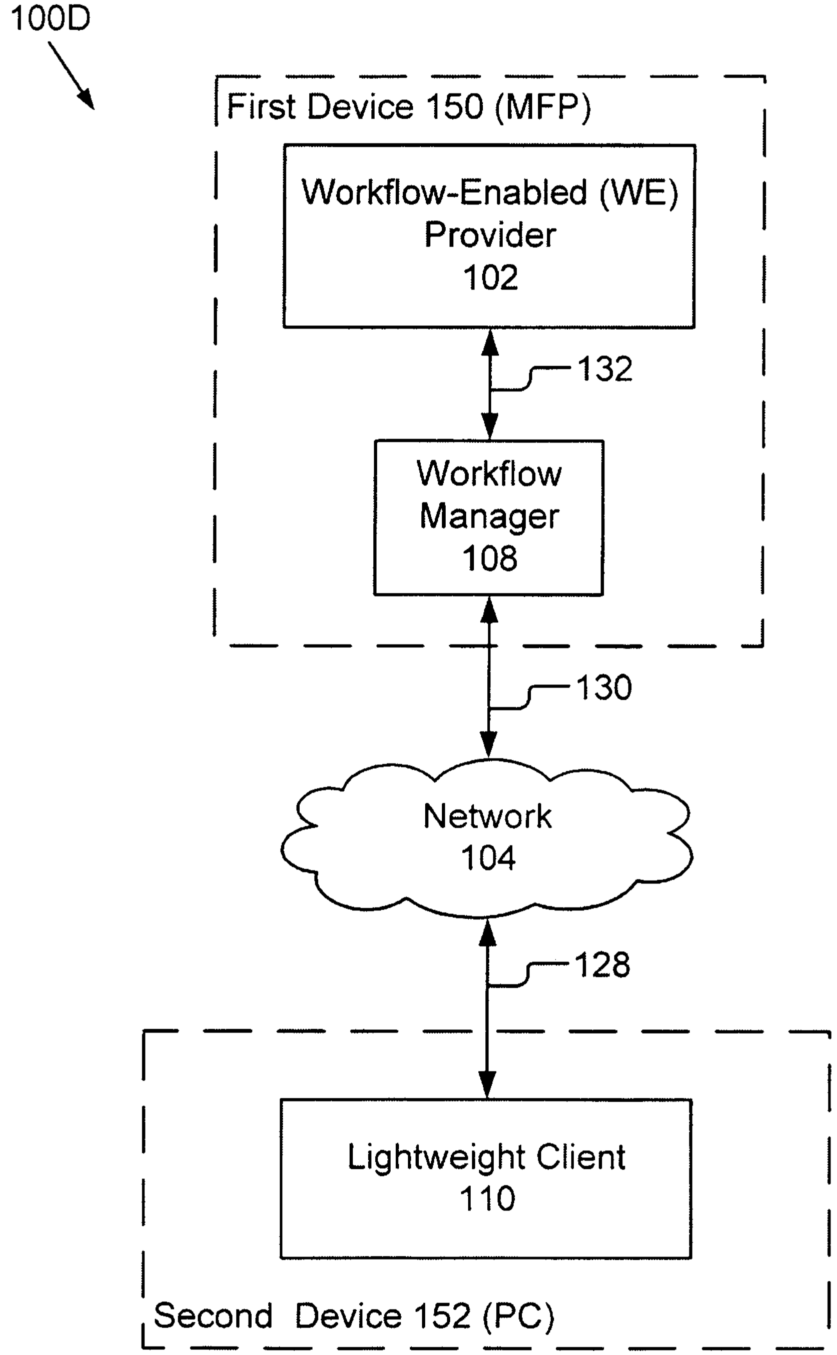

FIG. 1D shows the third configuration of the second embodiment for the distributed workflow-enabled system

100D. In this configuration, the first device 150 includes both the workflow-enabled provider 102 and the workflow manager 108. The couplings are also modified such that the workflow-enabled provider 102 is coupled by signal line 132 to the workflow manager 108, and the workflow manager 108 in turn is coupled by signal line 130 to the network 104. Like the second configuration, this third configuration also requires only the lightweight client 110 on the second device 152. These different configurations of the second embodiment illustrate that the workflow manager 108 can be operational as part of any device in the distributed workflow-enabled system 100.

Figure 1E:
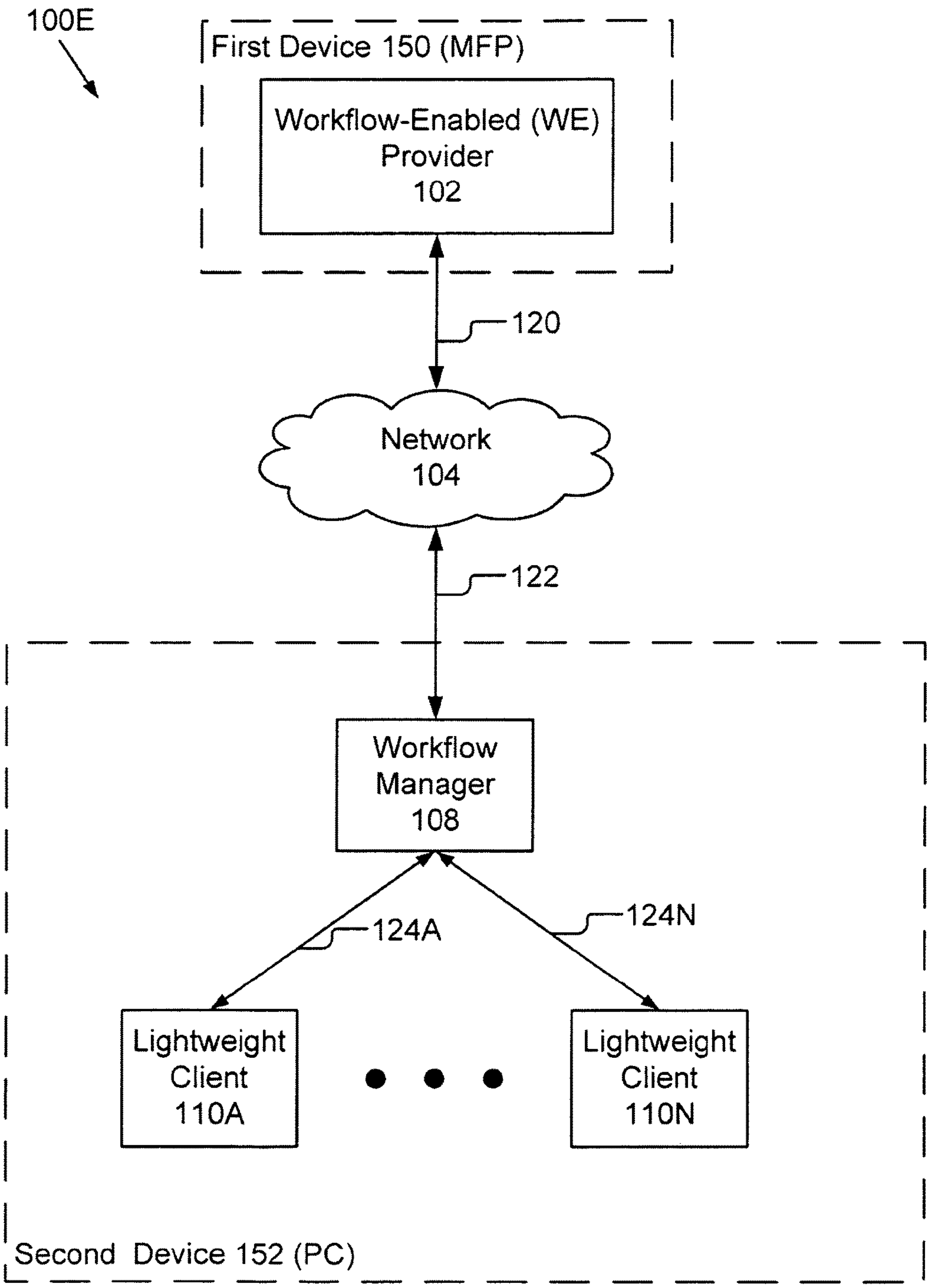

FIG. 1E shows the fourth configuration of the second embodiment for the distributed workflow-enabled system 100D. In this first configuration, the first device 150 includes the workflow-enabled provider 102 while the second device 152 includes the workflow manager 108 and a plurality of lightweight clients 110A-110N. The workflow-enabled provider 102 is coupled by signal line 120 to the network 104. The workflow manager 108 is coupled by signal line 122 to the network 104. The workflow manager 108 is in turn coupled for communication by signal lines 124A-124N to the respective lightweight clients 110A-110N. The workflow manager 108 and the plurality of lightweight clients 110A-110N are operational on the personal computer 152. This configuration illustrates how any number of lightweight clients 110A-110N are used contemporaneously on a single computing device.

Those skilled in the art will recognize that FIGS. 1B-1E are just example configurations for implementing the present invention, and that any number of additional configurations are possible. For example, in another embodiment all the different variations for positioning the workflow manager 108 could simultaneously exist in a configuration with a plurality of workflow managers 108. Similarly, another configuration could select certain workflow-enabled providers 102, workflow-enabled clients 106, lightweight clients 110 and workflow managers 108 according to the needs of a particular office setting.

Figure 2:
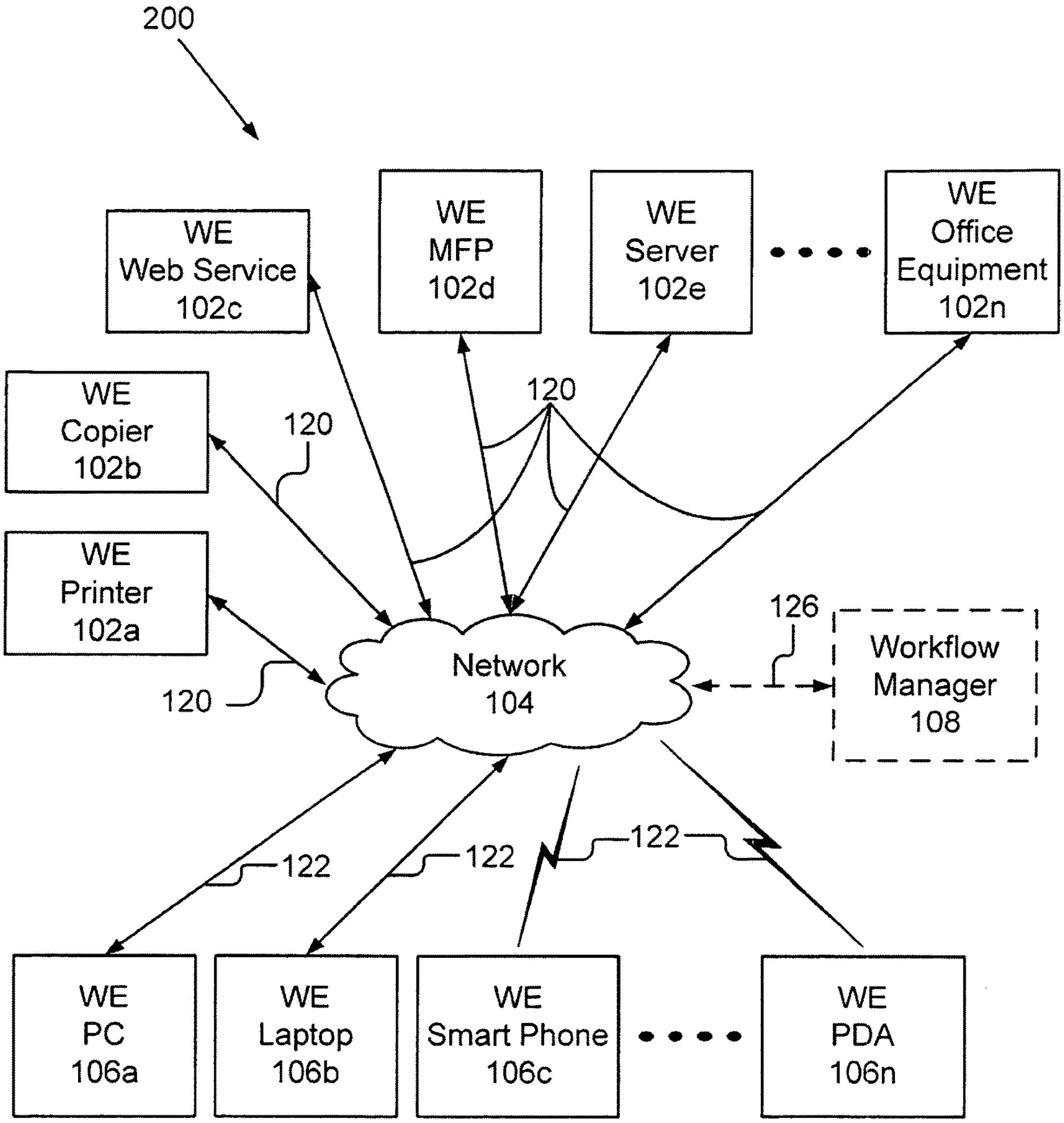
FIG. 2 is a block diagram of a third embodiment of a complex distributed workflow-enabled system configured in accordance with the present invention.

FIG. 2 is a block diagram of a complex distributed workflow-enabled system 200 configured in accordance with a third embodiment of the present invention. FIG. 2 illustrates yet another embodiment of the distributed workflow-enabled system 200 where there are multiple workflow-enabled providers 102*a*-102*n* and multiple workflow-enabled clients 106*a*-106*n*.

As shown in FIG. 2, the network 104 is coupled by signal lines 120 to a plurality of workflow-enabled providers 102*a*-102*n*. In one embodiment, the present invention may be implemented as software that may be installed onto a plurality of conventional provider devices. In another embodiment, the present invention is implemented as hardware that is built into the plurality of conventional provider devices. Once such devices have been enabled with the software of the present invention, they become workflow-enabled providers 102*a*-102*n*. The plurality of workflow-enabled providers 102*a*-102*n* in this embodiment includes: a workflow-enabled printer 102*a*, a workflow-enabled copier 102*b*, a workflow-enabled web service 102*c*, a workflow-enabled multifunction peripheral 102*d*, a workflow-enabled server 102*e*, and other workflow-enabled office equipment 102*n*. FIG. 2 illustrates that the complex distributed workflow-enabled system 200 of the present invention may include any number of workflow-enabled providers 102*a*-102*n*, and that each of the workflow-enabled providers 102*a*-102*n* may have a different amount of functionality.

This embodiment of the complex distributed workflow-enabled system 200 also includes a plurality of workflow-enabled clients 106*a*-106*n* coupled via signal lines 122 to the network 104. This plurality of workflow-enabled clients 106*a*-106*n* also demonstrates that the complex distributed workflow-enabled system 200 includes any number of the workflow-enabled clients 106*a*-106*n* and that each of the workflow-enabled clients 106*a*-106*n* may have a different amount of functionality as well as a different medium for communication. In this particular embodiment, the workflow-enabled clients 106*a*-106*n* includes: a workflow-enabled personal computer 106*a*, a workflow-enabled laptop computer 106*b*, a workflow-enabled smart phone 106*c* and a workflow-enabled personal digital assistant (PDA) 106*n*. In one embodiment, the present invention is implemented as software that may be installed onto any conventional client device. Based on architecture for the complex distributed workflow-enabled system 200 as shown in FIG. 2, those skilled in the art can envision a variety of different workflows in which different portions of the workflow are performed by different providers 102*a*-102*n* and different workflow-enabled clients 106*a*-106*n*, and wherein the input and output for the workflow is received and sent by different providers 102*a*-102*n* and different workflow-enabled clients 106*a*-106*n*.

Depending on the embodiment, the system 200 may also include a workflow manager 108. The workflow manager 108 facilitates communication between the plurality of providers 102*a*-102*n* and the plurality of workflow-enabled clients 106*a*-106*n*. Although only one workflow manager 108 is shown in FIG. 2, alternate embodiment may include a plurality of workflow managers 108. Alternate embodiments may also include one or more workflow managers 108, of which some or all are stand-alone as in FIG. 1C, bundled with the workflow provider 102 as in FIG. 1D, or bundled with the lightweight client 110 as in FIG. 1B.

System Implementation

Figure 3A:
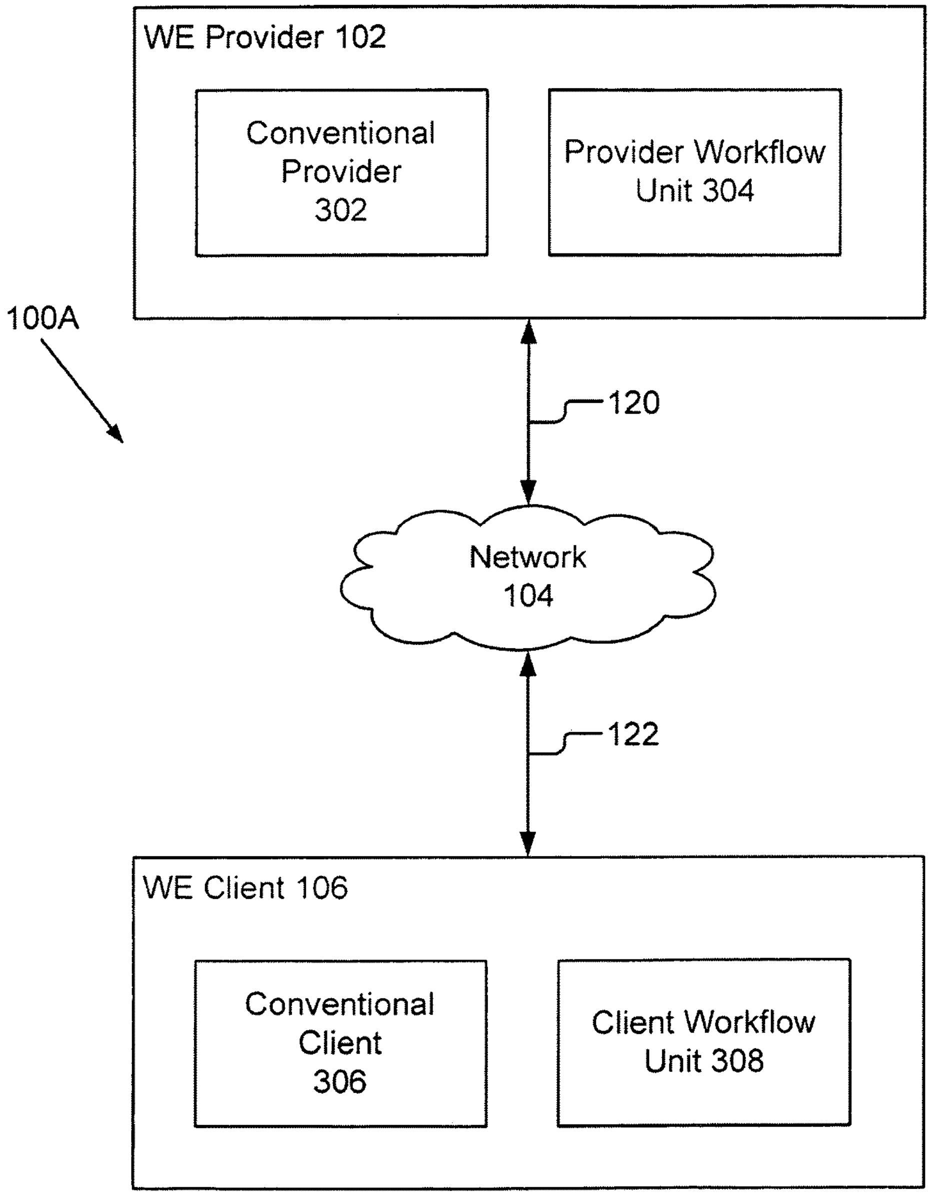
FIG. 3A is a block diagram of the first embodiment of the distributed workflow-enabled system showing a client and a provider in more detail.

Referring now to FIG. 3A, the first embodiment of the distributed workflow-enabled system 100A showing the workflow-enabled provider 102 and the workflow-enabled client 106 in more detail is shown.

As shown in FIG. 3A, the workflow-enabled provider 102 includes a conventional provider 302 and a provider workflow unit 304. The conventional provider 302 is used throughout this application to generally to refer to any device capable of performing any operation or operations such as but not limited to scanning, photocopying, printing, collating, format conversion, optical character recognition, binding, facsimile transmission, e-mail transmission, etc. While the present invention is described below primarily in the context of operations performed by a multifunction peripheral in an office environment such as photocopying, scanning, faxing and printing, those skilled in the art will recognize that the present invention may also be used for a variety of other document or image processes. Furthermore, in one embodiment the conventional providers 302 may be a web service for accessing such other documents or imaging processes. The provider workflow unit 304 is coupled and adapted for communication with the conventional provider 302. The provider workflow unit 304 communicates with other workflow units 304, 308; processes data and information received from the conventional provider 302 or externally by the workflow-enabled provider 102 via signal line 120; controls and provides input to the conventional provider 302; and generates user interfaces and presents them on the conventional provider 302. One embodiment for the provider workflow unit 304 is shown and described in more detail below with reference to FIG. 4A.

The workflow-enabled client 106 includes a conventional client 306 and a client workflow unit 308. The conventional client 306 is of a conventional type such as operable on any computing device. The conventional client 306 refers generally to any computing device that can display information, receive input and perform computations. For example, the conventional client 306 may be any one of a conventional personal computer, a conventional smart phone, a conventional laptop computer, a conventional personal digital assistant, a conventional portable computing device, and a conventional cell phone. The conventional client 306 is adapted for communication and coupled to the client workflow unit 308. The client workflow unit 308 has a similar functionality as described above with reference to provider workflow unit 304. The client workflow unit 308 communicates with other workflow units 304, 308; processes data and information received from the conventional client 306 or externally by the workflow-enabled client 106 via signal line 122; generates user interfaces; and presents them on the conventional client 306. One embodiment of the client workflow unit 308 is shown and described in more detail below with reference to FIG. 5A.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network.

Figure 3B:
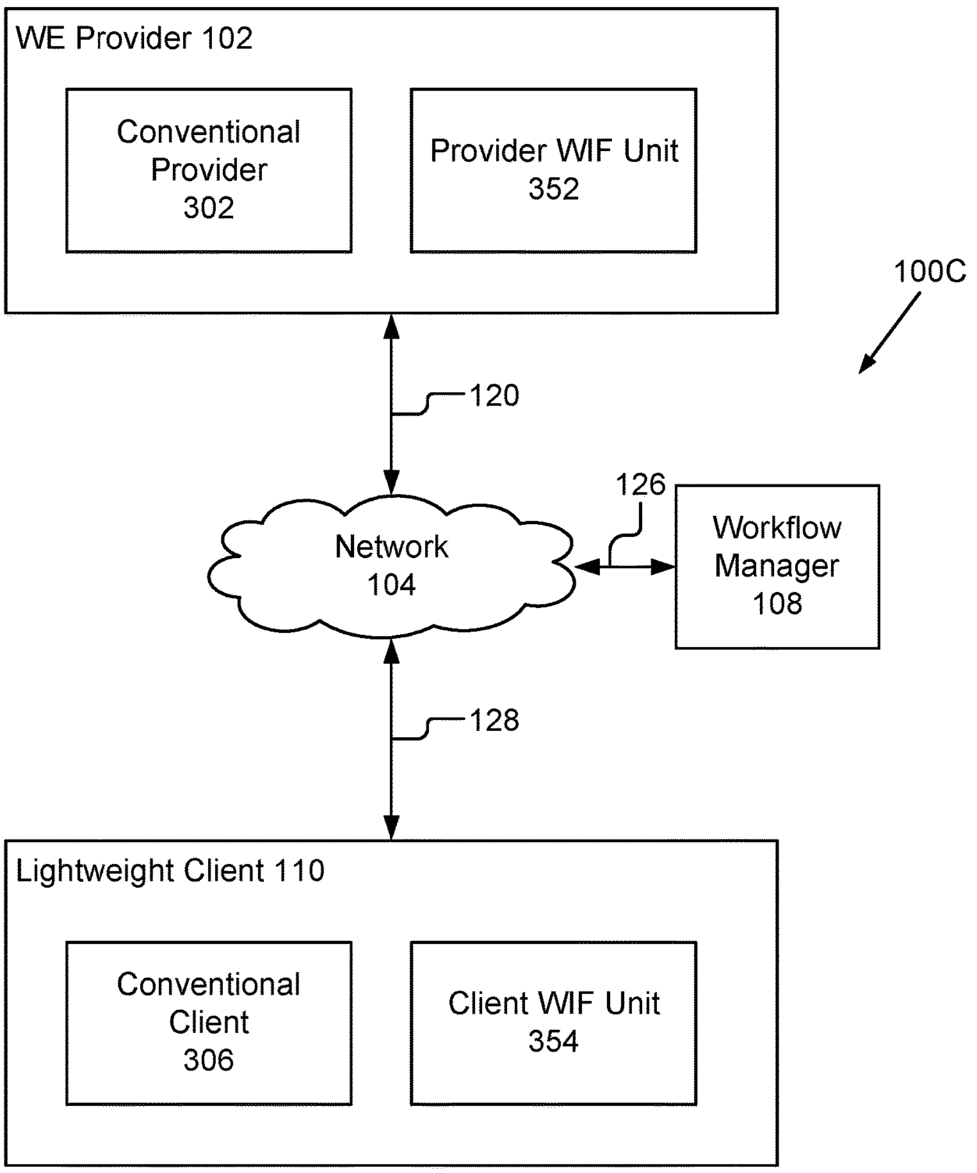
FIG. 3B is a block diagram of the second embodiment of the distributed workflow-enabled system showing a client and a provider in more detail.

Referring now to FIG. 3B, the second embodiment of the distributed workflow-enabled system 100C shows the workflow-enabled provider 102 and the lightweight client 110 in more detail. In this second embodiment, the workflow-enabled provider 102 comprises the conventional provider 302 and a provider workflow interface (WIF) unit 352. The lightweight client 110 comprises a conventional client 306 and a client workflow interface (WIF) unit 354. The conventional provider 302 and the conventional client 306 have been described above with reference to FIG. 3A so that description will not be repeated here. The workflow manager 108 has also been described above with reference to FIGS. 1B-1E and will be described in more detail below with reference to FIG. 6. While the description for FIG. 3B below will describe the interaction in terms of a lightweight client 110 registered with a workflow manager 108, those skilled in the art will recognize that it could alternatively be a workflow-enabled client 106 or a heavyweight client (as will be described in more detail below with reference to FIG. 5C).

The provider workflow interface (WIF) unit 352 is coupled and adapted for communication with the conventional provider 302 and the workflow manager 108. The provider WIF unit 352 communicates with the conventional provider 302 to utilize the services of the conventional provider 302 and control the display of user interfaces by the conventional provider 302. The provider WIF unit 352 also provides instructions to the conventional provider 302 as to what actions to perform and provides data for performing such actions. The provider WIF unit 352 receives process results and other information from the conventional provider 302. The provider WIF unit 352 also communicates with the workflow manager 108 to provide the process results generated by the conventional provider 302 to service particular lightweight clients 110. The WIF unit 352 also receives commands and data from the workflow manager 108. More specifically the provider WIF unit 352 performs advertisement monitoring, notification of received advertisements and activation of lightweight clients 110. The provider WIF unit 352 listens for advertisements for lightweight clients 110 and maintains a menu of those lightweight clients 110 whose requirements the associated conventional provider 302 meets, and causes the menu to be displayed by the conventional provider 302. Once a user selects a particular lightweight client 110 from the menu, the provider WIF unit 352 sends a notification to the workflow manager 108 to initiate communication with the appropriate lightweight client 110. After optionally requiring a password, the workflow manager 108 optionally responds with user interface items to display and/or indication that an action (i.e., capture or scan) should be performed with particular parameters. In response to user input (typically because the user pressed the START button), the provider WIF unit 352 initiates an activation of the appropriate lightweight client 110 and sends to the workflow manager 108 any scan or other information captured and/or receives a file to be printed or otherwise output by the conventional provider 302. One embodiment for the WIF unit 352 is shown and described in more detail below with reference to FIG. 4B.

The client workflow interface (WIF) unit 354 is coupled and adapted for communication with the conventional client 306 and the workflow manager 108. The client WIF unit 354 communicates with the conventional client 306 to receive and send data, commands and configuration information. The client WIF unit 354 also communicates with the workflow manager 108 to register and unregister the lightweight client 110, to send commands and data to the workflow manager 108, and to retrieve processing results from the workflow manager 108. Lightweight clients 110 employ the services of the workflow manager 108 to perform the advertisement and communications. The client WIF unit 354 initiates a registration with the workflow manager 108. The workflow manager 108 responds with a location by which client WIF unit 354 can retrieve data and submit further commands. Once registered, the workflow manager 108 automatically advertises the lightweight client 110. The lightweight client 110 unregisters with the workflow manager 108. The workflow manager 108 then advertises the removal of the lightweight client 110 and removes any data that had been stored for the lightweight client 110. The client WIF unit 354 determines whether any the workflow-enabled provider 102 have activated it, and retrieves data transmitted (e.g. scanned images), if any, by communicating with the workflow manager 108. The client WIF unit 354 sends files or data to the workflow manager 108 using the path specifying a particular instance where the lightweight client 110 had been activated. In one embodiment, the client WIF unit 354 also analyzes the process results from the workflow manager 108 and initiates one or more actions from the current or other workflow-enabled clients 106. In another embodiment, the client WIF unit 354 presents a user interface and receives configuration information from the user of the workflow-enabled clients 106. One embodiment of the client WIF unit 354 is shown and described in more detail below with reference to FIG. 5B.

Figure 4A:
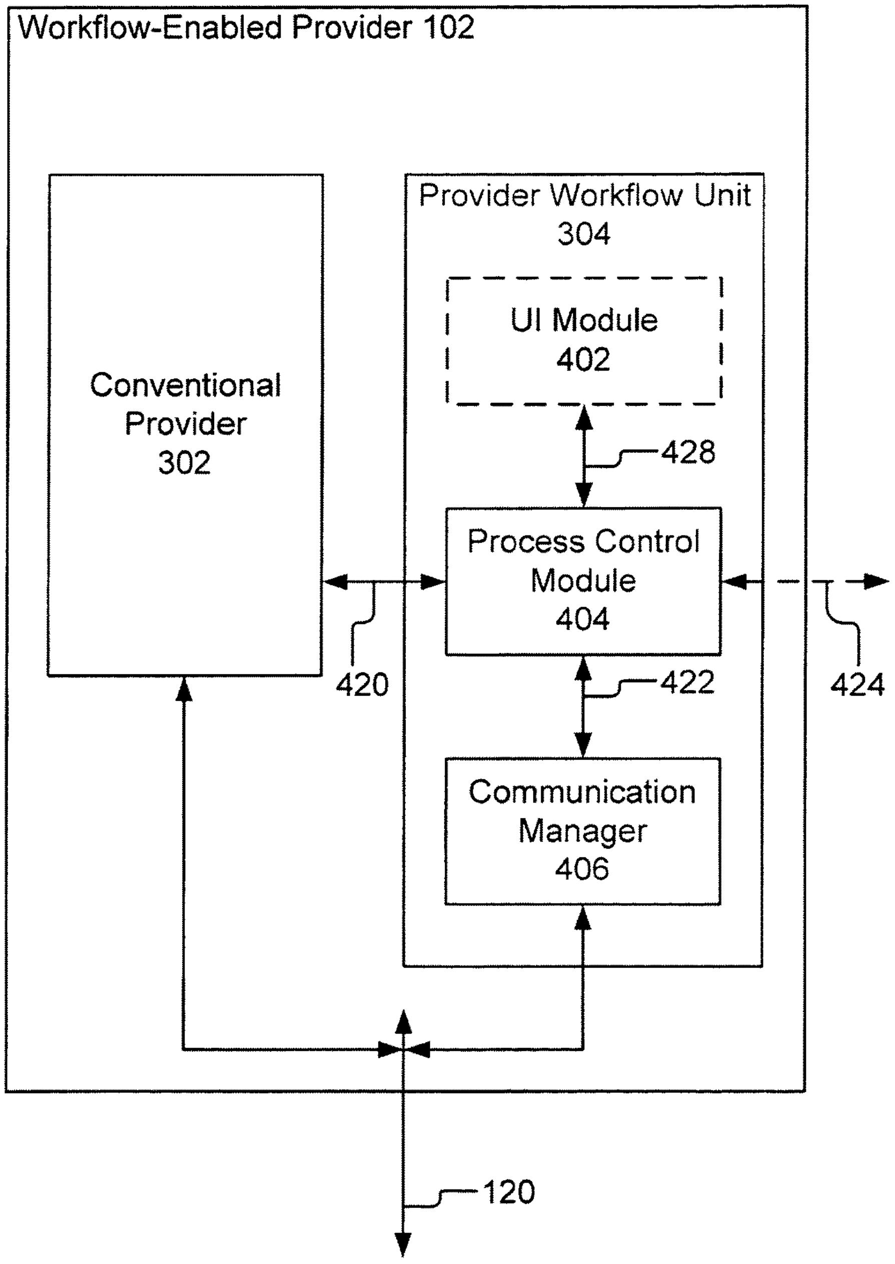
FIG. 4A is a block diagram of a first embodiment of a workflow-enabled provider in accordance with the present invention.

Referring now to FIG. 4A, a first embodiment of the workflow-enabled provider 102 in accordance with the present invention is shown in more detail. In particular, FIG. 4A illustrates the provider workflow unit 304 as well as its couplings to the conventional provider 302 and other external devices (not shown). In this embodiment, the provider workflow unit 304 includes a user interface module 402, a process control module 404 and a communication manager 406.

The user interface module 402 is coupled by signal line 428 to the process control module 404. The user interface module 402 dynamically generates user interfaces and interacts with the process control module 404 to cause the conventional provider 302 to display the dynamically generated user interfaces. In an alternate embodiment, the user interface module 402 is also coupled directly to the conventional provider 302 to control a display of the conventional provider 302 directly and generate the user interface as needed. The user interface module 402 and its operation are described in more detail below with reference to FIGS. 9 and 12. In one embodiment, the user interface module 402 is optional and therefore is shown with dashed lines in FIG. 4.

The process control module 404 controls the operation of the provider workflow unit 304 and is coupled for communication with the conventional provider 302 via signal line 420, with the communication manager 406 via signal line 422, and (optionally) with one or more external devices (not shown) via signal line 424. The process control module 404 receives commands and data from the communication manager 406 and translates those commands and data to input for the conventional provider 302. In one embodiment, the process control module 404 incorporates the application interface of the conventional provider 302. Thus the process control module 404 is able to communicate via signal line 420 in a manner that will be understood by the conventional provider 302. In another embodiment, the process control module 404 can also performs processing operations on the data before providing it to the conventional provider 302. In yet another embodiment, the process control module 404 manages workflow by sending commands and data to different resources such as the conventional provider 302 or an external resource (not shown) using signal line 424. The process control module 404 will be described in more detail below with reference to FIG. 8A.

The communication manager 406 is adapted for communication with the process control module 404 via signal line 422 and the network 104 via signal line 120. The communication manager 406 handles communication and data exchange with other workflow-enabled providers 102 and workflow-enabled clients 106. In most instances, the communication manager 406 communicates with one workflow-enabled client 106, although it may communicate with multiple workflow-enabled providers 102 and multiple workflow-enabled clients 106. The operation of the communication manager 406 is described in more detail below with reference to FIGS. 7A and 11A. In one embodiment, the communication manager 406 implements a standardized protocol so that each of the communication managers may communicate with each other. This standardized protocol includes automatic discovery, automatic registration, advertisement of services and transfer of control commands and data. For completeness, it should be understood that the conventional provider 302 also optionally has an input/output coupled to signal line 120 to receive communications directed towards the conventional provider 302 as is conventionally understood for certain embodiments of the conventional provider 302. Thus, the conventional provider 302 may communicate with other devices either directly over signal line 120 or using the communication manager 406.

Figure 4B:
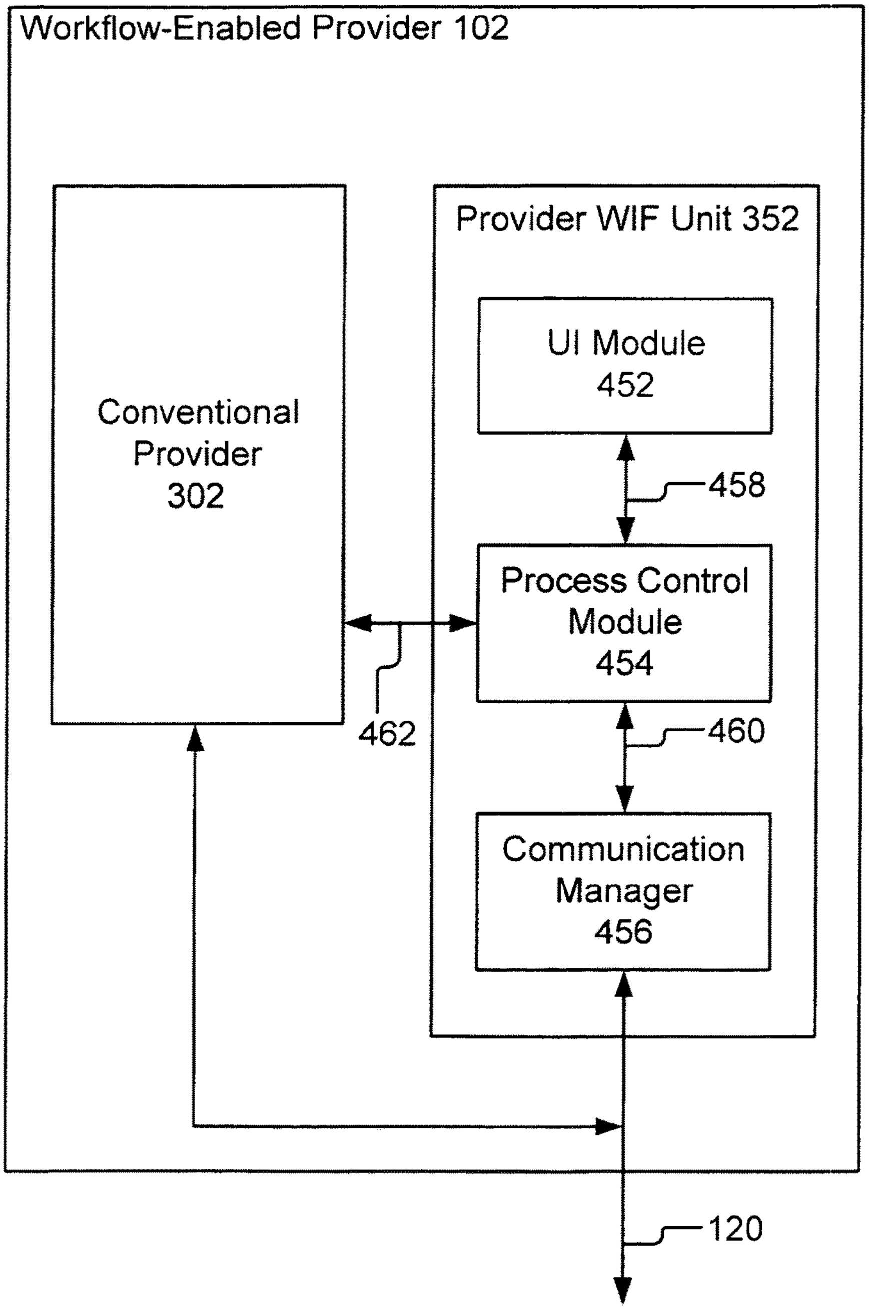
FIG. 4B is a block diagram of a second embodiment of a workflow-enabled provider in accordance with the present invention.

FIG. 4B shows a second embodiment of the workflow-enabled provider 102 in accordance with the present invention. The second embodiment of the workflow-enabled provider 102 includes the conventional provider 302 and the provider WIF Unit 352 comprising a user interface module 452, a process control module 454 and a communication manager 456. The communication manager 456 is coupled to the network 104 by signal line 120. The process control module 454 is coupled to the communication manager 456 by signal line 460, to the user interface module 452 by signal line 458, and to the conventional provider 302 by signal line 462. The user interface module 452 and the process control module for 454 have similar functionality to the user interface module 402 and the process control module 404, respectively, described above with reference to FIG. 4A. It should be noted that in this embodiment, the provider WIF unit 352 via communication manager 456 controls the communication between the workflow-enabled provider 102 and the workflow manager 108 using the network 104. The communication manager 456 will be described in more detail below with reference to FIG. 7B. Another notable difference is that the process control module 454 performs actions necessary for proper interaction with the workflow manager 108.

In an alternate embodiment, the second embodiment of the workflow-enabled provider 102 may also include a device provider proxy (not show). Some legacy conventional providers 102 may not have the capability to communicate over a network 104, initiate requests and/or present menus on their console as necessary to be a workflow-enabled provider 102. For such legacy conventional providers 102, the device proxy is added as well as the provider WIF unit 354 to make the group a workflow-enabled provider 102. The device proxy is a server that performs all the device functions except for the actual scanning or printing. In one embodiment, the device proxy is a device that happens to speak to a scanner or printer back-end using a legacy protocol such as LPR or over USB. A device proxy will maintain a menu of the workflow-enabled clients 106 that have advertised themselves via DNS-based Service Discovery (DNS-SD) and provide a user interface for selecting and activating the workflow-enabled clients 106. It also controls the legacy conventional providers 102 to scan or print as appropriate, and delivers scanned documents to the workflow-enabled clients 106 or workflow manager 108 using a request, such as an HTTP POST request. Unlike the workflow manager 108, device proxies are specific to a particular type of device, such as a scanner or printer, although multiple scanners or multiple printers may be served by the same device proxy.

Figure 5A:
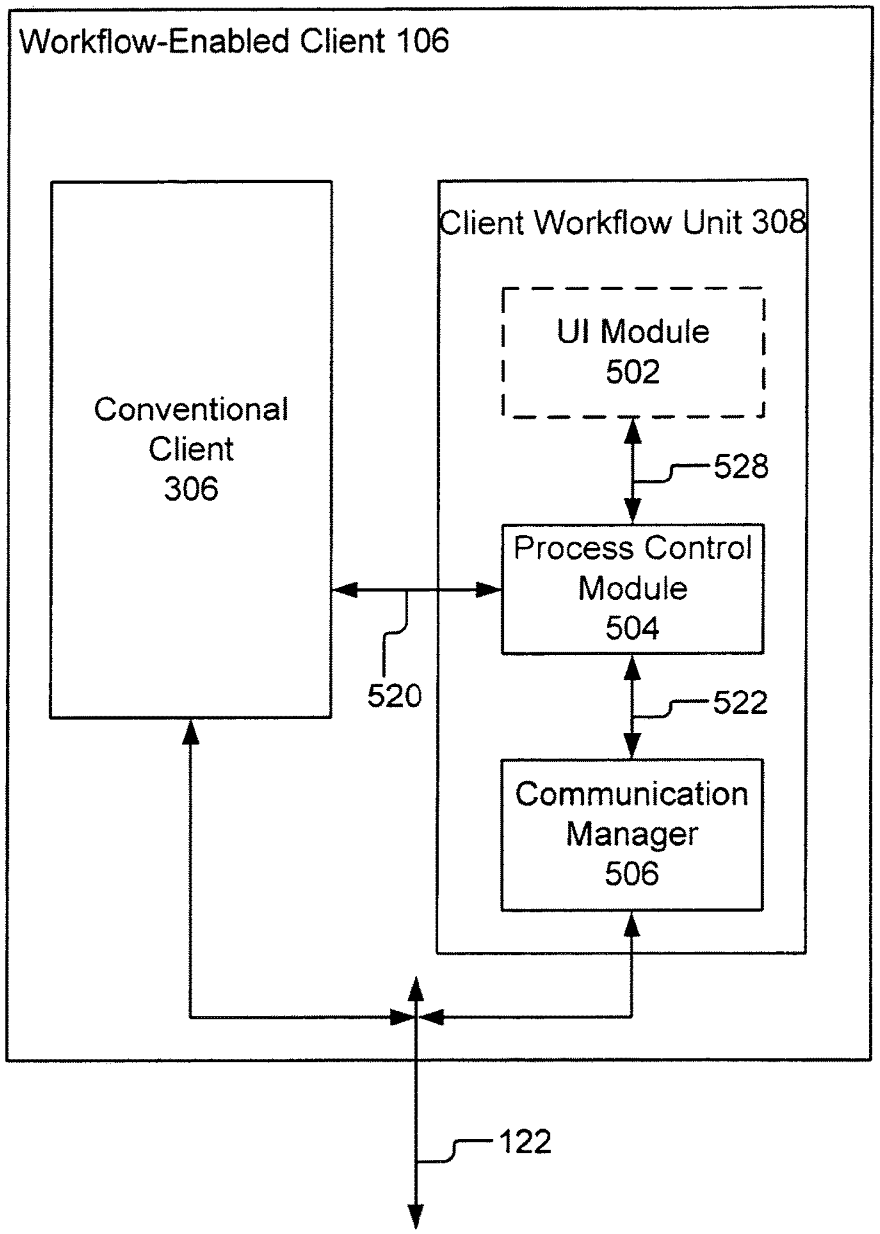
FIG. 5A is a block diagram of first embodiment of a workflow-enabled client in accordance with the present invention.

FIG. 5A shows a first embodiment of the workflow-enabled client 106 in accordance with the present invention. FIG. 5A provides additional information about the client workflow unit 308 of the workflow-enabled client 106. In this embodiment, the client workflow unit 308 comprises a user interface module 502, a process control module 504 and the communication manager 506.

The user interface module 502 has functionality similar to that of the user interface module 402 described above with reference to FIG. 4A. However, the user interface module 502 dynamically generates user interfaces and interacts with the process control module 504 for the production of the user interfaces on the conventional client 306 as opposed to the conventional provider 302. Again, the user interface module 502 is optional and therefore is shown with dashed lines in FIG. 5A. The user interface module 502 although not shown as such in FIG. 5A may be directly coupled to the conventional client 306 for generation and control of the user interface on the conventional client 306. The user interface module 502 is coupled via signal line 528 to the process control module 504. The user interface module 502 is described in more detail with reference to FIGS. 9 and 12 below.

The process control module 504 is coupled to the conventional client 306 via signal line 520 and to the communication manager 506 via signal line 522. The process control module 504 is used to control the overall workflow process. In various embodiments, the process control module 504 controls the operation of the conventional client 306. The process control module 504 also includes modules to perform processing of routines retrieved via the communication manager 506 or stored as part of the process control module 504. These routines include command and control of general workflows as well as independent processing of data. The inclusion of the process control module 504 as part of client workflow unit 308 is advantageous because the process control module 504 allocates and utilizes the resources of conventional client 306 to process portions of the overall workflow. For example, the process control module 504 may utilize the specialized services of workflow-enabled providers 102 while at the same time utilizing available bandwidth of the conventional client 306 to perform processing that is computationally expensive. This effectively makes the division of labor between a workflow-enabled provider 102 and a workflow-enabled client 106 optimized for maximum performance of both devices. The operation of the process control module 504 is described in more detail below with reference to FIGS. 8B and 11B.

The communication manager 506 has similar functionality as has been described above with reference to communication manager 406. The communication manager 506 will be described in more detail below with reference to FIGS. 7A and 11A. Notable differences from the communication manager 406 are that communication manager 506 is coupled to the network 104 by signal line 122 and is coupled to the process control module 504 by signal line 522.

Figure 5B:
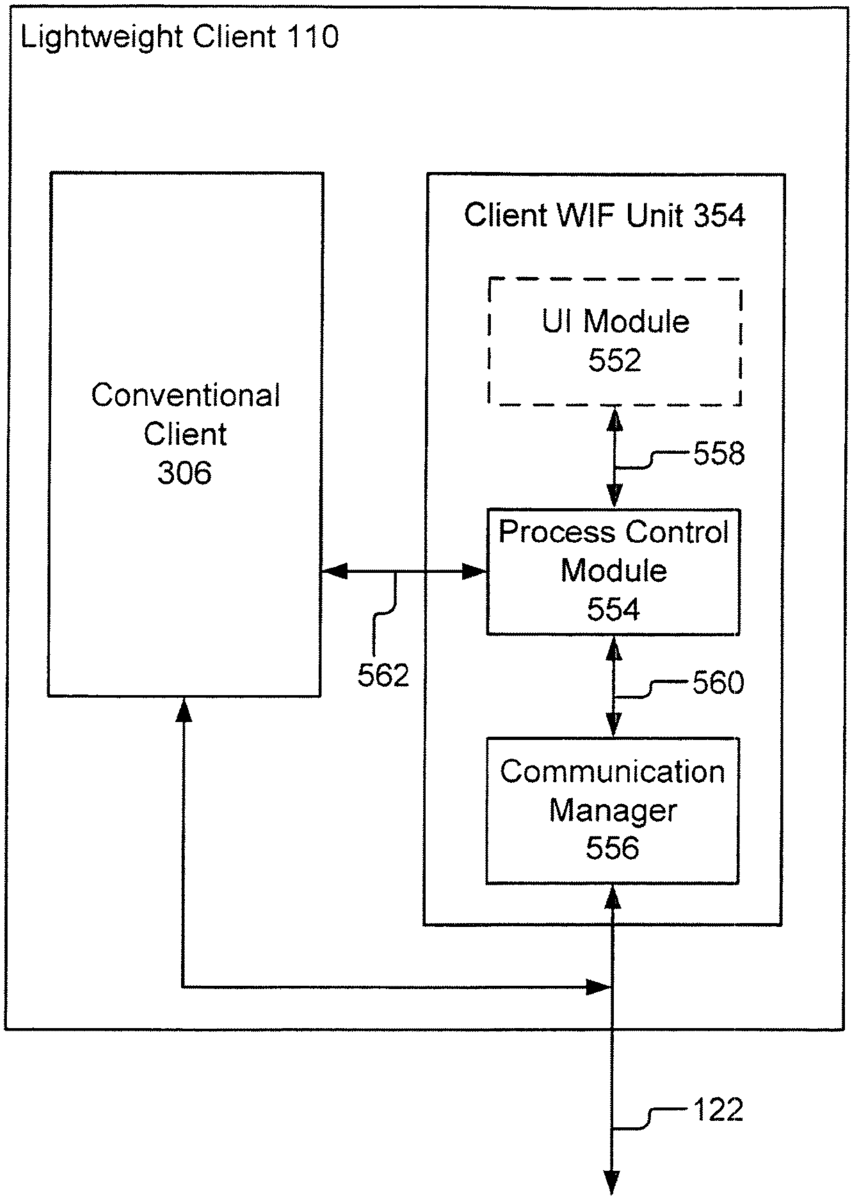
FIG. 5B is a block diagram of second embodiment of a workflow-enabled client in accordance with the present invention.

FIG. 5B shows a second embodiment of the lightweight client 110 in accordance with the present invention. The second embodiment of the lightweight client 110 includes the conventional client 306 and the client WIF unit 354 comprising a user interface module 552, a process control module 554 and a communication manager 556. The communication manager 556 is coupled to the network 104 by signal line 122. The process control module 554 is coupled to the communication manager 556 by signal line 560, to the user interface module 552 by signal line 558, and to the conventional client 306 by signal line 562. The user interface module 552 and the process control module for 554 have similar functionality to the user interface module 502 and the process control module 504, respectively, described above with reference to FIG. 5A. It should be noted that in this embodiment the client WIF unit 354 via communication manager 556 controls the communication between the lightweight client 110 and the workflow manager 108 using network 104. The communication manager 556 will be described in more detail below with reference to FIG. 7C. Another notable difference is that the process control module 554 performs actions necessary for proper interaction with the workflow module 108. The workflow-enabled client 106 also interacts with the conventional client 306 to receive and implement user configurations of the lightweight client 110.

Figure 5C:
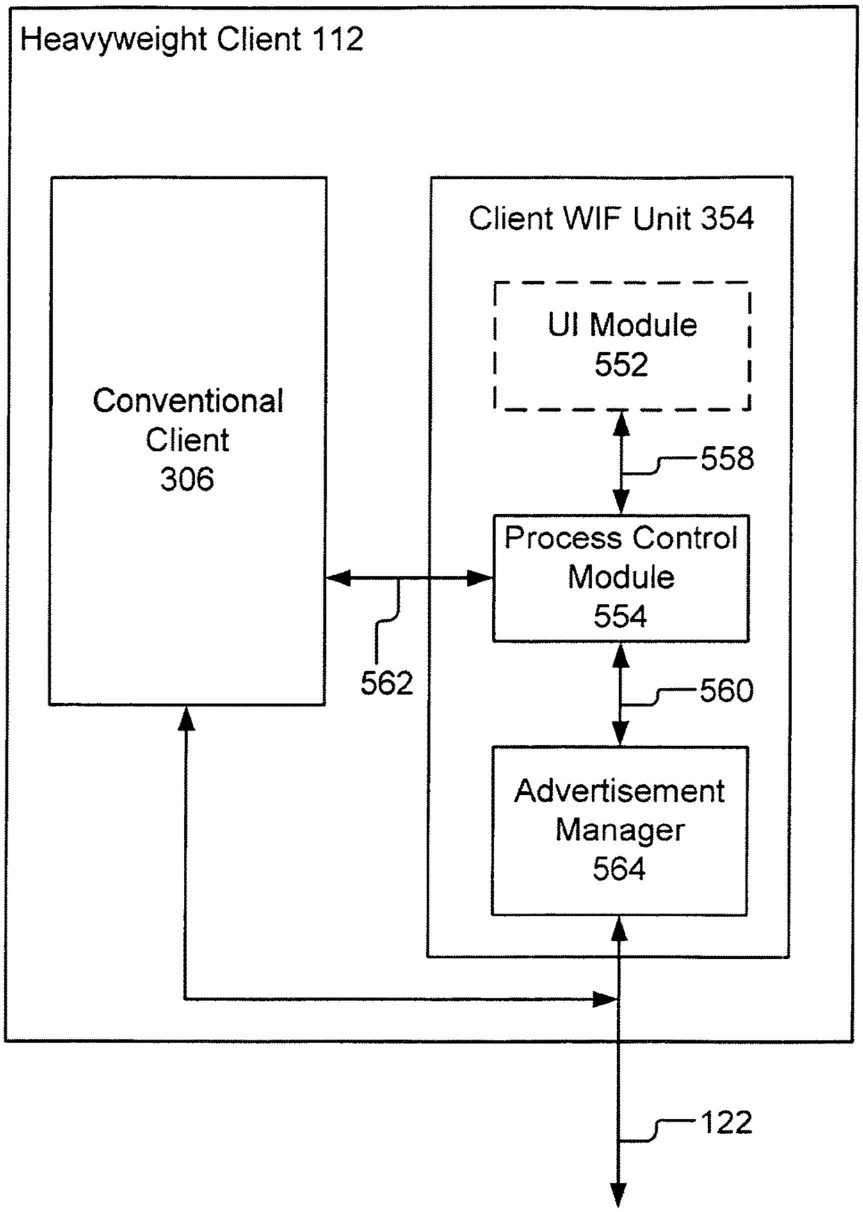
FIG. 5C is a block diagram of a third embodiment of a workflow-enabled client in accordance with the present invention.

FIG. 5C shows an embodiment of a heavyweight client 112 in accordance with the present invention. The heavyweight client 112 comprises many modules with the same or similar functionality to the lightweight client 100 such as the conventional client 306 and the client WIF unit 354 comprising a user interface module 552 and a process control module 554. However instead of the communication manager 556, the heavyweight client 112 has an advertisement manager 564. The advertisement manager 564 is coupled to the network 104 by signal line 122 and to the process control module by signal line 560. The advertisement manager 564 provides for communication with the conventional client 306 directly and also performs some of the function of the workflow manager 108 such as advertising and responding to requests. The advertisement manager 564 provides the advertising and request-handling services required for direct communication (communication without use of a workflow manager 108) with workflow-enabled providers 102. The eliminates the need for registration, as in most cases the advertisement manager 564 is not shared with other lightweight clients 110 or heavyweight clients 112 and is dedicated to a particular heavyweight client 112. In this embodiment, the process control module 554 communicates with the conventional client 306 using software library calls rather than using HTTP requests. As will be understood by those skilled in the art and with reference to FIG. 6, the advertisement manager 564 of the heavyweight client 112 also includes the functionality of the workflow manager 108 similar to the advertising module 608, the provider response module 612, the response data storage 614, the workflow processor 616, the workflow storage 618 and the security and logging module 620. This allows the heavyweight client 112 to interact with the workflow-enabled providers 102 in the same manner as the workflow-enabled client 106 of FIG. 1B.

Figure 6:
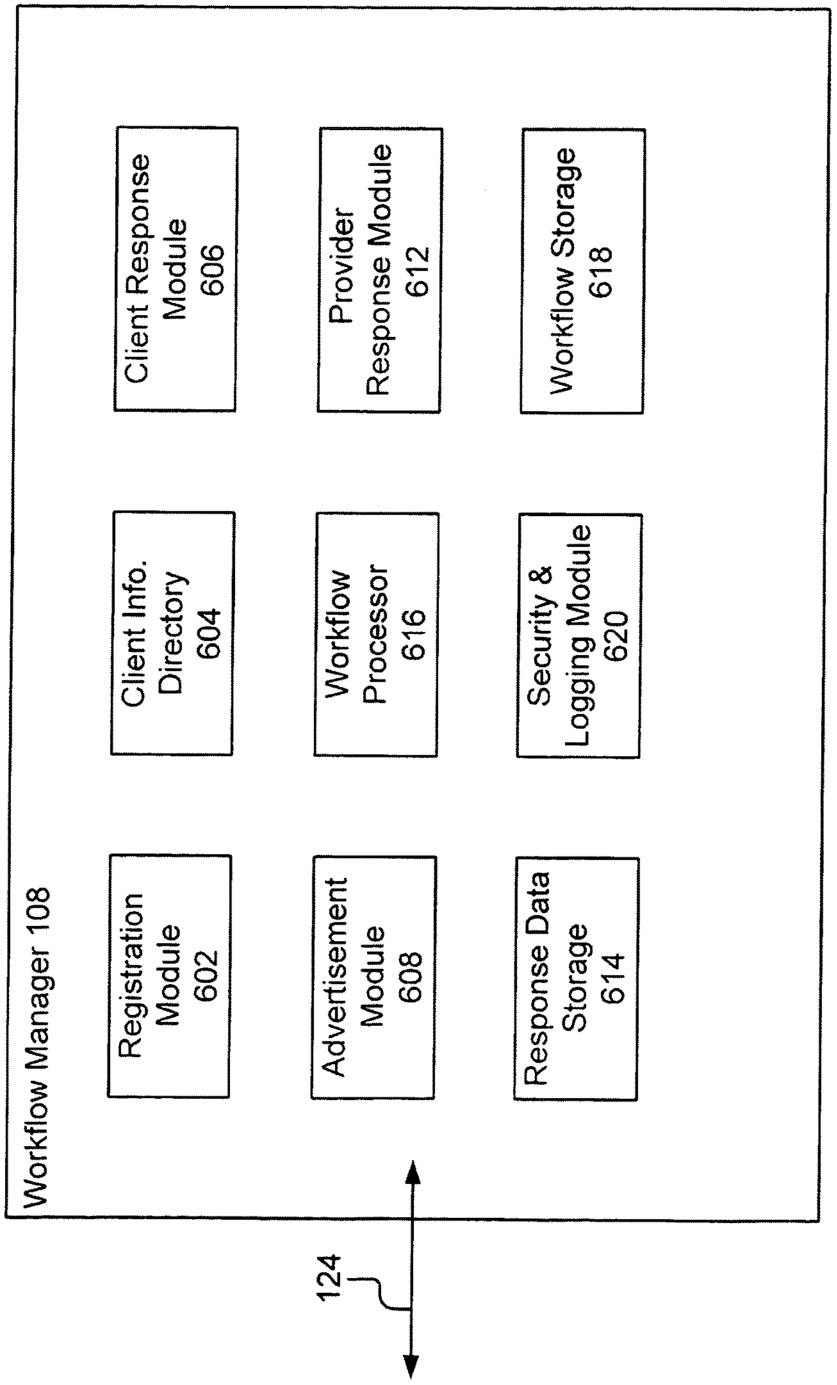
FIG. 6 is a block diagram of an embodiment of a workflow manager in accordance with the present invention.

FIG. 6 shows an embodiment of the workflow manager 108 in accordance with the present invention. The workflow manager 108 comprises a registration module 602, a client information directory 604, a client response module 606, an advertising module 608, a provider response module 612, response data storage 614, a workflow processor 616, workflow storage 618 and a security module 620. In one embodiment, the workflow manager 108 is a software library that implements the communications functions and manages a set of clients on behalf of a user. In another embodiment as described above with reference to FIG. 1B, the workflow manager 108 is software running on personal computer and adapted for communication with the lightweight client 110. In yet another embodiment, the workflow manager 108 is a HTTP server that responds to HTTP requests and advertises using a service discovery protocol such as DNS-based Service Discovery (DNS-SD), the Service Location Protocol (SLP), or Universal Plug and Play (UPnP). Specifically, the workflow manager 108 handles the communication between a workflow-enabled provider 102 and a lightweight client 110. The workflow manager 108 also manages and maintains information about workflow-enabled providers 102 and workflow-enabled clients 106. For example, in one embodiment, the workflow manager 108 keeps track of information about individual activations, including the IP address of the workflow-enabled providers 102 that requested the activation, as well as any information the workflow-enabled provider 102 may have supplied about alternate protocols it supports (e.g. for direct printing). For the workflow-enabled clients 106, the workflow manager 108 maintains a list of registered workflow-enabled clients 106 and depending on the setting may persistently advertise their availability. Finally, the workflow manager 108 also handles security and error recovery.

The registration module 602, the client information directory 604, the client response module 606, the response data storage 614, and the workflow processor 616 cooperate to enable communication between the workflow manager 108 and the lightweight client 110. In particular and as will be described below with reference to the methods of the present invention, these components enable: registration of the lightweight client 110 with the workflow manager 108, a location at which the workflow-enabled client 106 can retrieve data, responses to requests from the workflow-enabled client for information, and storage and management of client information for registered lightweight client 110.

The advertising module 608, the provider information directory 610, the provider response module 612, response data storage 614, and the workflow processor 616 cooperate to enable communication between the workflow manager 108 and the workflow-enabled provider 102. In particular and as will be described below with reference to the methods of the present invention, these components enable: advertisement of lightweight clients 110 to workflow-enabled providers 102, activation of lightweight clients 110, transmission of data and commands to the workflow-enabled providers 102, receipt and storage of data from the workflow-enabled providers 102, and storage and management of provider information for activated lightweight clients 110.

The registration module 602 is software and routines for registering a lightweight client 110. In response to a request for registration from a lightweight client 110, the workflow manager 108 registers it, then advertises the lightweight client 110 so that any workflow-enabled provider 102 that is able to perform the function or functions specified (such as scan or print) can discover the lightweight client 110. The workflow-enabled provider 102 then generates user interfaces that display the availability of the lightweight client 110 to the user of the workflow-enabled provider 102.

In one embodiment, upon receiving a register command, the registration module 602 assigns two IDs for this lightweight client 110, an internal one used by the lightweight client 110 to unregister the lightweight client 110 and to access scanned files and other data, and an external one used by a workflow-enabled provider 102 to activate the lightweight client 110. Both IDs should be unique within the context of the workflow manager 108, and the internal ID should not be guessable from the external ID. The registration module 602 then allocates a location identifier based upon the internal ID and sends it to the lightweight client 110. In one embodiment, the registration module 602 responds to the lightweight client 110 with an HTTP response having a Created (201) status code, with the Location response header set to an absolute URL of the form http://host:port/internal-ID/, where host and port are the workflow manager's own hostname and port. This will be the base URL for all future communications from the lightweight client 110 to the workflow manager 108. The location identifier, internal-ID, is used for retrieving information from the workflow manager 108. In the preferred embodiment, the workflow manager 108 does not require Basic or Digest Access Authentication on this URL.

In one embodiment, the request to register is in the form an HTTP request from the lightweight client 110 to the workflow manager 108. One example format for such requests is an HTTP POST request with any of the parameters in Table 1 below.

TABLE 1

| | |
|---|---|
| op (String): (required) | register |
| name (String): (required) | Human-readable name for workflow-enabled client 106, as it will appear on workflow-enabled provider 102 user interface. |
| formfile (File): | If specified, contains an activation form in a predefined form format. The content-type should be text/vnd.ricoh.odessa-form. If not specified, the workflow manager 108 uses a blank (zero length) form. |
| menu name (string): | Top level menu name under which label will appear. Default set as name of user running the workflow manager |
| persistent (Boolean): | If specified, continue advertising a workflow-enabled client 106 until it is unregister. Otherwise, stop advertising the workflow-enabled client 106 (and thus remove it from all workflow-enabled providers' 102 menus) after it has been successfully Activated. Non-persistent workflow-enabled client 106 can still access scanned data that has been POSTed for them until they unregister. Default is non-persistent (i.e., stop advertising after activation). |
| pin (String): | If set, users must first supply the given Personal Identification Number (password) before the workflow-enabled client 106 will activate. Default is no PIN required. A workflow-enabled client 106 may specify a non-numeric value as its PIN, but it is not advised as some workflow-enabled providers 102 only support numeric-keypad data entry. |
| printfile (File): | If specified, contains a file that should be sent to workflow-enabled provider 102 when the workflow-enabled client 106 is activated. |
| scandir (String): | If specified, indicates that a scan should be performed and scanned files should be placed in a directory of this name. This is a way for the lightweight client 110 to specify a scan without providing a formfile, and simply surrounds the specified string with curly braces and appends it to the (possibly empty) activation form. |
| +<device-requirement> (String) | Zero or more features that a workflow-enabled provider 102 must support to list this lightweight client 110 on its menu. Any entry with a name starting with "+" should be interpreted by the workflow manager 108 as a requirement and listed in the lightweight client's 110 advertisement. For example,<br>+print: the device supports printing.<br>+scan: the device supports scanning.<br>+print-dpi=<dpi>: the device supports printing at the given dots-per-inch (or range, if specified).<br>+scan-dpi=<dpi>: the device supports scanning at the given dots-per-inch (or range, if specified).<br>+print-color: the device supports color printing<br>+scan-color: the device supports color scanning<br>+print-duplex: the device supports duplex printing<br>+scan-duplex: the device supports duplex scanning |

Those skilled in the art will recognize that the parameters in Table 1 are just one example, and that various other parameters may be added according to the functionality provided by the workflow-enabled provider 102 and the lightweight client 110. The registration module 602 also stores the assigned names and other information related to the lightweight client 110 in the client information directory 604. For example, the two IDs for the lightweight client 110 and any file or data necessary to perform the tasks specified by the lightweight client 110 are stored it in the client information directory 604. The registration module 602 also uploads data or files from the client that will later be used by the workflow-enabled provider 102. For example, lightweight clients 110 that print a file when activated include the file to be printed as the printfile parameter, and should encode the request as multipart/form-data. The print file should be in either a format that the print device, i.e. the workflow-enabled provider 102, can support, or in a format that the workflow manager 108 can translate into a format supported by the workflow-enabled provider 102. The print file's content type (format) should be specified in the content-disposition header for that file's form part in the HTTP POST request for the registration. The lightweight client 110 may optionally also specify a filename. The file to be printed and its content type are saved by the workflow manager 108 in the response data storage, and will later be sent to any workflow-enabled provider 102 that activates the lightweight client 110 as a response to the Activate command request. The registration module 602 also handles requests to unregister the lightweight client 110 by removing the lightweight client 110 and its associated data from the client information directory 604 and the advertisement module 608.

The client information directory 604 is a memory or storage area for storing information about registered lightweight clients 110. The memory is of a conventional type such as a portion of the working memory allocated for use by the workflow processor 616, or storage on magnetic media such as a hard drive.

The client response module 606 is software and routines for responding to retrieval requests from the lightweight client 110. If the lightweight client 110 expects data from its execution by the workflow-enabled provider 102, the workflow manager 108 will have received and stored the data in the response data storage 614. The client response module 606 is responsive to requests for data from the lightweight client 110 at the provided location. The client response module 606 receives and processes these requests and generates responses that include either an indication of data not available or the data itself. The client response module 606 is adapted for communication with the lightweight client 110 and the response data storage 614.

The advertising module 608 is software and routines for advertising a lightweight client 110. In one embodiment, the advertising module 608 advertises the presence of registered lightweight clients 110 on a local network using DNS-based Service Discovery (DNS-SD), a service discovery component of Bonjour (more generically known as Zeroconf). The advertising module 608 creates and transmits advertisements. For example, the advertisement specifies a user name and a client name under which a client should be listed, as well as a unique identifier by which a workflow-enabled provider 102 can specify the client and any functions the client requires listing providers to support. The workflow-enabled providers 102 on the local network listen for these advertisements. When a workflow-enabled provider 102 supports a function requested by a workflow-enabled client 106, the workflow-enabled provider 102 adds the workflow-enabled client 106 to its user interface menu. The advertising module 608 is responsible for broadcasting the advertisements as a service over DNS-SD on the network 104. The use of DNS-SD allows the advertising module 608 to dynamically select a locally-unique name and advertise that name to others on the same local subnet. In one embodiment, the host and port number for the advertised service will again be the same as the workflow manager's 108 but the path (as specified in the new service's DNS TXT record) will be the lightweight client's 110 unique external ID preceded and followed by a "/". The resulting URL (http://host:port/external-id/) is the base URL that the workflow-enabled providers 102 use to activate the lightweight client 110, and will require Basic or Digest Access Authentication if a PIN is required. Depending on the registration parameters, the advertising module 608 may persistently advertise the workflow-enabled client 106 or terminate its advertisement after the associated lightweight client 110 has been activated.

In one embodiment, the advertisement of a particular lightweight client 110 includes the transmission of a DNS-SD advertisement reserving a Top-Level User/Menu Name and a DNS-SD advertisement of the service. The first advertisement serves the purpose of reserving a top-level user/menu name under which one or more workflow-enabled clients 106 are listed on workflow-enabled providers 102. This ensures two distinct workflow managers 108 do not list clients under the same menu name, for example if two users happened to share the same name. The second advertisement advertises the workflow-enabled client 106 itself, and is the advertisement listened for by workflow-enabled providers 102. These messages have example format as shown in Tables 2 and 3 below.

TABLE 2

| Top-Level User/Menu Name Advertisement | Description |
|---|---|
| Service Instance Name = | Unique Service Instance Name advertised as a DNS SRV record and taking the form “<Instance>.<Service>.<Domain>”. |
| <Instance> . | The <Instance> part of the Service Instance Name should be the menu name under which the user's workflow-enabled client 106 should appear. |
| <Service> . | The <Service> specifies the protocol name, followed by either “._tcp” or “._udp”. In one embodiment, this is the string “_odessa-widget._tcp”. |
| <Domain> | The <Domain> may be any appropriate DNS domain, though most applications will use “.local.” to indicate link-local Multicast DNS.<br>For example, the Service Instance Name reserving a Top-Level User/Menu Name for all of Bob Smith's workflow-enabled clients 106 might be: Bob Smith._odessa-widget._tcp.local.. |

TABLE 3

| Client Service Advertisement | Description |
|---|---|
| Service Instance Name = | Unique Service Instance Name advertising DNS SRV record representing a workflow-enabled client 106 and taking the form “<Instance>.<Service>.<Domain>”. |
| <Instance> . | The <Instance> part of the workflow-enabled client's 106 Service Instance Name should consist of both a top-level menu name and the workflow-enabled client's 106 name. The two names should be separated by the pipe symbol “\|” (US-ASCII 124). |
| <Service> . | As before, the <Service> part of the Service Instance Name should be “_odessa-widget._tcp” |
| <Domain> | The <Domain> will typically be “.local.”.<br>For example, if Bob Smith had a workflow-enabled client 106 called “Scan To Me” it would be registered as:<br>Bob Smith\|Scan To Me._odessa-widget._tcp.local. |
| TXT record | The TXT record for an advertisement of a workflow-enabled client 106 may contain the following name/value pairs:<br>txtvers: (required) version number of the TXT-record specification being used to create this TXT record. Workflow-enabled devices 102 will ignore workflow-enabled clients 106 that list a version number they do not know how to support. Currently, the only valid value is 1.0. This should be the first name/value pair listed in the TXT record.<br>protovers: (required) version number of the workflow protocol specification supported. Currently the only legal value is 1.0. This should be the second name/value pair listed in the TXT record.<br>path: the path part of the URL which workflow- |

TABLE 3-continued

| Client Service Advertisement | Description |
|---|---|
| | enabled providers 102 should use to contact the workflow-enabled client 106. If path is omitted, “/” is assumed. Paths are typically used by workflow manager 108 to provide a unique URL for multiple workflow-enabled clients 106 that are serviced on the same host and port. Paths should start and end with a “/”.<br>+<device-requirement>: a feature that a workflow-enabled provider 102 must support to list this workflow-enabled client 106 on its menu. Any entry with a name starting with “+” should be interpreted as a requirement. Since the number of features that a workflow-enabled client 106 might want to require is potentially limitless, the list of legal requirements and their values is deliberately open-ended. Requirement names may not be listed more than once, and must printable US-ASCII (0x20-0x7E), excluding the “=” symbol (0x3D). Though values will usually be textual, they may be arbitrary binary data. If a workflow-enabled provider 102 device sees an advertisement that lists a requirement it does not recognize, the workflow-enabled provider 102 should not list that workflow-enabled client 106 on its menu. (Note that this differs from section 6.2 of the DNS-SD specification, which recommends silently ignoring unknown TXT record attributes.) The following requirements are currently defined<br>+print: the device supports printing.<br>+scan: the device supports scanning.<br>+print-dpi=<dpi>: the device supports printing at the given dots-per-inch (or range, if specified).<br>+scan-dpi=<dpi>: the device supports scanning at the given dots-per-inch (or range, if specified).<br>+print-color: the device supports color printing<br>+scan-color: the device supports color scanning<br>+print-duplex: the device supports duplex printing<br>+scan-duplex: the device supports duplex scanning |

The provider response module 612 is software and routines for listening for requests from workflow-enabled providers 102 and responding to them. The provider response module 612 also handles requests subsequent to the activation. In one embodiment, the provider response module 612 listens for HTTP requests from workflow-enabled providers 102 for activation of a registered workflow-enabled client 106. In one embodiment, the provider response module 612 monitors for a first command, the “Hello” command. In another embodiment, the provider response module 612 also determines whether authorization (credentials from the workflow-enabled providers 102) or a PIN is required to activate this workflow-enabled client 106, or validate a PIN that has already been entered. When no PIN is required or when the appropriate authorization is supplied the provider response module 612 interacts with the workflow-enabled provider 102 by generating and sending HTTP responses to implement the task prescribed by the lightweight client 110. Examples of these generated responses are described below in conjunction with the description of the methods of the present invention. When a PIN is required and the Hello command includes no PIN or an invalid PIN, the provider response module 612 responds that the request is Unauthorized, indicating that the workflow-enabled provider 102 should request a valid PIN from the user and repeat the Hello command with the supplied PIN included. In one embodiment, PIN validation and the response that a valid PIN is required follow the HTTP Authentication method as described in the RFC 2617 Internet standard. The provider response module 612 also monitors for a second command, the "Activation" command. In response to this second command, the provider response module 612 stores files and data received as part of requests from the workflow-enabled provider 102 in the response data storage 614 for later delivery to the lightweight client 110. The provider response module 612 may also includes files or data in the responses sent to the workflow-enabled provider 102. For example, a response generated by the provider response module 612 in response to a Hello command can include an activation form that contains text to be displayed along with UI elements that allow the user to submit information back to the provider response module 612 as part of the Activate command request. The form is also used to specify any scan(s) that should be included with the Activate command request. The values entered via those UI elements and any scan data generated will then be sent to the provider response module 612 as a part of the Activate command request. This data will then be made available to the workflow-enabled client 106 by the client response module 606, as described in detail below. The response generated by the provider response module 612 can include other files or data such as for output by the workflow-enabled providers 102. As another example, a response generated by the provider response module 612 in response to an Activate command can include a file that should be printed by the workflow-enabled provider 102. The response generated by the provider response module 612 can be: 1) a response with a file, 2) a response with no data, 3) a response with an address from which to retrieve a file, 4) a response that a valid PIN must be supplied, or 5) a response that some other error condition occurred.

The response data storage 614 is a memory or storage area for storing information received from the workflow-enabled providers 102. The response data storage 614 stores data until it is delivered to the recipient lightweight client 110. The memory is of a conventional type such as a portion of the working memory allocated for use by the workflow processor 616 or magnetic memory such as a hard drive. In an alternate embodiment, scanned files, the workflow-enabled client's own print file, and other form data are made available by the workflow manager 108 in the form of files and subdirectories off of the lightweight client's 110 URI in the client information directory 604. If a printfile was specified by the lightweight client 110 during registration, that file will appear in the base workflow-enabled client URI with the filename specified in the registration request. All information generated during a single activation is made available to the lightweight client 110 from a subdirectory off of the workflow-enabled client's base widget-URI, with the name of the subdirectory of the form yyyyMMdd'T'HHmmss'Z'.a.b.c.d, where yyyyMMdd'T'HHmmss'Z' is the timestamp for when the activation occurred (in Internet Time Format, except with the punctuation removed) and a.b.c.d is the in IP address of the workflow-enabled provider 102 that performed the activation. Scanned files appear in their own scan subsubdirectories, and have the same name as the field name specified in the activation form. If multiple files were produced by a single scan, as might be the case for a multi-page document, multiple files will be placed in this scan directory. The original filenames and content types provided by the workflow-enabled provider 102 should be preserved if possible. If the activating workflow-enabled provider 102 specified any alternative protocols it supports (e.g. IPP or LPD) then the URL(s) for accessing the workflow-enabled provider 102 via those protocols will appear in the file alt.uri within the activation sub-directory. The file will be of type text/uri-list, which simply consists of one or more URIs separated by CRLF. The response data storage 614 may also store information used to track which workflow-enabled providers 102 currently have been activated for which lightweight clients 110.

The workflow processor 616 is a controller for controlling the operations of the workflow manager 108. The workflow processor 616 controls the operation of the other components of the workflow manager 108, and in some cases executes the routines to provide the functionality described herein. The workflow processor 616 may be a processor of a conventional type if hardware or a master control program if software.

In a special case of direct printing, the workflow processor 616 of the present invention enables the workflow manager 108 to print a file directly to a workflow-enabled provider 102 which has previously activated a particular lightweight client 110. The workflow manager 108 will print (or otherwise output) the specified file to the workflow-enabled provider 102 that performed the activation indicated in the URL. If necessary, the workflow manager 108 will attempt to convert the file to a format understood by the workflow-enabled provider 102 (for example, from PostScript to PCL). The workflow manager 108 receives a POST request to URL: http://host:port/internal-ID/yyyyMMdd'T'HHmmss'Z'.X.X.X.X/ with one or more paramters: 1) op: (required) should be print, 2) printfile: (required) the file the lightweight client 110 wishes to print to this workflow-enabled provider 102. This should generate a response from the workflow processor 616 that returns: OK (200) if successful, Unsupported Media Type (415) if print file's format cannot be converted by the workflow manager 108 to one the workflow-enabled provider 102 understands or if the workflow-enabled provider 102 cannot support any kind of print function, or Not Found (404) if the specified URL is unknown.

The workflow storage 618 is memory or storage for storing lightweight clients 110. In one embodiment as described below with reference to FIG. 14, the workflow-enabled clients 106 are downloadable for use on any computing device. Since the workflow manager 108 in one embodiment is a server connected to the Internet, this workflow storage 618 may be accessed by any user wanting to implement a particular workflow-enabled client 106. The workflow storage 618 preferably stores a library of different workflow-enabled clients 106 for providing any number of tasks related to printing, scanning, image processing, or document processing. Those skilled in the art will recognize that even though only a few particular workflow-enabled clients 106 are described in the following description, developers may create any number of workflow-enabled clients 106 to achieve any variety of office tasks. It should also be noted that workflow-enabled clients can also be obtained by means completely separate from the workflow manager 108, including but not limited to download or purchase from online or retail stores or written by end-users or in-house IT departments using a wide variety of programming languages.

The security and logging module 620 is software and routines for performing security and logging functions related to any execution of a registered lightweight client 110. In one embodiment, the security logging module 620 generates and maintains logs of transactions performed by this workflow manager 108. In one embodiment, the security logging module 620 maintains a log where each log entry consists of a description of an event plus a cryptographic hash of the previous entry in the log. In one embodiment, the security logging module 620 uses a method as disclosed in co-pending U.S. patent Ser. No. 10/887,998, filed on Jul. 9, 2004 and titled "Synchronizing Distributed Work Through Document Logging," which is incorporated by reference in its entirety. In yet another embodiment, the workflow-enabled provider 102 and workflow manager 108 each have their own logging and each sends or receives data and generates a log entry consisting of: 1) The hash (ID) of any data sent or received 2) The hash (ID) of the previous log entry, and the log entry is sent as part of the communication (used for "entangling" and synchronizing logs).

Communication Module

Figure 7A:
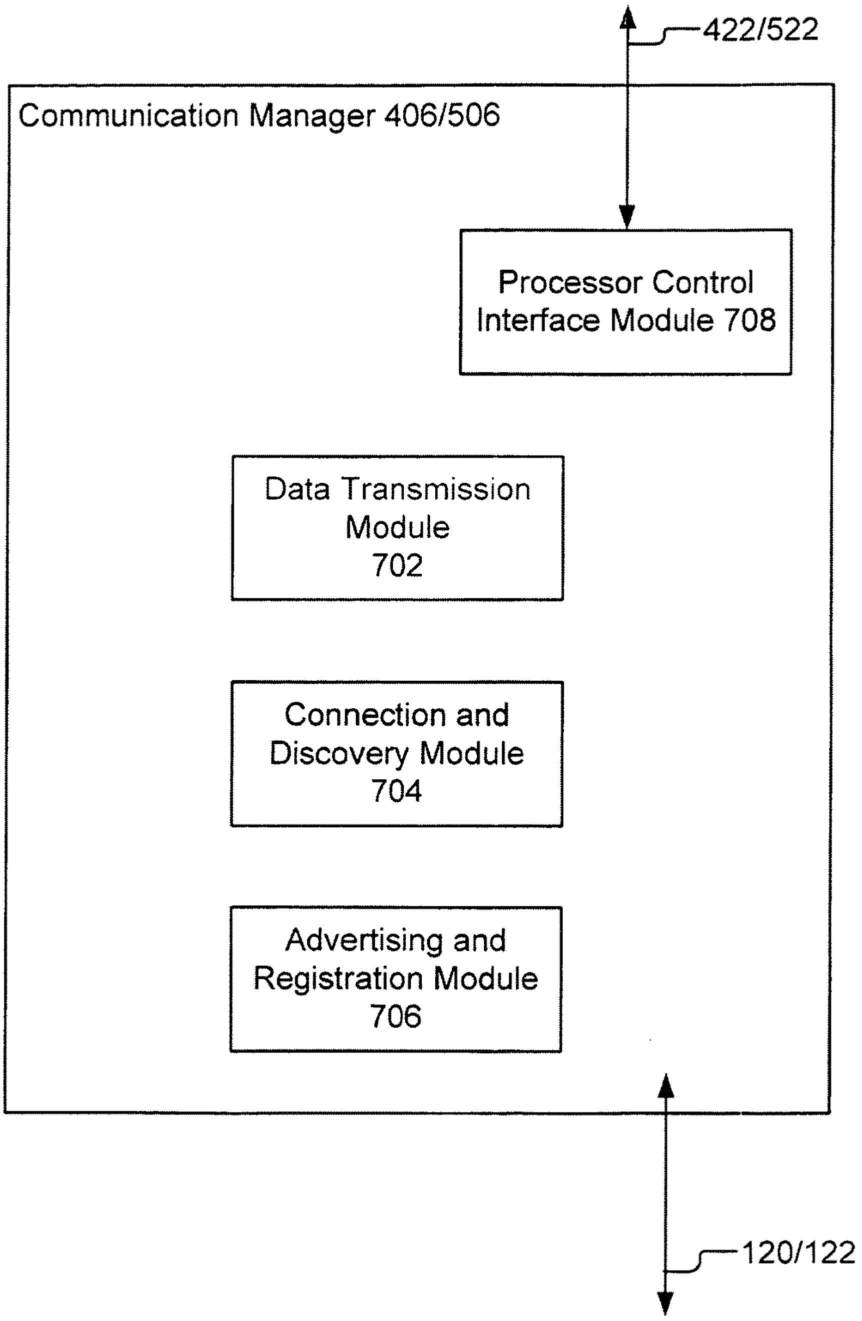
FIG. 7A is a block diagram of a first embodiment of a communication manager in accordance with the present invention.

Referring now to FIG. 7A, a first embodiment of the communication manager 406/506 in accordance with the present invention is shown. The communication manager 406/506 will generally be referred to below as communication manager 406 but it should be understood that communication manager 506 has similar functionality but for the workflow-enabled client 106. The communication manager 406 is coupled to signal lines 422 and 120 for communication with other components as has been described above. In one embodiment, the communication manager 406 includes a data transmission module 702, a connection and discovery module 704, and advertising and registration module 706 and a processor control interface module 708.

The data transmission module 702 is adapted for communication with the processor control interface module 708 and other communication managers (not shown) via signal line 120. The data transmission module 702 sends and receives messages and data to and from other communication managers. In one embodiment, the data transmission module 702 uses a predefined protocol for communication with other communication managers. This provides a basic framework for any workflow-enabled provider 102 or workflow-enabled client 106 in the distributed workflow-enabled system 100 communicate with each other. The data transmission module 702 translates the messages and data into commands and data understandable by the process control module 404 and then sends them to the process control module 404. The data transmission module 702 communicates with the process control module 404 via the processor control interface module 708.

The connection and discovery module 704 is also adapted for communication with the processor control interface module 708 and other communication managers via signal line 120. The connection and discovery module 704 is responsible for discovering new workflow-enabled providers 102 that have joined the network 104 and for establishing a connection with them. In an alternate embodiment, the connection and discovery module 704 may also discover and establish connections with other workflow-enabled clients 106 connected to the network 104. When a new workflow-enabled provider 102 connects to the network 104, it transmits a heartbeat signal identifying that it is new to the network 104. Additionally once connected, workflow-enabled providers 102 may periodically transmit a signal that the connection and discovery module 704 uses to validate that the workflow-enabled provider 102 is still connected to the network 104. The connection and discovery module 704 monitors for such heartbeat signals. Upon detection of a heartbeat signal, the connection and discovery module 704 establishes a connection with the new workflow-enabled provider 102. In order to establish a connection, the connection and discovery module 704 exchanges identification and communication protocol information with the new workflow-enabled provider 102. In one embodiment, the connection and discovery module 704 maintains a list of workflow-enabled providers 102 available to provide services.

Once a communication link has been established between a workflow-enabled provider 102 and the communication manager 406, the advertising and registration module 706 is activated. The advertising and registration module 706 is also adapted for communication with the processor control interface module 708 and other communication managers via signal line 120. As has been noted above, each workflow-enabled provider 102 may have different capabilities. For example, a first workflow-enabled provider 102 does not have a graphical display and is only able to print; a second workflow-enabled provider 102 is able to scan and print and has a graphical display; and a third workflow-enabled provider 102 only has the ability to transmit documents. The advertising and registration module 706 processes advertising information and registers with workflow-enabled providers 102 for services they provide. In one embodiment, the workflow-enabled providers 102 will advertise the services they are capable of providing by periodically sending messages over the network 104. In an alternate embodiment, the advertising and registration module 706 can request information about the services a particular workflow-enabled provider 102 can provide. The advertising and registration module 706 processes advertising messages transmitted by workflow-enabled providers 102. Depending on the defaults set for the communication manager 406, the advertising and registration module 706 may immediately register for services once they have been advertised or alternatively register for a service once a request for particular service has been received from the process control module 404. In yet another embodiment, the advertising and registration module 706 registers for service to pending on the routines and processes that are available for execution by the process control module 404. The registration module 706 performs registration by exchanging information with the workflow-enabled provider 102 such that the functionality provided by the workflow-enabled provider 102 is identified and the commands and data structure for utilization of such services are operational on the data transmission module 702. In yet another embodiment, the advertising and registration module 706 de-registers a workflow-enabled client 106 such as when the client disconnects from the network 104.

The processor control interface module 708 provides an interface to the process control module 404. The processor control interface module 708 receives data and control signals from the data transmission module 702, the connection and discovery module 704, and the advertising and registration module 706 and provides a communication link to the process control module 404.

Figure 7B:
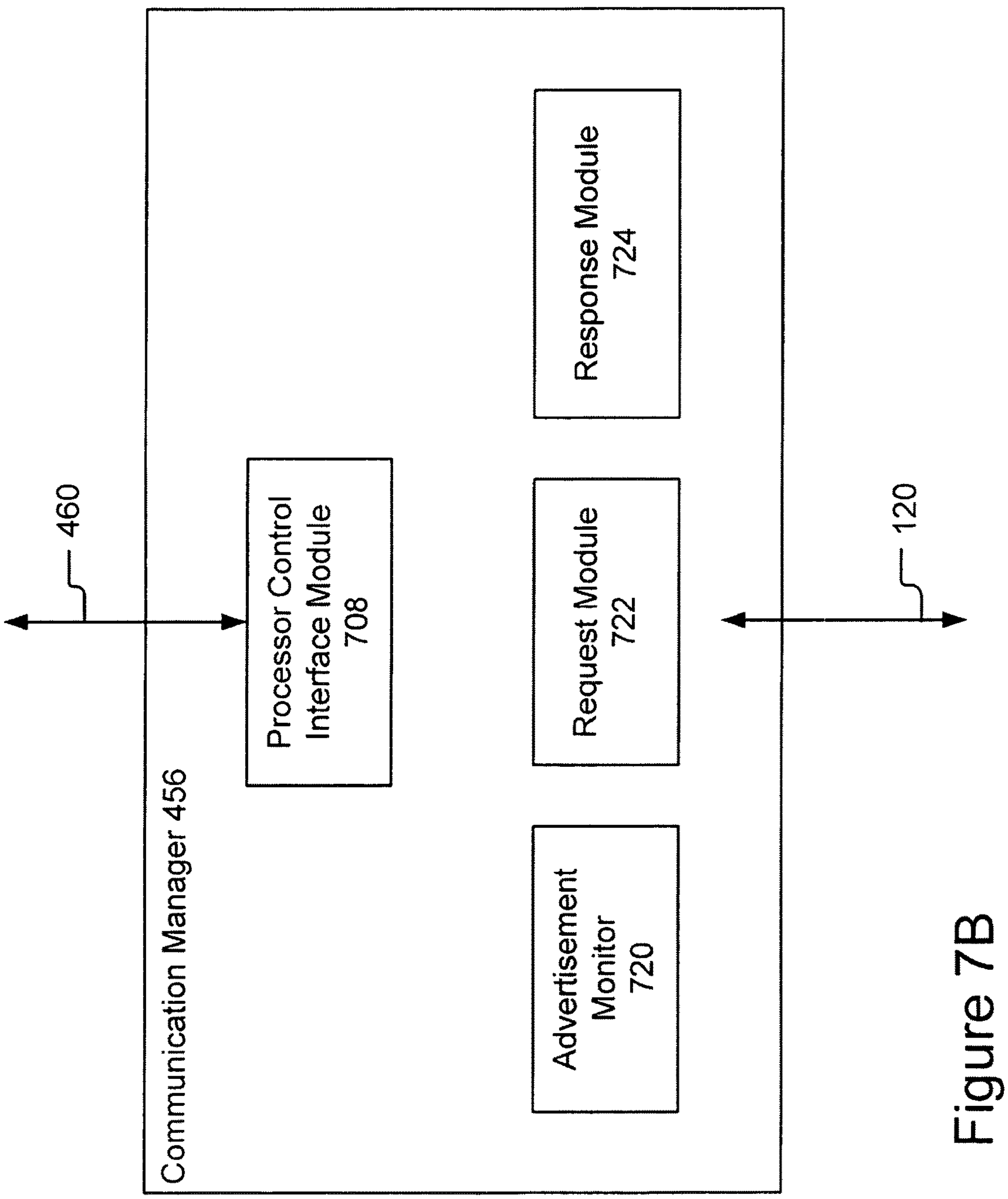
FIG. 7B is a block diagram of a second embodiment of a communication manager in accordance with the present invention.

Referring now to FIG. 7B, as well as FIGS. 4B and 6, a second embodiment of the communication manager 456 will be described. The second embodiment of the communication manager 456 enables the communication between the WIF Unit 352 of the workflow-enabled provider 102 and the workflow manager 108. The communication manager 456 includes a processor control interface module 708, an advertisement monitor 720, a request module 722 and a response module 724. As has been described above, the workflow-enabled provider 102 monitors for advertisements of workflow-enabled clients 106, activates workflow-enabled client 106, and in some cases, delivers files or information to the workflow manager 108 for subsequent delivery to the lightweight client 110. The communication manager 456 includes the above identified components to support this communication functionality.

In particular, the advertisement monitor 720 is software and routines for listening for advertisements of workflow-enabled clients 106 and heavyweight clients 112 on the network 104. The advertisement monitor 720 receives and processes advertisements output by the advertisement module 608 of the workflow manager 108 or advertisement manager 564 of the heavyweight client 112. In one embodiment, the advertisement monitor 720 sends received advertisements to the processor control interface module 708 for additional processing by the process control module 454 of the WIF Unit 352. In response to a received advertisement, the process control module 454 determines whether the workflow-enabled provider 102 has the requisite functionality to provide the services requested by the workflow-enabled client 106. In one embodiment, the process control module 454 maintains a list of registered workflow-enabled clients 106 that can be activated. Additionally, the process control module 454 may also generate and display a user interface particular to those registered workflow-enabled clients 106 whose requirements can be filled.

The request module 722 of the communication manager 456 cooperates with the processor control module 454 to activate registered workflow-enabled clients 106 and provide additional data and commands to the provider response module 612 of the workflow manager 108 and advertisement manager 564 of heavyweight clients 112. For example, in response to user input received at the workflow-enabled provider 102, the request module 722 generates and sends an activation request to the workflow manager 108. In one embodiment, the requests are HTTP requests. The request module 722 can also generate and send requests that include authorization information such as a personal identification number, and/or files that are the results of processing at the workflow-enabled provider 102 as prescribed by the selected workflow-enabled client 106. The request module 722 is adapted for communication over the network 104.

The response module 724 of the communication manager 456 cooperates with the processor control module 454 to receive and process responses received from the workflow manager 108 or heavyweight client 112. For example, the workflow manager 108 may send a response to a request received from the request module 722. In one embodiment, the responses are HTTP responses. That response is transmitted over the network and received by response module 724. The response module 724 processes that response, for example, by extracting data and/or commands and providing the data and commands to the processor control interface module 708 for delivery to the processor control module 454. The responses may be simple commands such as to update the user interface, to request a PIN from the user, or may be a file that is needed for processing by the processor control module 454, or printed by the workflow-enabled provider 102. The response module 724 is adapted for communication over the network 104.

Figure 7C:
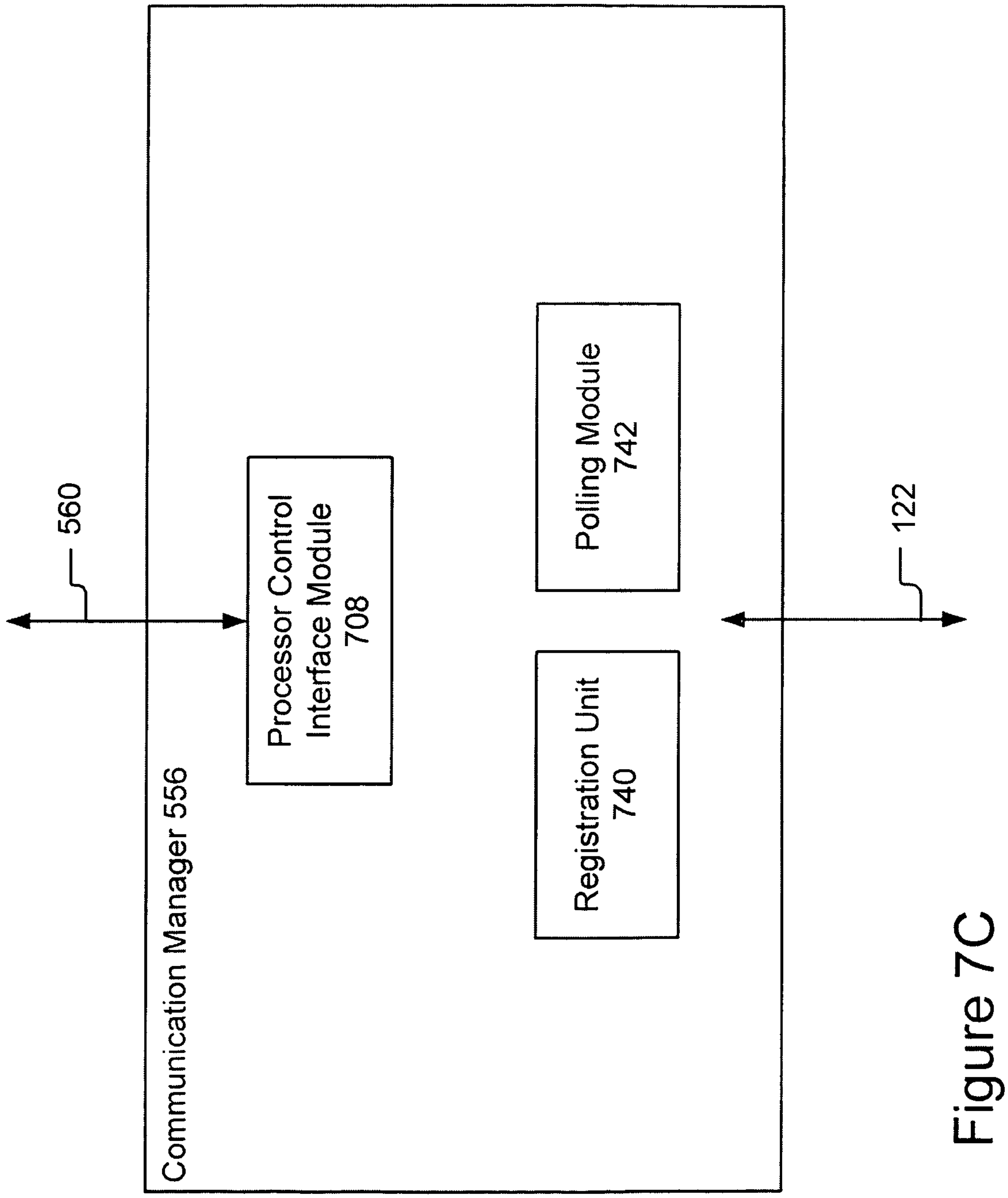
FIG. 7C is a block diagram of a third embodiment of a communication manager in accordance with the present invention.

Referring now to FIG. 7C, as well as FIGS. 5B and 6, a third embodiment of the communication manager 556 will be described. The third embodiment of the communication manager 556 enables the communication between the WIF Unit 354 of the lightweight client 110 and the workflow manager 108. The communication manager 556 includes a processor control interface module 708, a registration unit 740 and a polling module 742. As has been described above, the lightweight client 110 must register with the workflow manager 108, and in some cases must retrieve data from the workflow manager 108. The registration unit 740 and the polling module 742 provide this functionality.

The registration unit 740 is software and routines for interacting with the registration module 602 of the workflow manager 108. The registration unit 740 generates and sends a register command to the registration module 602 of the workflow manager. In one embodiment, the register command is an HTTP request that includes pertinent information about the lightweight client 110. For example, the HTTP request can include the name of the lightweight client 110, a username, a top-level menu name, a list of services that the workflow-enabled provider 102 must be able to provide, a service (e.g., a scan request, a fax request, a print request, etc.), optional parameters that should be used by the provider when executing the service (e.g., scan resolution), text or other UI elements to be displayed by a workflow-enabled provider on which the client has been selected, a persistence Boolean, authorization information, print data, a location of print data, and data or information needed for execution of the lightweight client 110. For example, if the task performed by the lightweight client 110 is a print news operation, the HTTP request includes a file that contains the news to be printed when the client is activated. In response, the registration unit 740 also receives from the workflow manager 108 a location (for example, a URL) for retrieving information and later un-registration. The registration unit 740 provides the location to the polling module 742 for actual use.

The polling module 742 is software and routines for retrieving information from the workflow manager 108. The polling module 742 is adapted for communication with the client response module 606 of the workflow manager 108. The polling module 742 uses the location from the registration unit 740 and sends requests to that address. In one embodiment, the polling module 742 generates and sends requests to the location on a periodic basis. In one embodiment, the workflow manager 108 maintains a directory and subdirectory of files in the client information directory 604. The results of any processing by the workflow-enabled provider 102 are stored in such directories. For example, if multiple files were produced by a single scan, as might be the case for a multi-page document, multiple files will be placed in this scan directory. The original filenames and content types provided by the workflow-enabled provider 102 are preserved if possible. Workflow-enabled clients 106 that are expecting data, poll their workflow-enabled client-URI to see if any new subdirectories have been created since their last poll, and retrieve any new files found. In one embodiment, the polling module 742 uses the If-Modified-Since HTTP request header to limit traffic generated from polling.

Process Control Modules

Figure 8A:
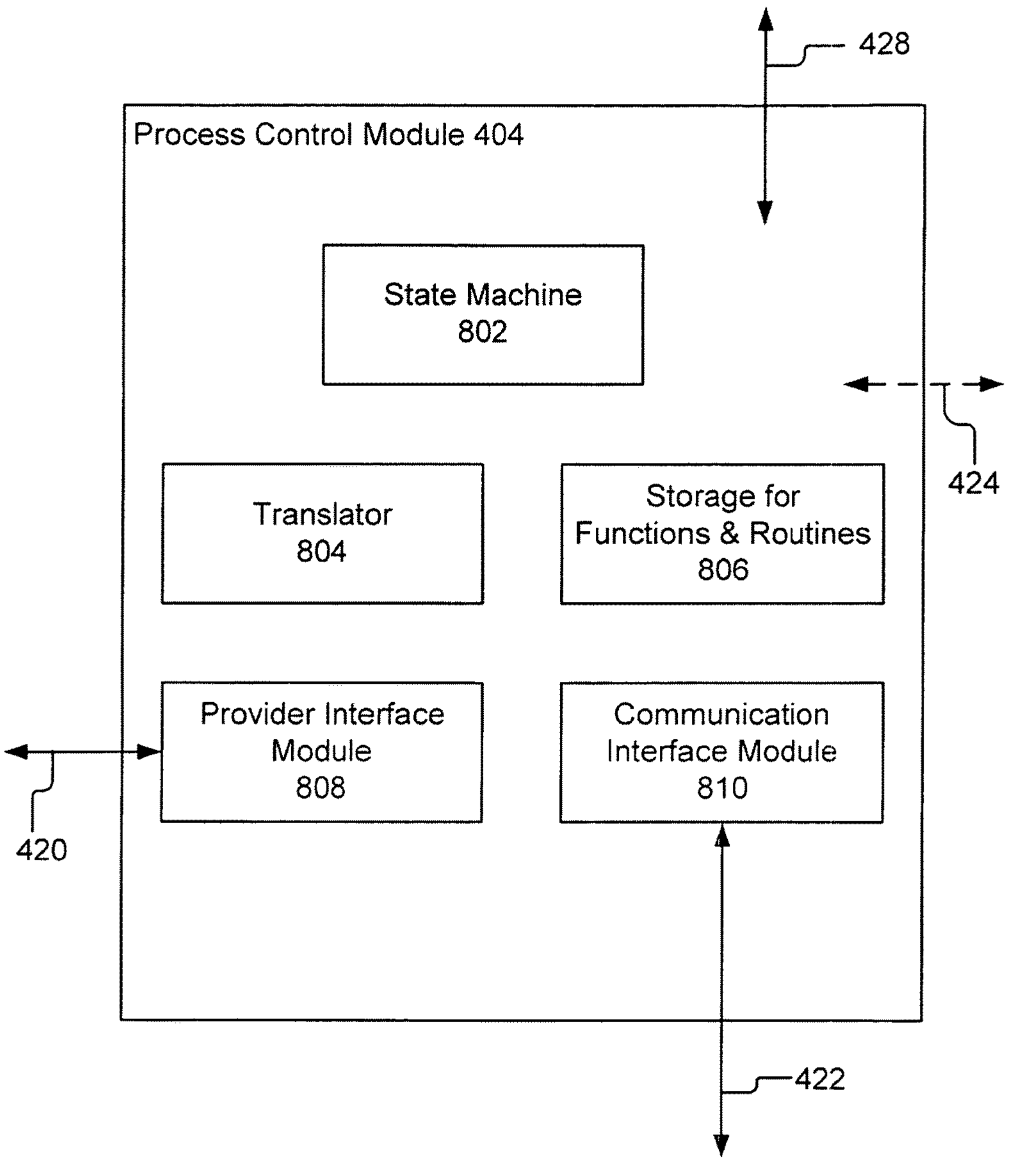
FIG. 8A is a block diagram of an embodiment of a process control module for a provider in accordance with the present invention.

Referring now to FIG. 8A, an embodiment of the process control module 404 for a workflow-enabled provider 102 in accordance with the present invention is shown. The process control module 404 comprises a state machine 802, a translator 804, storage 806 for functions and routines, a provider interface module 808 and a communication interface module 810.

The state machine 802 is adapted for communication with the translator 804, the storage 806, the provider interface module 808 and the communication interface module 810. The state machine 802 controls the overall operation of the process control module 404. In one embodiment, the state machine 802 includes three states. In a first state, the state machine 802 receives input. The input can be either from the provider interface module 808 or the communication interface module 810. In a second state, the state machine 802 processes the input. The state machine 802 is coupled to the storage 806 that includes a variety of functions or routines executable by the state machine 802. In response to the input, the state machine 802 selects and performs one of the functions or routines from the storage 806 using data received from the provider interface module 808 and the communication interface module 810. In one embodiment, the functions and routines in the storage 806 correspond to services advertised by the workflow-enabled provider 102. For example for an MFP, the state machine 802 may be able to execute routines such as print, copy, scan, display user interface, or combinations thereof, etc. In a third state, the state machine 802 sends the output of its processing. The output can be directed to the conventional provider 302, the communication manager 406, the translator 804 or an external device via signal on 424. The state machine 802 also communicates via signal line 428 with the user interface module 402 to generate user interfaces. These user interfaces are in turn sent by the state machine 802 such that they are displayed by the conventional provider 302. The state machine 802 classifies and presents user interfaces responsive to the instructions received from workflow-enabled clients 106. For example, the state machine 802 identifies users and corresponding functions/routines and presents a user interface that shows an association between a particular user and routines that user may execute using the workflow-enabled provider 102.

The translator 804 is software or routines for translating the output of the state machine 802 to a format understandable to the conventional provider 302. For example, the translator 804 converts the output of the state machine 802 to corresponding instructions and functionality consistent with an application interface for the conventional provider 302. The translator 804 also translates feedback control signals and other information from the conventional provider 302 into a format usable by the state machine 802. The translator 804 is coupled adapted for communication with the provider interface module 808 and the state machine 802.

The storage 806 for the functions and routines may have any number of forms. The storage 806 is also used to store self-contained applications referred to herein as "widgets". These self-contained applications or widgets include a combination of control commands executable by the process control module 404/504 and data or data resources needed for the commands. For example, in one embodiment the storage 806 is a portion of memory of the conventional provider 302. In another embodiment, the storage 806 is memory coupled to the conventional provider 302. In yet another embodiment, the storage 806 may be nonvolatile memory such as a hard disk.

The provider interface module 808 is coupled to the translator 804 and the state machine 802. The provider interface module 808 is coupled to the conventional provider 302 by signal line 420 and provides a communication link between the conventional provider 302 and the translator 804 and the state machine 802.

The communication interface module 810 is coupled to the state machine 802. The communication interface module 810 provides a communication link between the process control module 404 and the communication manager 406.

Figure 8B:
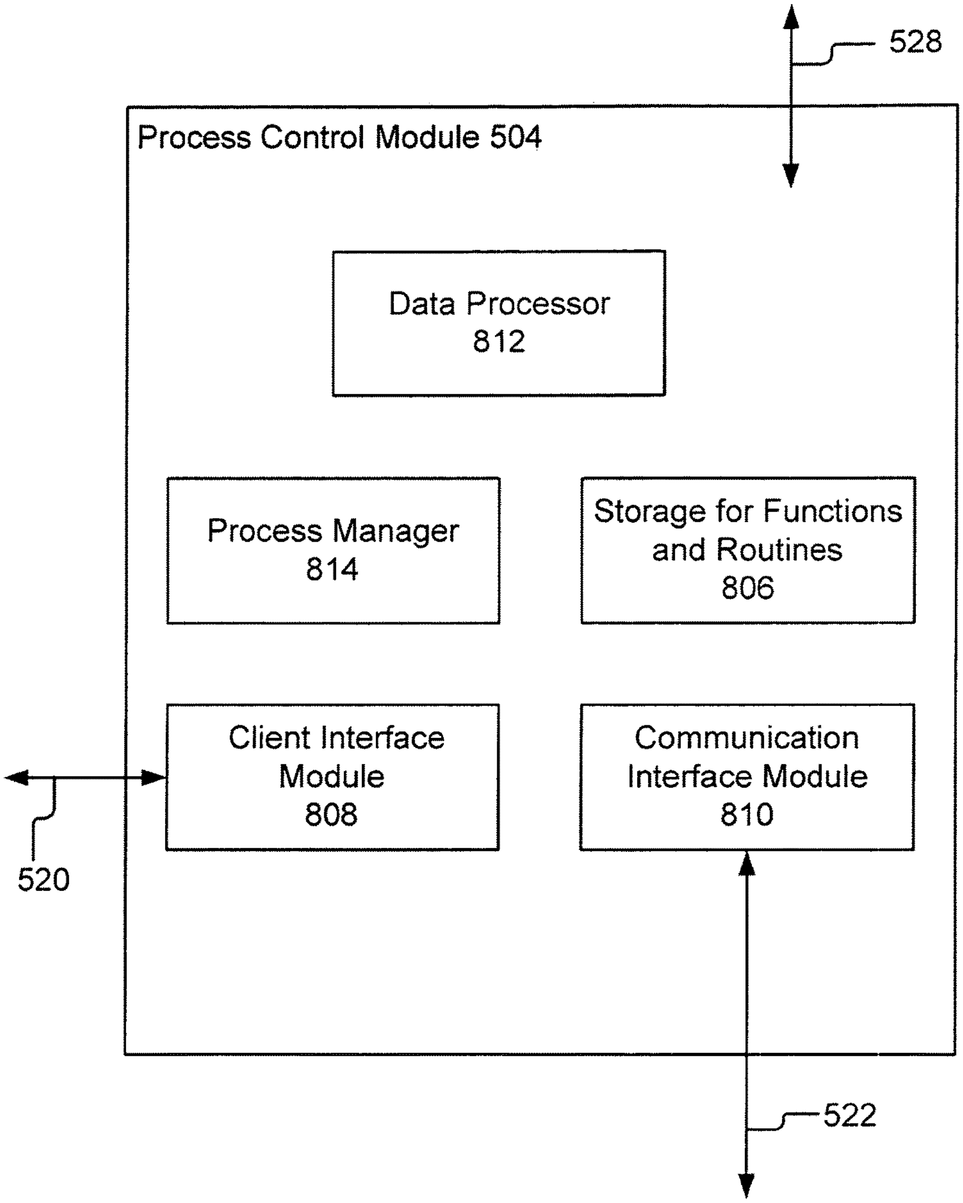
FIG. 8B is a block diagram of an embodiment of a process control module for a client in accordance with an embodiment of the present invention.

Referring now to FIG. 8B, an embodiment of the process control module 504 for the workflow-enabled client 106 in accordance with an embodiment of the present invention is shown. The process control module 504 comprises a data processor 812, a process manager 814, storage 806 for functions and routines, a client interface module 808 and the communication interface module 810. The storage 806 and the communication interface module 810 have a similar functionality as just described above so that description will not be repeated here. The client interface module 808 has a similar functionality as described above with reference to the provider interface module 808 except that the client interface module 808 is coupled to signal line 520 and links the process control module 504 to the conventional client 306. One of the particular advantages of the present invention is that it is able to manage workflow and provide additional processing. These capabilities are in large part provided by the data processor 812 and the process manager 814. Other benefits of the present invention included an ability of the workflow-enabled client 106 control the overall process. Additionally, the present invention has the ability to move computing away from the workflow-enabled provider 102 so that it can be performed at the workflow-enabled client 106 as necessary.

The data processor 812 is coupled to the storage 806 for retrieving routines and functions. The data processor 812 may be a conventional type and is able to execute routines and functions in the storage 806. In general, the data processor 812 manipulates and processes data received from the communication manager 506 or the conventional client 306. For example, the data processor 812 may receive the scanned image and process that scanned image into an output format such as PDF. Similarly, those skilled in the art will recognize that the data processor 812 can perform any number of operations on input data such as format conversion, optical character recognition, image enhancement, or other data processing typically performed on documents and scanned images. In one embodiment, the data processor 812 is under the direction and control of the process manager 814.

The process manager 814 is coupled to the storage 806, the data processor 812, the client interface module 808 and the communication interface module 810. The process manager 814 is coupled to the storage 806 to retrieve self-contained applications or widgets and to execute them. In response to the widget being executed, the process manager 814 uses the client interface module 808 to send data to and receive data from the conventional client 306. The process manager 814 also uses the client interface module 808 to send control signals and user interface signals to and from the conventional client 306. Similarly, the process manager 814 uses the communication interface module 810 to send data to and receive data from workflow-enabled providers 102. The process manager 814 also sends control signals to and receives user input from the workflow enables providers 102 through the communication interface module 810. Those skilled in the art will recognize that during the execution of a particular self-contained application or widget, the process manager 814 may utilize the communication interface module 810 to interact with different workflow-enabled providers 102. For example, the process manager 814 may interact with an MFP to scan and capture an image using the communication interface module 810, use the capabilities of the data processor 812 to generate a searchable PDF, and then store the searchable PDF to a Web service such as Amazon's S3 again using the communication interface module 810.

User Interface Module

Figure 9:
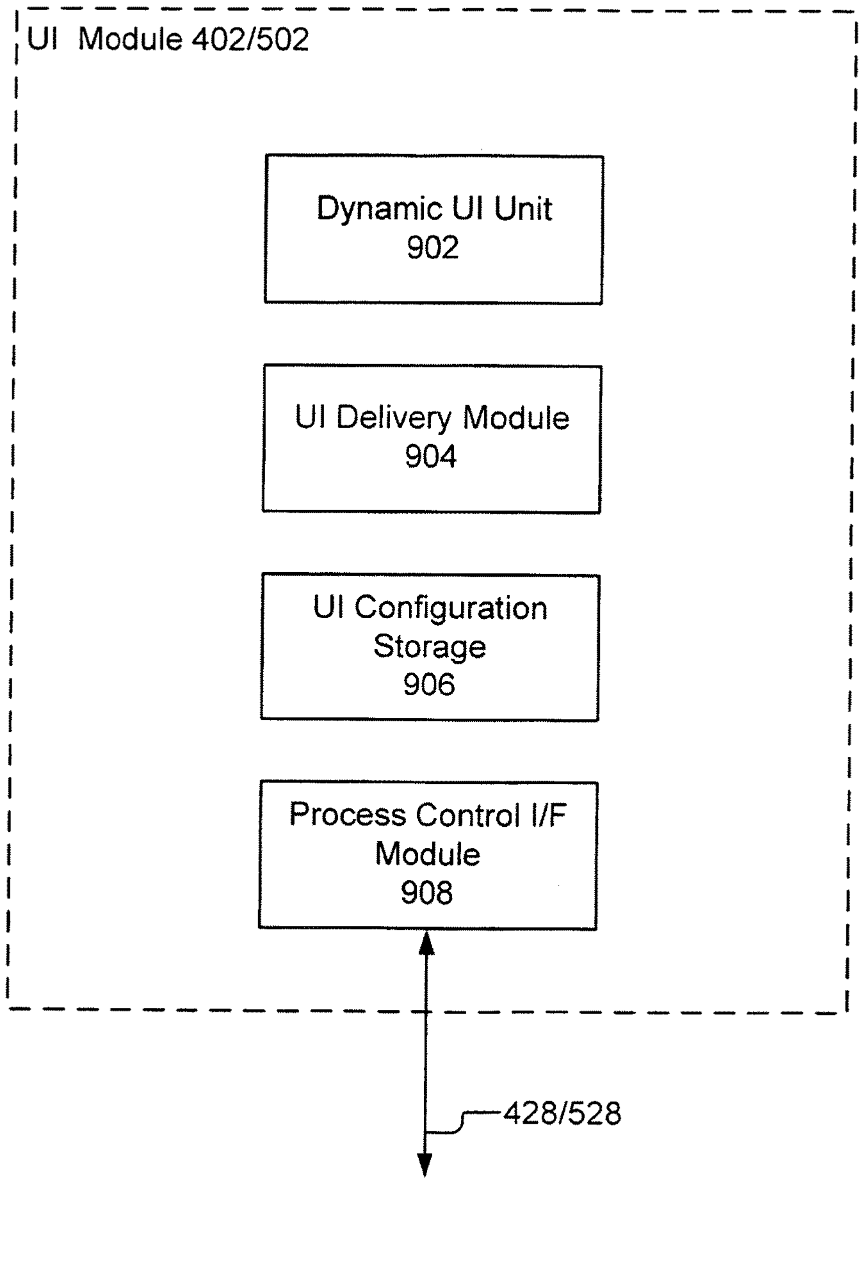
FIG. 9 is a block diagram of an embodiment of a user interface module in accordance with the present invention.

Referring now to FIG. 9, an embodiment of the user interface module 402, 502 in accordance with the present invention is shown. The user interface module 402, 502 is described below with reference to a first embodiment for the user interface module 402 of the workflow-enabled provider 102. This is been done for simplicity and ease of understanding, however it will be understood to those skilled in the art that the other user interface modules 502, 452, 552 have the same or similar functionality. The user interface module 402 comprises a dynamic user interface unit 902, a user interface delivery module 904, a user interface configuration storage 906 and a process control interface module 908.

The dynamic user interface unit 902 includes software and routines for dynamically generating user interfaces. The dynamic user interface unit 902 is adapted for communication with the process control interface module 908 to receive control signals and input from the process control module 404. The dynamic user interface unit 902 is also coupled to the user interface configuration storage 906 to retrieve information about users and applications corresponding to the users that are necessary for the creation of the user interface. For example, a first user may have activated clients to perform a scanning operation and a printing operation. In contrast, a second user may have activated those clients but also clients which do document format conversion and generation of PDFs. The dynamic user interface unit 902 will therefore generate different user interfaces depending on the user, the provider 302, and the client(s) 306. Furthermore, the dynamic user interface unit 902 can generate a single interface that can be used by a plurality of users each having their own plurality of applications and presented on a plurality of different providers 302 and clients 306. Exemplary user interfaces are described in more detail below with reference to FIGS. 16 to 21. The dynamic user interface unit 902 provides its output to the user interface delivery module 904.

The user interface delivery module 904 includes software routines for sending the instructions necessary to generate a user interface on a particular conventional provider 302 or conventional client 306. The user interface delivery module 904 is coupled to receive information about a generated user interface from the dynamic user interface unit 902. The user interface delivery module 904 is coupled to the process control module 404 by the process control interface module 908. Through this connection, the user interface delivery module 904 is able to send instructions and commands that are understandable to and executable by the conventional provider 302. Essentially, the user interface delivery module 904 tells the conventional provider 302 what to display.

The user interface configuration storage 906 stores a variety of information needed to generate user interfaces on the provider. For example, the user interface configuration storage 906 includes: information about the style of interface the user is accustomed to viewing, an ID for the user, workflow-enabled clients 106 available to the user, the capabilities of the conventional provider 302, the display capabilities of the provider's interfaces and other information as we understood to those skilled in the art necessary for the generation of the user interface.

The process control interface module 908 comprises routines for communication with the process control module 404. Those skilled in the art will recognize that other interface modules for communicating with the conventional provider 302 or the conventional client 306 are not shown but maybe include in the user interface module 402.

In a preferred embodiment, the user interface modules 452, 552 include the dynamic user interface unit 902, a user interface delivery module 904, and a process control interface module 908 as has been described above. Those skilled in the art will recognize that the user interface modules 452, 552 provide a simple model where the UI to display is described by the activation form that gets returned in response to the Hello request and the dynamic user interface unit 902 presents the information in the activation form and the process control interface module 908 controls the display of dynamically generated user interfaces as prescribed by the activation form.

It should be noted that in an alternate embodiment any one or all of the components of the user interface module 402, 502, 452, 552 may be incorporated into the process control module 404, 405, 454, 554, respectively.

Methods

Figure 10A:
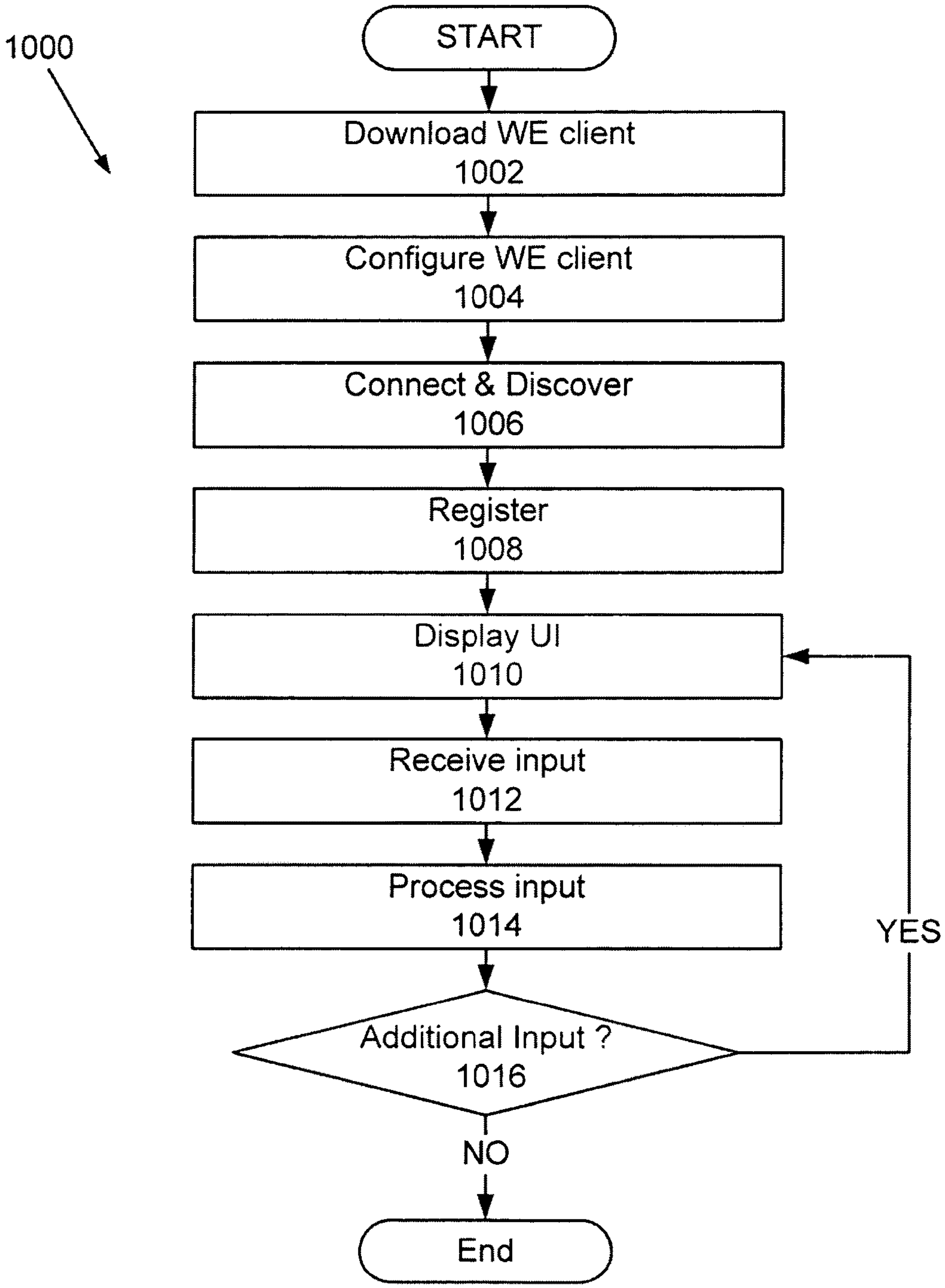
FIGS. 10A and 10B are flow charts of a method for distributed workflow processing in accordance with embodiments of the present invention.
Figure 10B:
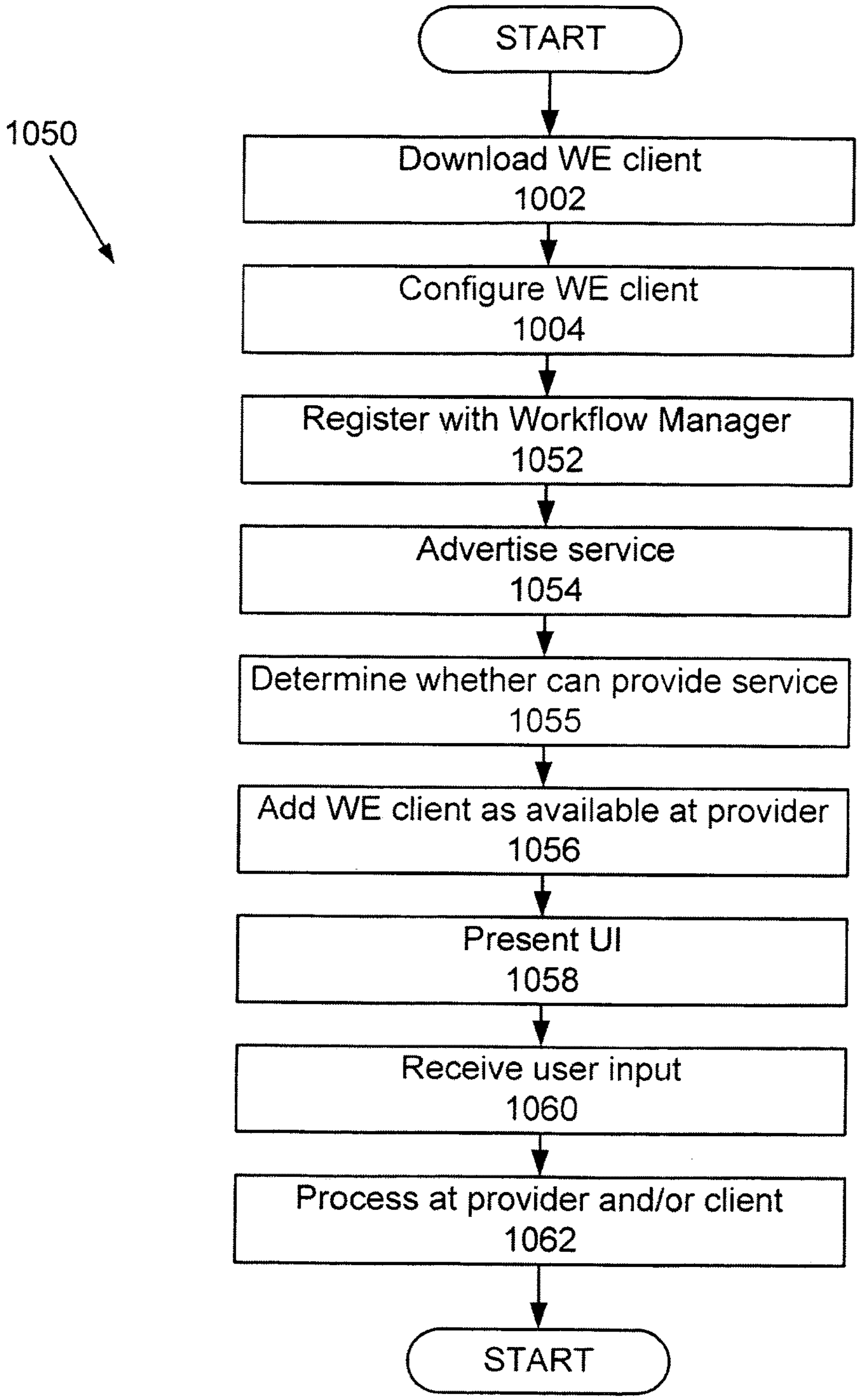

FIGS. 10A and 10B are flow charts of a general method for distributed workflow processing in accordance with the two embodiments of the present invention. FIG. 10A shows the general method when performed with the first embodiment of the distributed workflow-enabled system 100A (no workflow manager 108) and FIG. 10B shows the general method when performed by the second embodiment of the distributed workflow-enabled system 100B with the workflow manager 108.

Referring now to FIG. 10A, the first general method 1000 will be described. The method begins when a computing device, such as a personal computer, downloads 1002 a workflow-enabled client 106. Next the user runs the workflow-enabled client 106 on the personal computer and configures 1004 the workflow-enabled client 106. For example, a user may input basic configuration information such as user ID, account number, server locations, preferred interfaces, etc. Then the workflow-enabled client 106 connects with the network 104 and discovers 1006 any workflow-enabled providers 102 offering services on the network 104. Depending on the task that the workflow-enabled client 106 performs and the functionality that it needs, the workflow-enabled client 106 registers 1008 with one more workflow-enabled providers 102 that can satisfy the functionality requirements of the workflow-enabled client 106. Next, the workflow-enabled provider 102 displays 1010 a user interface (UI) in accordance with the task to be performed as specified by the workflow-enabled client 106. The workflow-enabled provider 102 receives 1012 input from a user. The workflow-enabled provider 102 processes 1014 the input. If necessary, the workflow-enabled provider 102 may also send information to the workflow-enabled client 106 for additional processing. This processing may include transferring the results to the workflow-enabled client 106, or printing by the workflow-enabled provider 102. After the processing by the workflow-enabled provider 102 and/or the workflow-enabled client 106, the method determines whether additional input is necessary to complete the task specified by the workflow-enabled client 106. For example, in addition to initiating a workflow process, additional authentication or information such as a PIN may be required. If additional input is required, the method loops to step 1010 to present GUI to solicit the appropriate information. If no additional input is required the method is complete and ends. The implementation of this method with regard to specific tasks will be described in more detail below with reference to FIGS. 13A, 15A and 15B.

Referring now to FIG. 10B, the second general method 1050 will be described. The method begins by downloading 1002 and configuring 1004 the workflow-enabled client 106. Next, method registers 1052 the workflow-enabled client 106 with the workflow manager 108. The workflow manager 108 in turn advertises 1054 the registered workflow-enabled client 106 over the network 104. Then, one or more workflow-enabled providers 102 receive the advertisement, and perform a test 1055 to determine whether they can provide all the services listed in the advertisement. If the workflow-enabled provider can provide the services listed, it adds 1056 the workflow-enabled client as being available at the provider 302. The workflow-enabled providers 102 also present 1058 a user interface specific to the register workflow-enabled client 106. If the user inputs information with the user interface, the workflow-enabled provider 102 receives 1060 the user input. Then the received input is processed 1062 at the workflow-enabled provider 102 and/or at the workflow-enabled client 106. Implementation of this method with regard to specific tasks will be described in more detail below with reference to FIGS. 13B, 15C, 22A, 22B and 23.

Figure 11A:
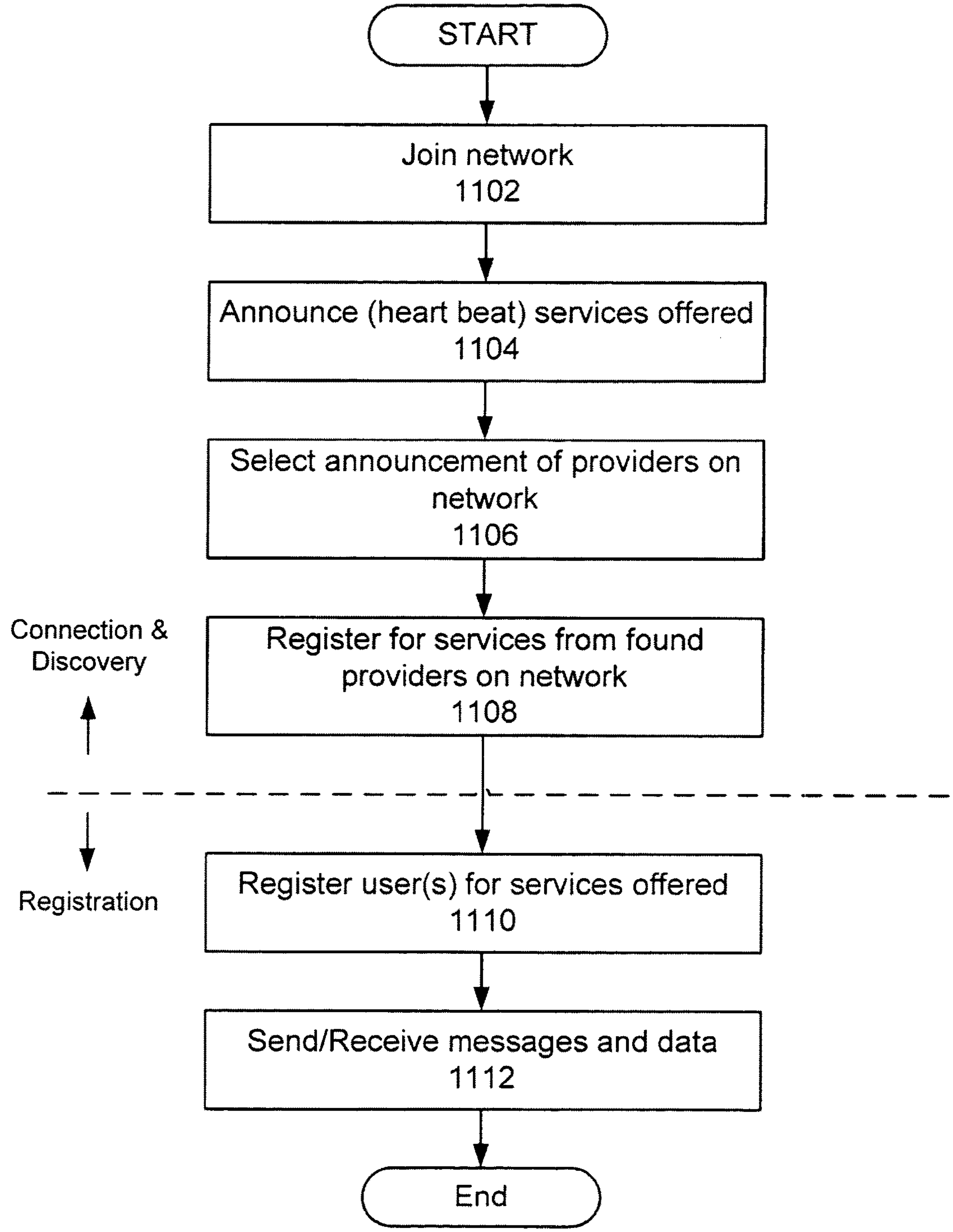
FIG. 11A is a flow chart of a method for communication between a provider and a client in accordance with an embodiment of the present invention.

Referring now to FIG. 11A, a method for communication between the workflow-enabled provider 102 and the workflow-enabled client 106 (with no workflow manager 108) in accordance with an embodiment of the present invention is described. More specifically, the method illustrated in FIG. 11A shows the steps performed by the communication manager 406, 506. The method begins with the communication manager 506 joining 1102 the network 104. Next, the communication manager 506 monitors for a service offering signal. As was noted above, the workflow-enabled providers 102 will periodically announce 1104 the availability or offering of services using a heartbeat signal. Then the communication manager 406 will create a list of available services and then select 1106 one or more announcements of workflow-enabled providers 102 on the network 104. In one embodiment, the communication manager 506 sends information to the process control module 504 and receives user input as to which workflow-enabled providers 102 with which to discover and connect. In another embodiment, the communication manager 506 includes default settings and automatically discovers and connects with workflow-enabled providers 102 consistent with those default settings. Next, the communication manager 506 completes the connection and discovery process by registering 1108 for services from the list of found workflow-enabled providers 102 currently available on the network 104. This makes the services available and accessible by the registered workflow-enabled client 106.

Once a particular workflow-enabled client 106 has been connected and registered 1108 with the workflow-enabled provider 102, the individual users must also be registered for particular services. In step 1110, the registration process is completed with the individual users registering for services offered by workflow-enabled providers 102 according to the current topography of the network 104 (in other words depending on which workflow-enabled providers 102 are connected and accessible by the workflow-enabled client 106). Once the individual users have been registered 1110, the communication manager 506 can be used to send and receive 1112 messages and data to the workflow-enabled providers 102.

Figure 11B:
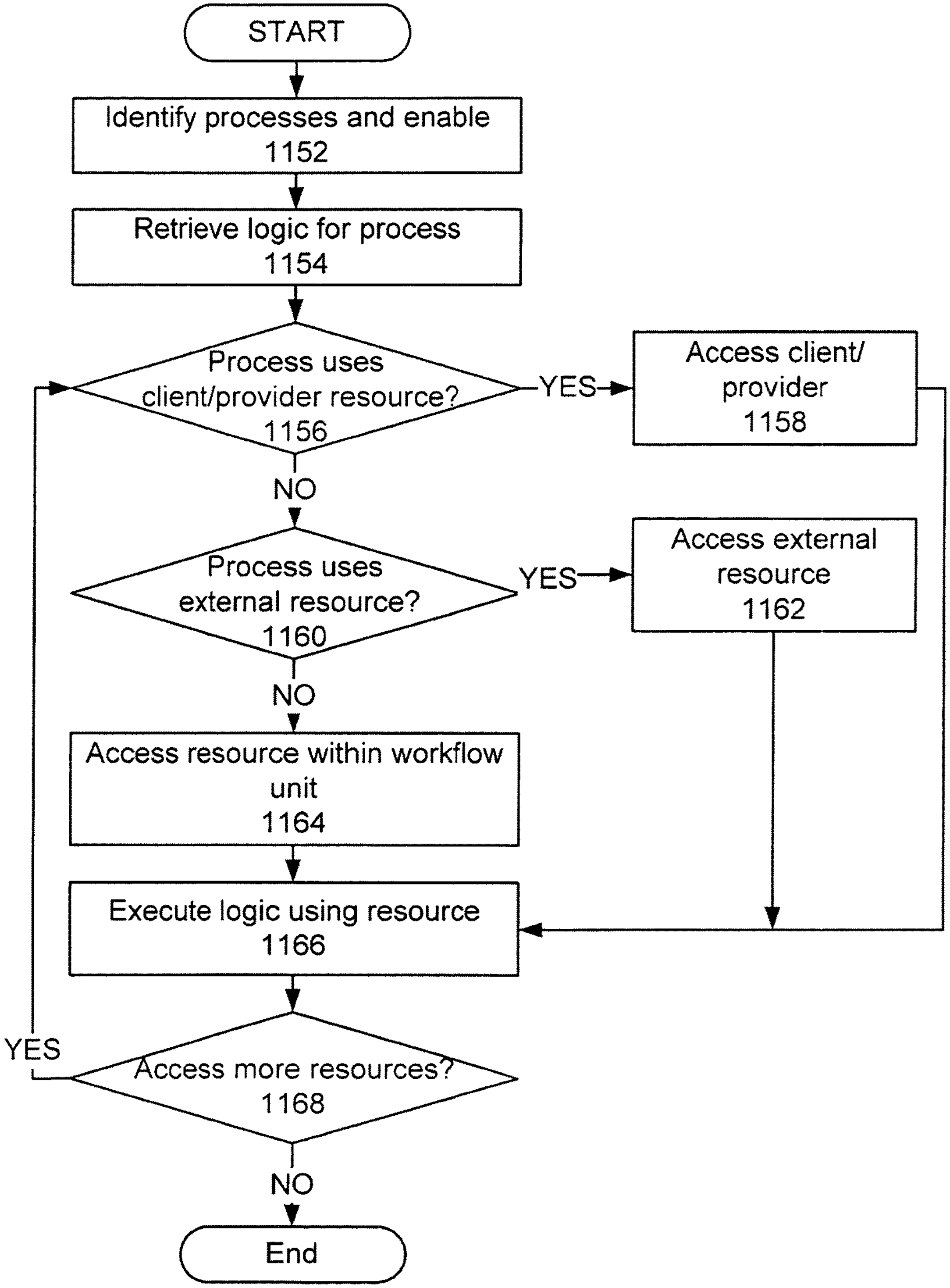
FIG. 11B is a flow chart of a method of operation for the process control module in accordance with an embodiment of the present invention.

Referring now to FIG. 11B, a method of operation for the process control module 404, 504 in accordance with an embodiment of the present invention is shown. The process begins by identifying 1152 and enabling a process. In this context, a process refers to a self-contained application or a widget. Once a process has been identified, the logic or program code to implement the process is retrieved 1154. One embodiment of this process is described in more detail below with reference to FIG. 14. In general, a self-contained application is retrieved from a source and stored in the storage 806 of the process control module 504. Next method prepares for execution of the self-contained application and determines 1156 whether the process uses a client 306 (or provider 302 for process control module 404). If so, the process control module 504 accesses 1158 the client 306 (or provider 302) before proceeding to execution. The process control module 504 can access the client 306 (or provider 302) by using the client (provider) interface module 808. If the process does not use a client resource, the method continues to determine 1160 whether an external resource is utilized by the process. If so the method accesses 1162 of the external resource before proceeding to step 1166. For example, the process control module 504 may access a Web service and sets up access to that Web service in step 1162. On the other hand, if the method does not require external resources, the method proceeds to access 1164 resources within the client workflow unit 308. More specifically, the process manager 814 may establish a connection with and allocate resources of the data processor 812 for executing the process. After one of the resource allocation steps 1158, 1162 and 1164, the process control module executes 1166 the logic using the allocated resource. In one embodiment, the overall process executed in FIG. 11B is managed by the process manager 814. In such an embodiment, a particular process may utilize resources in internal, external or in the client, for different portions of the process. Thus, the method continues to determine 1168 whether access to more resources is required to complete the process. If so, the method returns to step 1156 for the remaining portion of the process. If not, when it is complete and ends.

Figure 12:
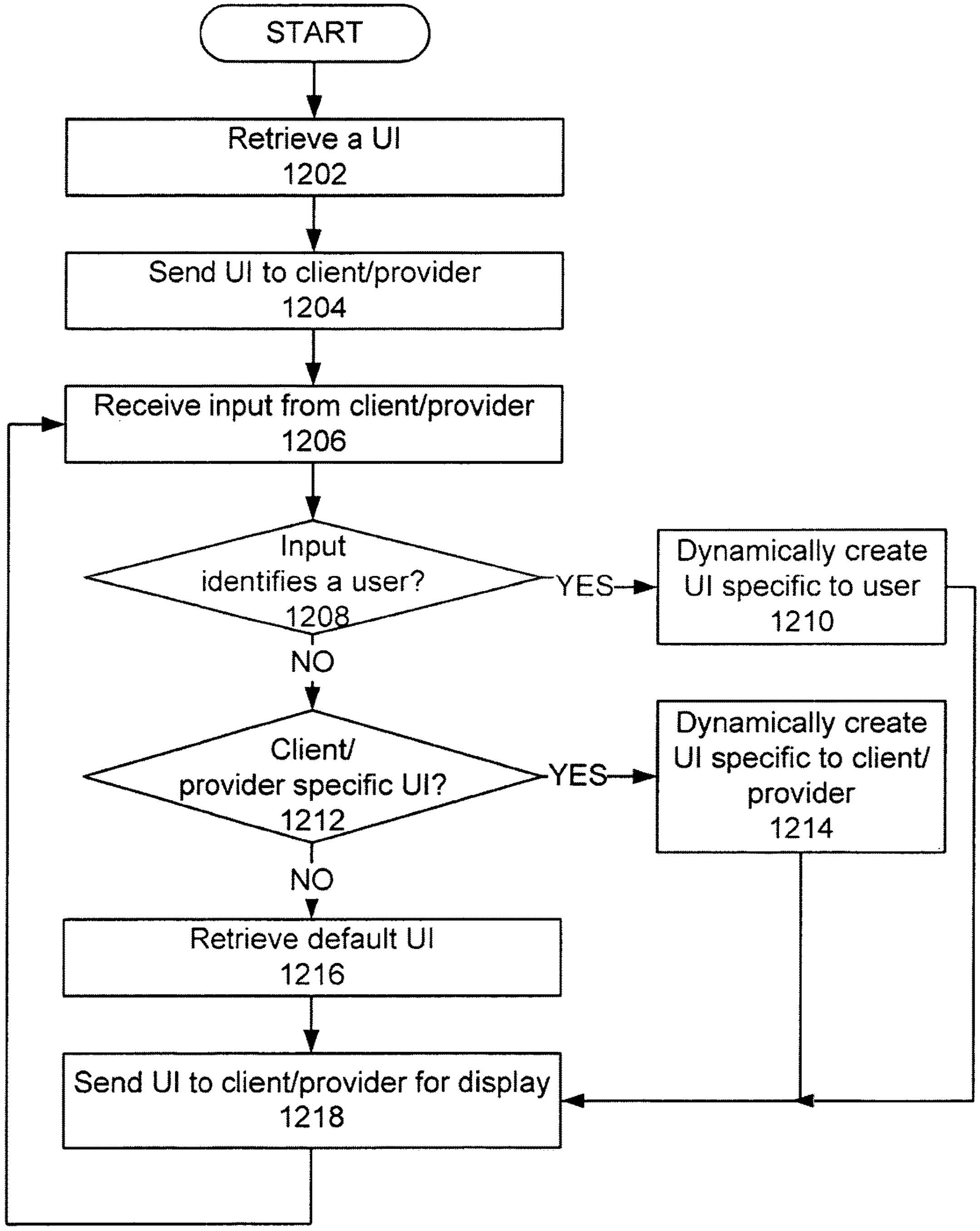
FIG. 12 is a flow chart of a method for generating and presenting user interfaces in accordance with an embodiment of the present invention.

Referring now to FIG. 12, a method for generating and presenting user interfaces in accordance with the present invention is shown. The process begins with the user interface module 502 retrieving 1202 a user interface. For example, this step may be performed by the dynamic user interface unit 902 retrieving information from user interface configuration storage 906. Next, the user interface module 502 sends 1204 the user interface to the conventional client 306/conventional provider 302, and the conventional client 306/conventional provider 302 in turn displays the user interface. In response, the user interface module 502 receives 1206 input from the conventional client 306/conventional provider 302. The method then determines whether the input identifies 1208 a user. If so, the dynamic user interface unit 902 of the user interface module 502 dynamically creates 1210 a new user interface specific to the identified user. Once the new user interface has been created, the method sends 1218 the user interface to the conventional client 306/conventional provider 302 for display. On the other hand, if the input does not identify a user, the method continues to determine 1212 whether the conventional client 306/conventional provider 302 has or requires a specific user interface. If so, the dynamic user interface unit 902 of the user interface module 502 dynamically creates 1214 a user interface specific to the conventional client 306/conventional provider 302. For example, the conventional client 306/conventional provider 302 may have limited functional capabilities or may have limited display capabilities which dictates or constrains the user interface that can be dynamically created. After the user interface has been dynamically created 1214 for the conventional client 306/conventional provider 302, the method proceeds to step 1218 to send the user interface to the conventional client 306/conventional provider 302 for display. If there is not a specific user interface for the conventional client 306/conventional provider 302 the method proceeds to step 1216 and retrieves a default user interface. The default user interface is then presented in step 1218. After the user interface has been sent to the conventional client 306/conventional provider 302 the method returns to step 1206 to receive additional input from the conventional client 306/conventional provider 302. Those skilled in the art will recognize that the method of the present invention is particularly advantageous because it allows distributed workflow-enabled systems 100 to present user interfaces that appear the same on both the conventional client 306 and the conventional provider 302. This provides the benefits of ease of use and user familiarity when navigating the user interfaces. The user interfaces can also be generated and driven by the conventional client 306 independent of the type of conventional provider 302 that is being used to perform the given function. Furthermore, the client driven user interfaces allow the conventional provider 302 to present functionality that is performed remote to the conventional provider 302 such as when part of the portions of a workflow are performed by the conventional client 306.

Figure 13A:
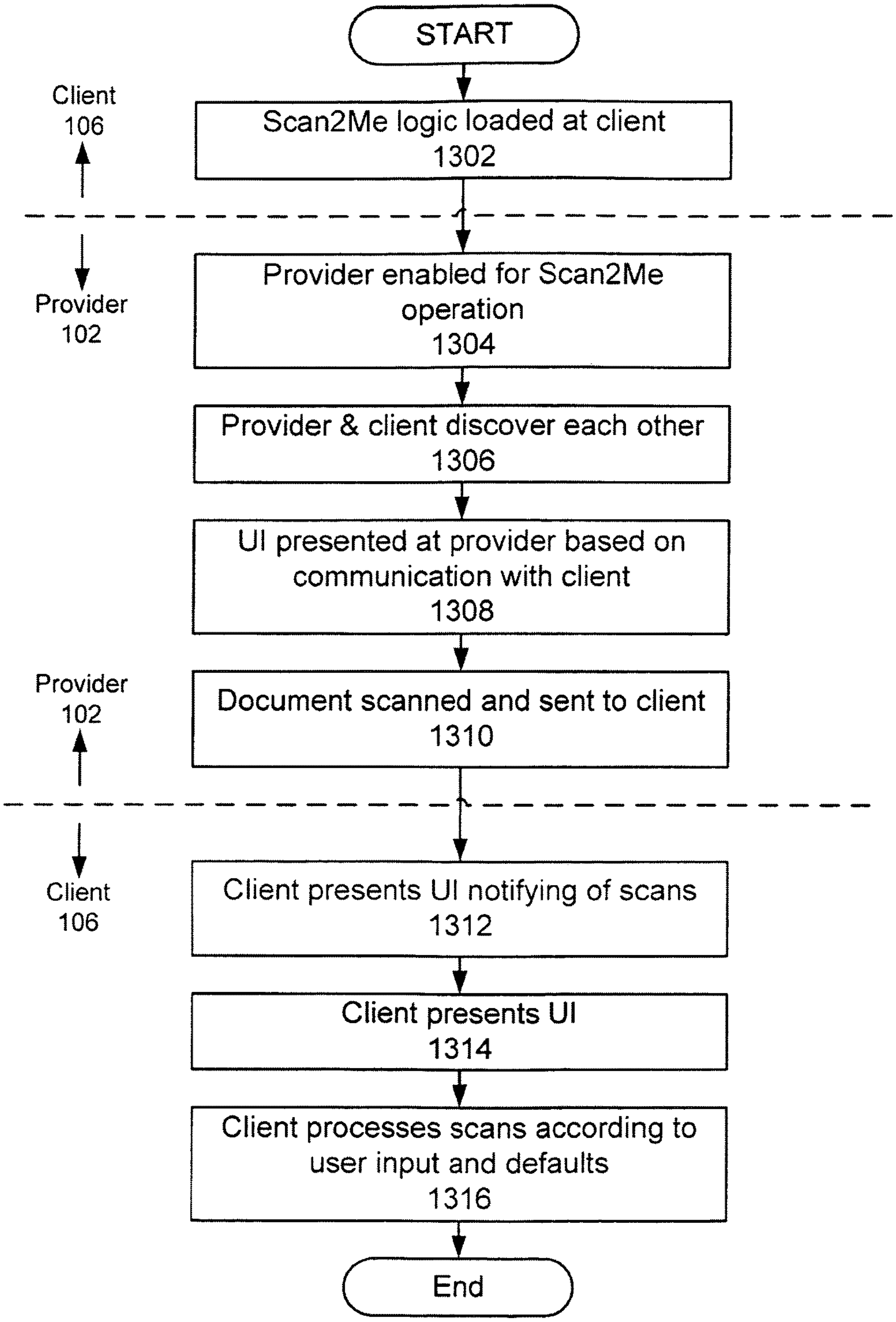
FIG. 13A is a flow chart and FIG. 13B is a trace diagram of a method for performing a scanning operation with the workflow-enabled system in accordance with embodiments of the present invention.

Referring now to FIG. 13A, a method for performing a scanning operation with the first embodiment (e.g., no workflow manager 108) of the distributed workflow-enabled system 100A of the present invention is shown. The scanning operation is referred to as "Scan2me" in which the user utilizes a workflow-enabled provider 102 to scan a document and the image captured by the workflow-enabled provider 102 is transmitted to the workflow-enabled client 106 associated with the user. The process begins with the workflow-enabled client 106 retrieving 1302 and loading the self-contained application that includes the "Scan2me" functionality. At another time, the workflow-enabled provider 102 activates 1304 and enables the Scan2me functionality. Then the workflow-enabled provider 102 and the workflow-enabled client 106 discover 1306 each other establishing a connection and registering the user for the Scan2me process. Since the workflow-enabled provider 102 is enabled with the Scan2me functionality, it can present 1308 a user interface based on identification of the user and registration. The workflow-enabled provider 102 then scans 1310 the document in a conventional manner. However, since the user is registered in accordance with the present invention, the provider 302 can send the scan of the document to the appropriate workflow-enabled client 106. Those skilled in the art will recognize that steps 1304 to 1310 are performed by the workflow-enabled provider 102. At sometime thereafter, the workflow-enabled client 106 generates and presents 1312 a user interface notifying the user that scans are available for additional processing. The workflow-enabled client 106 presents 1314 a user interface requesting additional input for processing the scans that were received from the workflow-enabled provider 102. The user then inputs information to the workflow-enabled client 106 and the workflow-enabled client 106 processes 1316 the scans according to user input in default.

Those skilled in the art will recognize that the process described above with reference to FIG. 13A is just one example of a self-contained application that may be loaded onto a workflow-enabled client 106 and a workflow-enabled provider 102 so that they can cooperatively achieve an end result. It should be understood that there are variety of other applications some of which will be detailed below that may be accomplished with other self-contained applications. For example, a self-contained application may be created for: 1) printing at any workflow-enabled device, 2) scanning a document and generating an e-mail, 3) scanning a document and generating a PDF file, 4) scanning a document and storing it in a file, folder or external location, 5) scanning a document and adding it to an accounting system, 6) scanning the document and performing optical character recognition, etc.

Figure 13B:
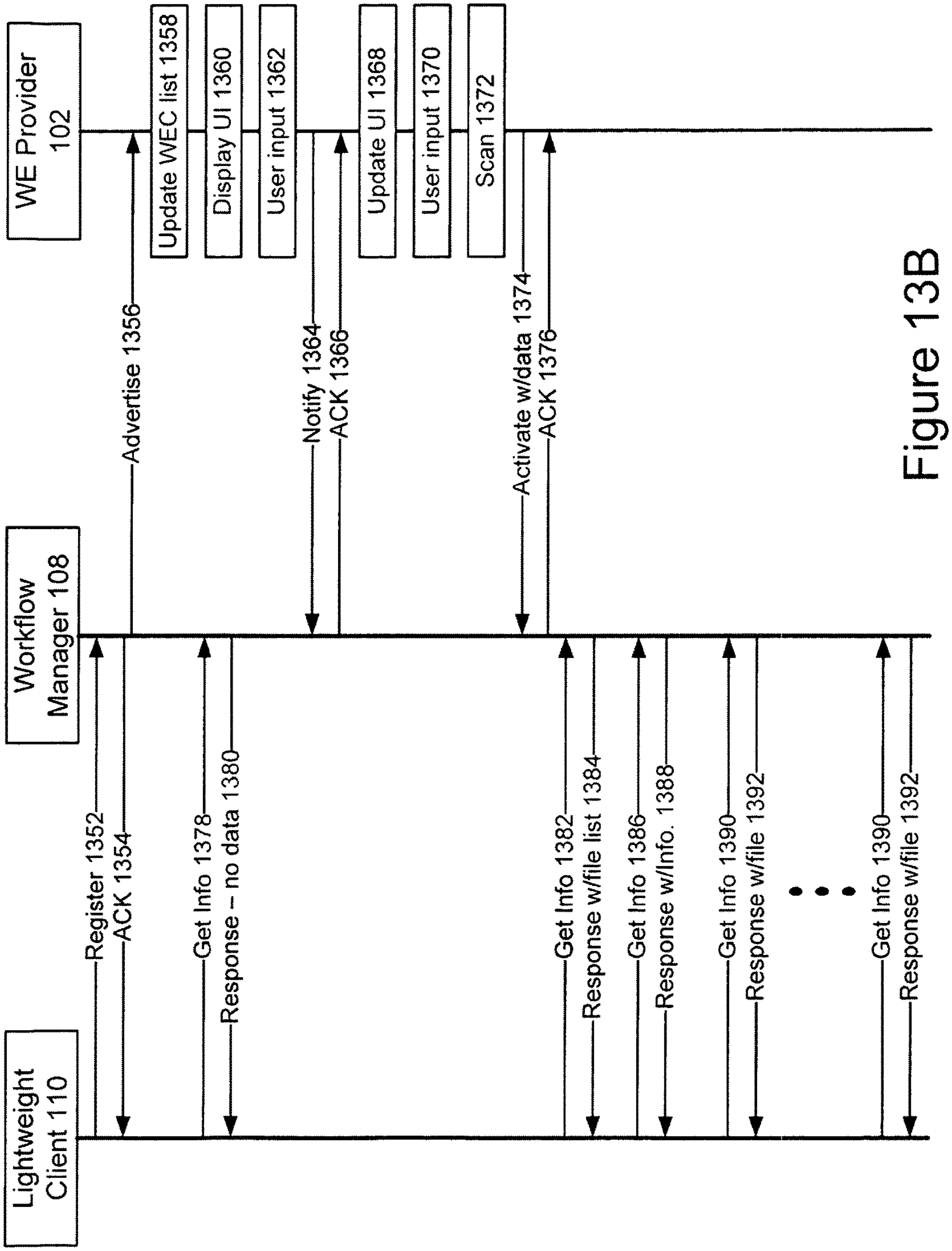

Referring now to FIG. 13B, a method for performing a scanning operation with the second embodiment (e.g., WITH the workflow manager 108) of the distributed workflow-enabled system 100B of the present invention is shown. FIG. 13B illustrates a trace diagram of the steps and components (lightweight client 110, workflow manager 108 and workflow enabled provider 102) for performing scanning operation. Before the method begins it is assumed that the lightweight client 110 has been downloaded, configured and is operational on a computing device. The method begins with the lightweight client 110 registering 1352 with the workflow manager 108. In one embodiment, this is accomplished by generating and sending an HTTP request (HTTP POST, with the required field op=register, name=<client name>, and optional fields specifying formfile, persistent, required PIN, printfile, scandir and zero or more requirements a listing provider should be able to satisfy) from the workload-enabled client 106 to the workflow manager 108. The workflow manager 108 replies 1354 to the lightweight client 110 with an acknowledgment signal and a location. In one embodiment, the acknowledgment signal is an HTTP response (HTTP response: OK (200)) with the HTTP response header "Location:" specifying the client location URL based on the client internal-ID. Soon after the lightweight client 110 has been registered, the workflow manager 108 advertises 1356 the availability of the lightweight client 110. The workflow-enabled provider 102 receives the advertisement and updates 1358 a list of available workflow-enabled clients 106 (WEC list). The workflow-enabled provider 102 may also filter the list of workflow-enabled clients 106 to remove those workflow-enabled clients 106 that require functionality that the workflow-enabled provider 102 does not have the ability to service. Then the workflow-enabled provider 102 displays 1360 a user interface. As has been noted above, the user interface may be customized to present interfaces specific to users and available workflow-enabled clients 106. In one embodiment, the UI includes the users name and the name of the workflow-enabled client 106 as a selectable button. Next, the user inputs 1362 a selection at the workflow-enabled provider 102. For example, the user may proceed to the multifunction peripheral (that includes the workflow-enabled provider 102) and selects button of the UI on the display panel of the multifunction peripheral. The workflow-enabled provider 102 then generates a notification signal and sends 1364 it to the workflow manager 108. For example, the notification signal may be an HTTP request (HTTP GET with the parameter "op=hello" specified). The workflow manager 108 sends 1366 an acknowledgment signal to the workflow-enabled provider 102 in response to the notification signal. If a PIN is required for the workflow-enabled client 106 that was selected, the response will indicate that fact. In this case, the workflow-enabled provider 102 updates its user interface to request that the user enter a PIN, and then re-sends the request using credentials based on that PIN. In one embodiment, the acknowledgement signal when a valid PIN has not been supplied is an HTTP response (HTTP response UNAUTHORIZED (401)) and the credentials are generated using HTTP authentication as specified in RFC 2617. In one embodiment, the acknowledgment signal when no PIN is required or a valid PIN has been entered is an HTTP response (HTTP response: OK (200)). In one embodiment, the body of the acknowledgment signal's response includes a form that indicates UI elements the workflow-enabled provider 102 should display, such as textual instructions to print or checkboxes and other form-based elements that should be filled out by the user. In one embodiment, the form so returned is encoded as an HTML page to be rendered. In another embodiment, the form is encoded using a simple markup language that only specifies text and checkbox UI elements, with checkboxes indicated by enclosing the checkbox elements using the character sequences "[[" and "]]". The form may also contain an indication that the workflow-enabled provider 102 should perform an information capture operation (for example, by causing a document to be scanned or a picture to be taken), and may specify any optional parameters that should be used when performing that capture operation. In one implementation, information capture is indicated by appending the form with a field name for a scanned document followed by zero or more optional parameters, all enclosed using the character sequences "{{" and "}}". Next the workflow-enabled provider 102 updates 1368 the user interface to provide a start button and to display any other UI elements that were specified in the form returned by the workflow manager 108. The user optionally provides information using any UI elements being displayed and then selects a start button, and the user input is received 1370 by the workflow-enabled provider 102. Since the task provided by this workflow-enabled client 106 is the scanning and sending of documents, the form returned by the workflow manager 108 would have specified that scanning should be performed and the workflow-enabled provider 102 would then scans 1372 documents input by the user. The scan may be a single page or any number of pages. In an alternate embodiment, the operation of scanning comprises designating data that was already captured before the client had been selected as the scanned data, for example in a case where the workflow-enabled provider is a camera and selection of a workflow-enabled client 106 is performed after a picture has been taken. Next, the workflow-enabled provider 102 sends 1374 an activation signal with the scan data to the workflow manager 108. In one embodiment, the activation signal is in HTTP request (an HTTP POST with required field "op=activate", optional field alt=<file containing a list of alternative protocols representing this provider's services>, and files captured during scanning with field names as specified in the scan request section of the form returned by the workflow manager 108). The workflow manager 108 then sends 1376 an acknowledgment signal in response. The lightweight client 110 obtains data from the workflow manager 108 by periodically polling the workflow manager 108 to determine whether the workflow manager 108 has any data designated for the lightweight client 110.

As illustrated in FIG. 13B, the lightweight client 110 sends 1378 a signal to request information from the workflow manager 108 soon after registering. For example, this can be an HTTP request (HTTP GET on the URI associated with this client's internal-ID) sent by the lightweight client 110 to the workflow manager 108. Since no data has yet been produced by the workflow-enabled provider 102 this first attempt fails to produce any data, and the workflow manager 108 responds 1380 indicating that no data is available. For example, this can be an HTTP response (HTTP response: NO CONTENT (204)). In one embodiment, each scanned image is stored by the workflow-enabled provider 102 in a separate file. For example, the scan data may include any number of files, scan-data-1, scan-data-2 . . . scan-data-n. Once the scanned data has been sent 1374 from the workflow-enabled provider 102 to the workflow manager 108, the workflow manager 108 stores the scanned data, for example, in the response data storage 614 or in a subdirectory of the client information directory 604. In another embodiment, the subdirectory of the client information directory 604 also includes other information from the workflow-enabled provider 102 such as the check boxes if any that were selected, additional directory information, configuration information of the workflow-enabled provider 102, or any other information captured by the workflow-enabled provider 102 and sent to the workflow manager 108. At some time after the scanned images and other information have been transferred to the workflow manager 108 and the acknowledgment response has been sent 1376, the lightweight client 110 polls or generates and sends 1382 a request for the scanned information. The workflow manager 108 receives the request. For example, the request may be an HTTP request in the form of HTTP GET <client-url> where the <client-url> is the location sent from the workflow manager 108 to the lightweight client 110 during the registration process. If the workflow manager 108 has content to deliver, its initial response to the request is a response 1384 including a directory of files and time stamps. For example, the response may be HTTP Response: OK, with the body of the response containing a list of filenames or URLs representing each scanned image file encoded in uri-list format. The lightweight client 110 extracts the file list from the response. Next, the lightweight client 110 generates and sends 1386 another request for other information (e.g., check boxes, etc.) captured by the from the workflow-enabled provider 102. The workflow manager 108 receives the request, and responds by sending another response including the other information. Although not shown, this process can be repeated any number of times using the same request/response protocol until the entire directory listing and other information are received at the lightweight client 110. Then the lightweight client 110 generates and sends 1390 a request for each file in the list. For example, the request may be in the form HTTP GET <scan-url-1>. In response to each request, the workflow manager 108 generates and sends a response 1392 that includes the file. For example the response may be in the form HTTP Response: OK, with the requested file in the body of the response. The lightweight client 110 and the workflow manager 108 repeat the request 1390/response 1392 any number of times until all the scanned receipts are transferred from the workflow manager 108 to the lightweight client 110 for further processing such as storing them in a database.

Those skilled in the art will recognize that in other embodiments some of the above steps of FIG. 13B may be omitted or other new and additional steps may be added. For example, FIG. 13B can be modified to scan receipts, transfer the captured images of the receipts to the lightweight client 110 and then process them with the lightweight client 110 such as storing them in a database as part of a reimbursement form.

Figure 14:
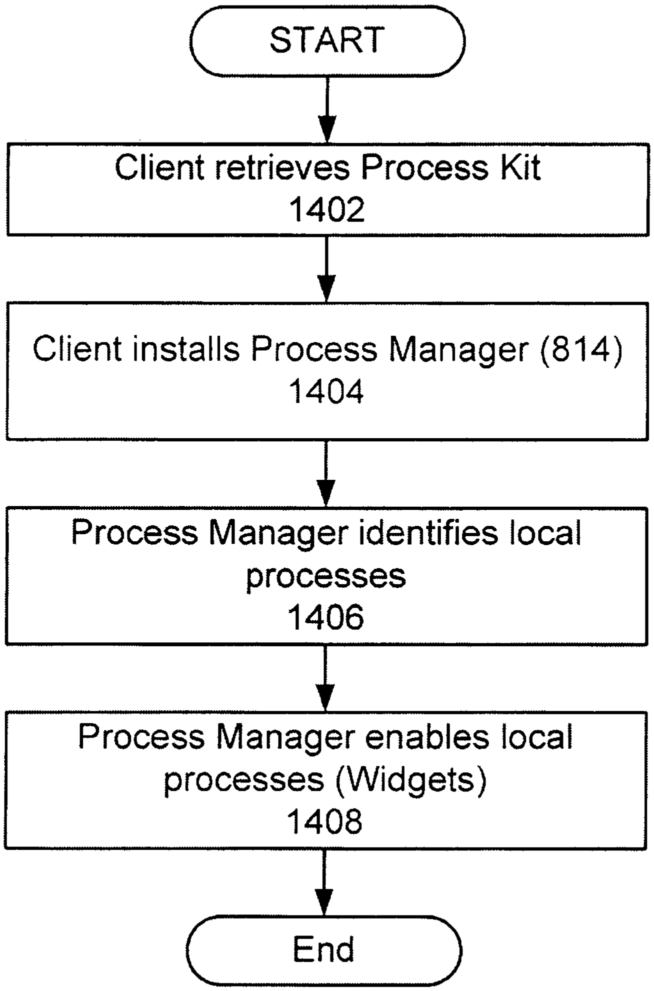
FIG. 14 is a flow chart of a method for retrieving and enabling a process in a client of the workflow-enabled system in accordance with an embodiment of the present invention.

Referring now to FIG. 14, a method for retrieving and enabling a process in a workflow-enabled client 106 of the distributed workflow-enabled system 100 of the present invention is shown. The method begins with the workflow-enabled client 106 retrieving 1402 a process kit. In one embodiment, the user uses a web browser to navigate to website and downloads the process kit. The process kit includes the process manager 814 and a process. Next the workflow-enabled client 106 installs 1404 the process manager 814 which will in turn be used to install the process. Next, the process manager 814 identifies 1406 local processes such as the one just downloaded. Then the process manager 814 enables the local processes (widgets) on the workflow-enabled client 106. In one embodiment, the process manager 814 automatically discovers the workflow-enabled providers 102 and prompts the user for installation. In another embodiment, the process manager 814 periodically checks for new workflow-enabled providers 102 and workflow-enabled clients 106 and prompts the user for their installation. Furthermore, the process manager 814 performs workflow-enabled client management to install, uninstall, enable and disable workflow-enabled clients 106.

Figure 15A:
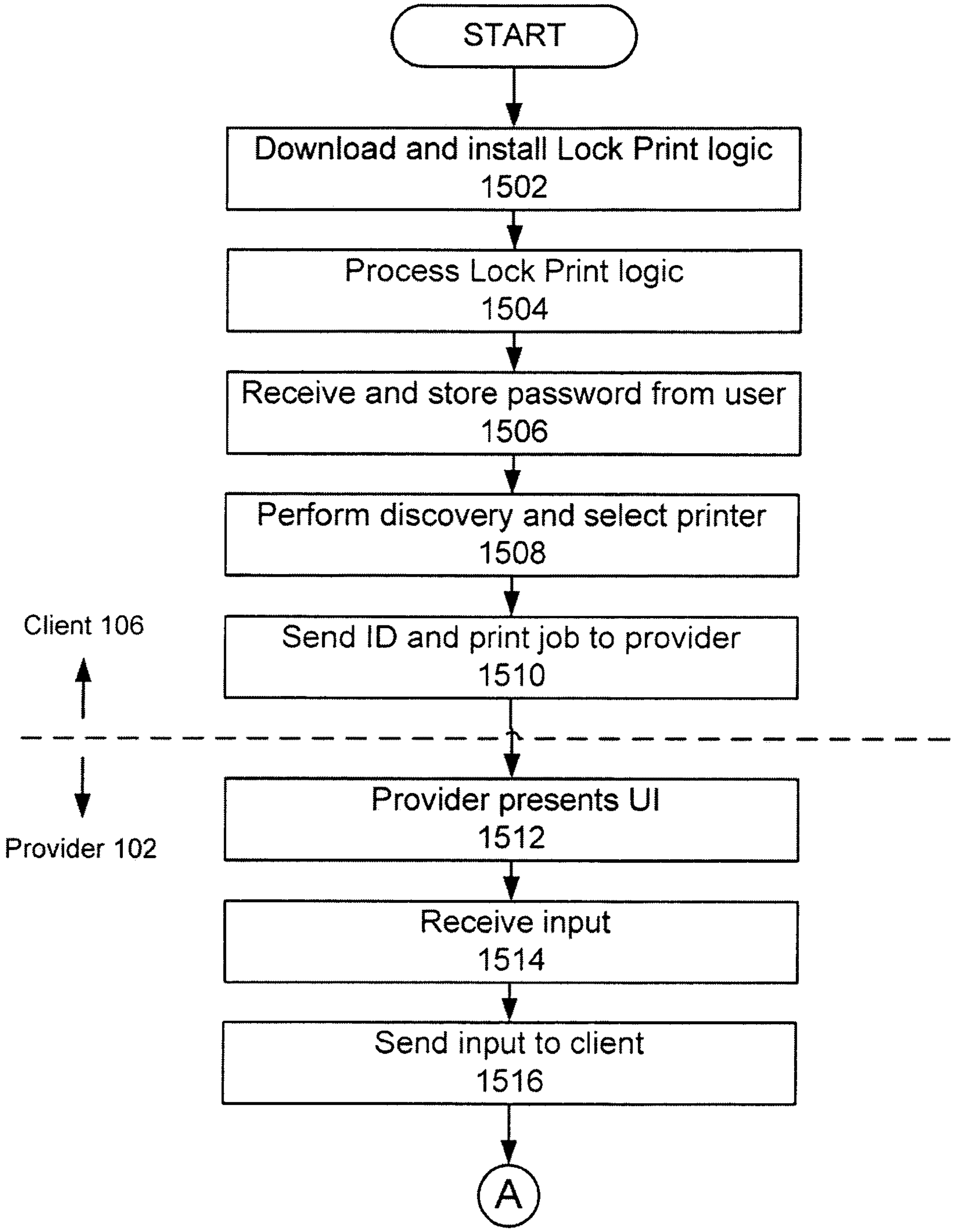
FIGS. 15A and 15B are a flow chart of a method for performing a lock print operation with the workflow-enabled system in accordance with a first embodiment of the present invention.
Figure 15B:
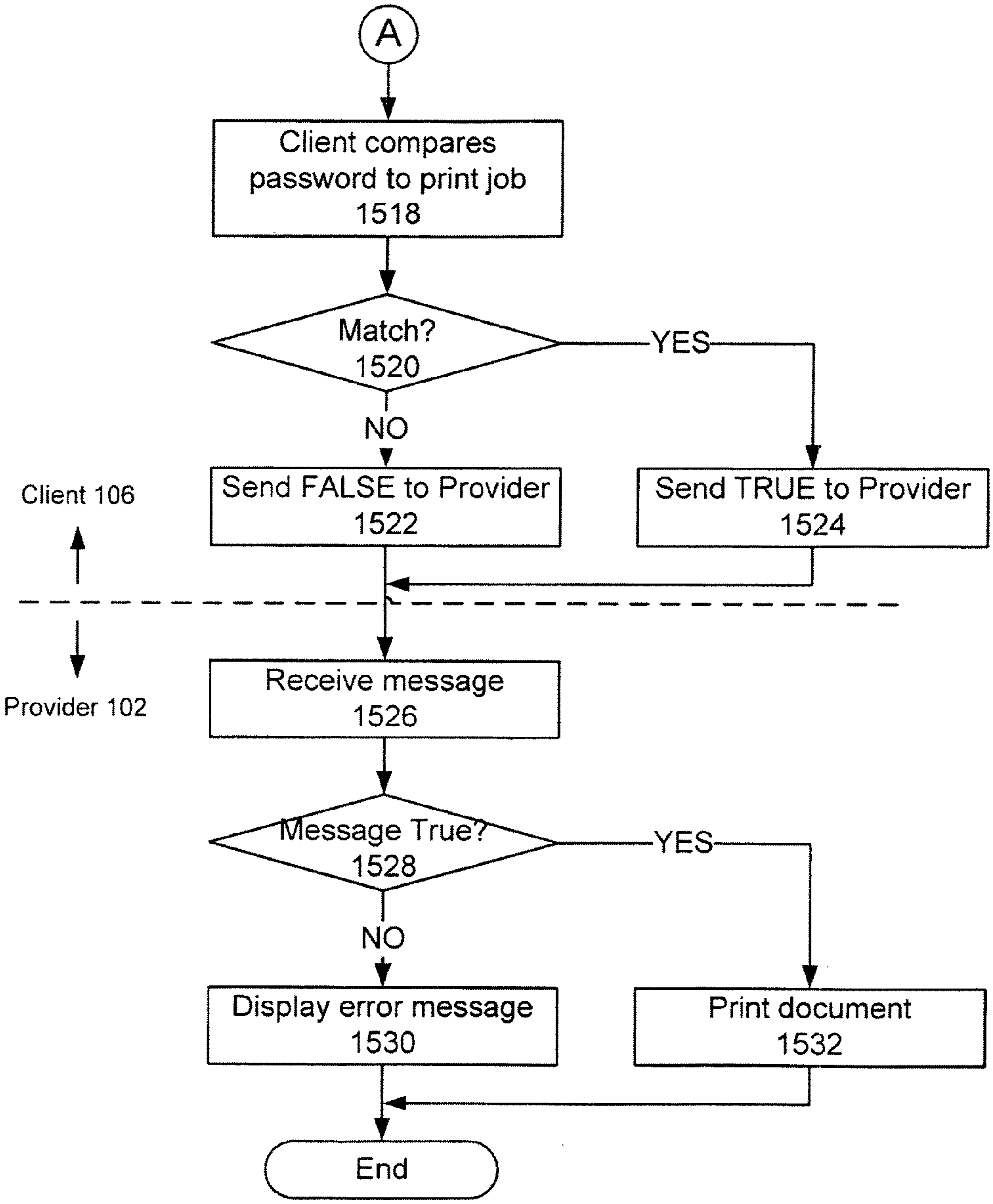

Referring now to FIGS. 15A and 15B, a method for performing a lock print operation with the first embodiment (e.g., no workflow manager 108) of the distributed workflow-enabled system 100A of the present invention is shown. The process begins with the workflow-enabled client 106 downloading 1502 and installing the widget or logic for the lock print operation. The lock print logic is processed 1504 so that is operational on the workflow-enabled client 106. The processing of the lock print logic is performed in response to a user request for the operation. The method next receives and stores 1506 a password from the user. In one embodiment, the password is associated with the user and the document. In another embodiment, the password is associated only with the user. In yet another embodiment, this step is omitted and a default password previously entered by the user and stored is used. Next, the workflow-enabled client 106 performs discovery and selects 1508 a printer (workflow-enabled provider 102) for the output. In one embodiment, the workflow-enabled client 106 displays a list of available printers (workflow-enabled providers 102) and allows the user to input a selection of one of the printers on the list. The workflow-enabled client 106 then transmits 1510 an ID and a print job action to the selected workflow-enabled provider 102. Since the workflow-enabled client 106 and the workflow-enabled provider 102 have registered with each other, the workflow-enabled provider 102 presents 1512 an initial user interface. For example, a user interface similar to that shown in FIG. 18 may be presented. In response to presentation of the user interface, the workflow-enabled provider 102 receives 1514 input from the user. The workflow-enabled provider 102 then sends 1516 the input to the workflow-enabled client 106. As shown in FIG. 15B, the workflow-enabled client 106 receives the input and compares 1518 it to the password corresponding to the print job. Then the workflow-enabled client 106 determines 1520 whether the password corresponds to the password for the user and/or the document. If the password matches, the workflow-enabled client 106 sends 1524 a TRUE message to the workflow-enabled provider 102. However if the password does not match, the workflow-enabled client 106 sends 1522 a FALSE message to the workflow-enabled provider 102. The workflow-enabled provider 102 receives 1526 the message, and determines 1528 whether it is a TRUE message. If the message is not a TRUE message, the workflow-enabled provider 102 proceeds 1530 to display an error message indicating that the input password does not match and ends. However if the message is TRUE, the workflow-enabled provider 102 prints the document and the method is complete.

Figure 15C:
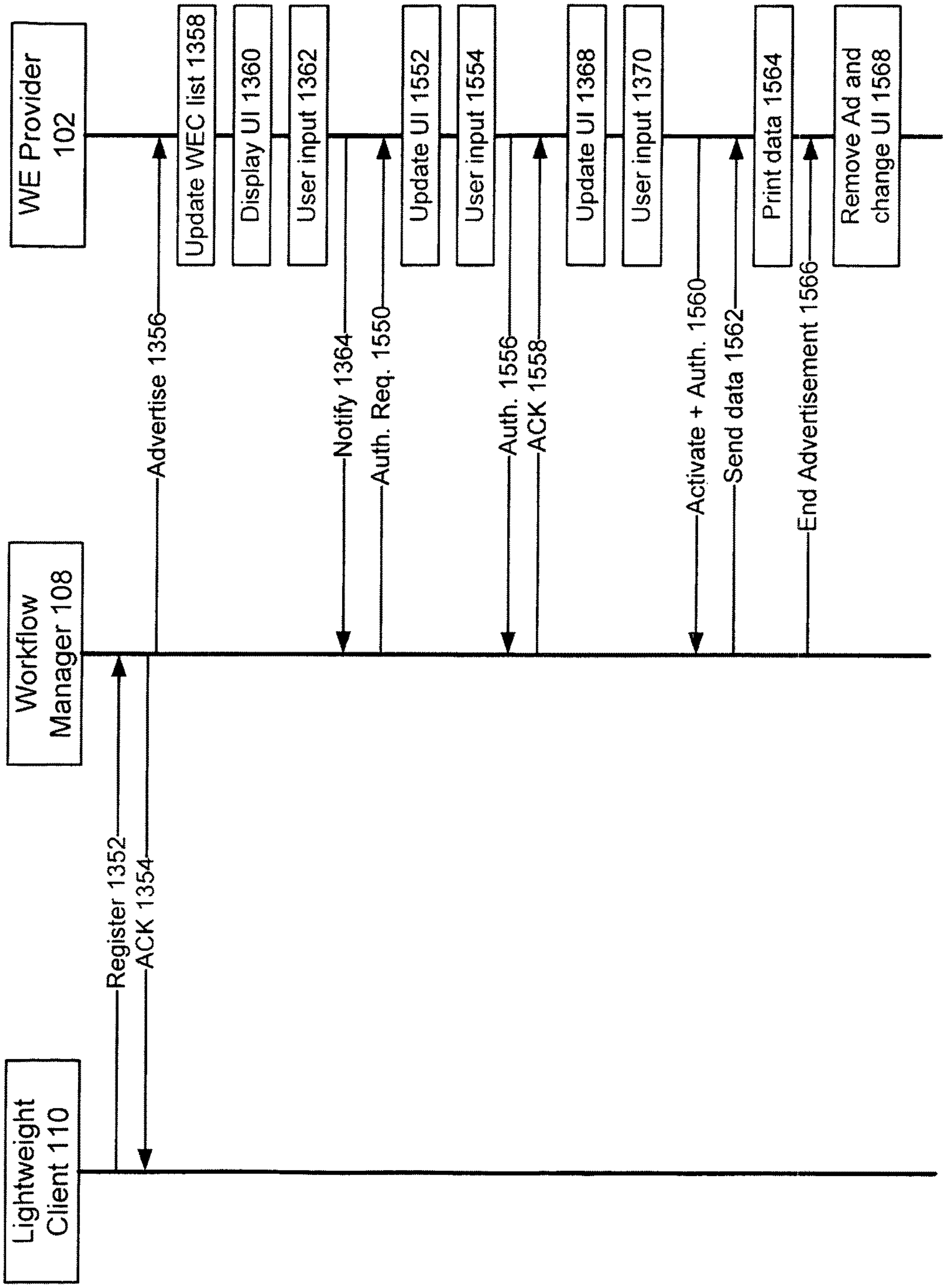
FIG. 15C is a trace diagram of a method for performing a lock print operation with the workflow-enabled system in accordance with a second embodiment of the present invention.

Referring now to FIG. 15C, a method for performing a lock print operation with the second embodiment (e.g., WITH the workflow manager 108) of the distributed workflow-enabled system 100B of the present invention is shown. FIG. 15C illustrates a trace diagram of the steps and components (lightweight client 110, workflow manager 108 and workflow enabled provider 102) for performing "lock print" operation. A "lock print" operation entails the user sending a document to a specified device for printing and requiring that the user enter a code into the printing device before the printing device renders and outputs the printed document. The method begins by registering 1352, 1354 the lightweight client 110, advertising 1356 it, updating 1358 the workflow-enabled client list, displaying 1360 a GUI and receiving 1362 user input. In one embodiment, the registration 1352 includes a persistence flag described above set to "no" which means the lock print client will be advertised until is has been activated, and at point will automatically no longer advertised. These steps are similar to those that have been described above with reference to FIG. 13B. Since the lightweight client 110 performs a "lock print" operation, the step of registering 1352 includes information about the name (and possibly higher-level menu items) under which the client should be listed, a PIN that should be required and a file to be printed. In one embodiment, the registering step 1352 is an HTTP request sent from the lightweight client 110 to the workflow manager 108, for example, an HTTP POST encoded in multipart/form-data format with the fields "op=register", "name=Lock Print", "persistent=no", pin="1234", "printfile=myfile.pcl". Likewise, the UI displayed in step 1360 is a button indicating the user name and the lightweight client 110 name, in this case "Lock Print." After the workflow-enabled provider 102 receives 1362 user input, the method continues by sending 1364 a notification signal from the workflow-enabled provider 102 to the workflow manager 108. The notification signal also includes an identification number for the workflow-enabled client 106. For example, a notification signal may be an HTTP GET request for a URL of the form "http://workflow-manager-host:port/client-external-ID/?op=hello" sent from the workflow-enabled provider 102 to the workflow manager 108, where workflow-manager-host is the hostname or IP address for the workflow manager 108, port is the port on which the manager is listening, client-external-ID is the external identification number for the lightweight client 110, and "op=hello" identifies this request as a notification that the client has been selected and a request for any user interface elements that should be displayed. Since this operation is a "lock print" operation that requires that the user input a code, PIN or password, the workflow manager 108 enforces such a requirement by responding 1550 to the workflow-enabled provider 102 with a response indicating that authorization is required. For example, the response may be HTTP Response: Authentication Required (401). Then the workflow-enabled provider 102 updates 1552 the UI to solicit a code or password. For example, if the workflow-enabled provider 102 has a keypad separate from the display, the workflow-enabled provider 102 displays a message to use the keypad to enter the code. On the other hand, if the workflow-enabled provider 102 has a touch screen, the workflow-enabled provider 102 displays a keypad and a label requesting the user input his code. Then the workflow-enabled provider 102 receives 1554 input from the user. The workflow enabled provider 102 generates credentials based on the password provided and sends those credentials along with another notification request 1556 it to the workflow manager 108. For example, this can be an HTTP request such as HTTP GET to http://workflow-manager-host:port/client-external-ID/?op=hello using Basic HTTP Authentication or Digest HTTP Authentication as specified by the authentication required response 1550, using the client's top-level menu name as the username for the authentication and the user-supplied password. The workflow manager 108 receives the authorization code and confirms that it is valid by comparing it to the code received from the lightweight client 110 during registration. If the authorization code does not match, the workflow manager 108 sends (not shown) a response to the workflow enabled provider 102 indicating that the code is not valid such as HTTP Response: Unauthorized (401). Upon receiving such a response, the workflow enabled provider 102 can terminate or provide the user with another opportunity to reenter the correct code such as by presenting the keypad UI and accepting user input again. In another embodiment, the workflow-enabled provider 102 allows the user to input code attempts a predetermined number of times before blocking access. If the authorization code does match, the workflow manager 108 sends 1558 an acknowledgment response such as HTTP Response: OK. The body of this response includes any user interface elements to display, e.g. text, checkboxes or other form elements. In one embodiment, the response is encoded in a text-based markup language. In another embodiment the response is encoded in HTML. Then the method updates 1368 the UI to show the returned user interface elements (if any) along with a print button, and receives 1370 user input such as selection of checkboxes and/or selection of the print button in a similar fashion to that described above with reference to FIG. 13B. The workflow-enabled provider 102 then sends 1560 an activation request to the workflow manager 108. For example, the workflow-enabled provider 102 may send an HTTP request (HTTP POST encoded as either multipart/form-data or application/x-www-url-encoded form data, with the field "op=activate" and any selected checkboxes or other form information encoded as their own fields) to the workflow manager 108. The workflow-enabled provider 102 may also include the HTTP request header "Accepts", indicating what format(s) the provider will accept for printing. In response, the workflow manager 108 again confirms the authorization code and then sends 1562 a response including the file to be printed to the workflow enabled provider 102. In one embodiment, the response is HTTP Response: OK, with the file to be printed as the body of the response. The response is then received at the workflow-enabled provider 102 and the file is printed 1564 to complete the method. After the activation request 1560 is received by the workflow manager 108, the workflow manager 108 sends and end advertisement response 1566 to the workflow-enabled provider 102, the workflow-enabled provider 102 removes 1568 the lightweight client 110 from the list of available workflow-enabled clients 106 (WEC list) and updates its user interface.

Those skilled in the art will recognize that a similar process to that just described above can be used for a simpler operation of "Print4Me" where a PIN is not required. Such an operation utilizing a system 100B of the present invention would include many of the steps of FIG. 15C. However, such and embodiment would differ from FIG. 15C in the following respects: 1) instead of an authorization request 1550, text to display in the UI would be returned; 2) step 1552 would display the text; 3) step 1554 would include the user selecting a "Print4Me" operation and the start button; and 4) steps 1556, 1558, 1368, and 1370 would be omitted. Furthermore, this basic operation of "Print4Me" could be combined with other operations by the workflow-enabled provider 102 or the lightweight client 110 to provide enhanced operations such as a "print daily news" where the workflow-enabled provider 102 or the lightweight client 110 accesses web services providing news content and the workflow-enabled provider 102 prints the content.

Furthermore, referring now to both FIGS. 13B and 15C, those skilled in the art will recognize that selected steps from those processes can be combined to create a "Locked Scan2Me" workflow-enabled client 106. The "Locked Scan2Me" is similar to the "Scan2Me" but also requires that the user input a PIN to use the "Locked Scan2Me". In one embodiment, the basic "Scan2Me" process of FIG. 13B is modified to replace step 1366 with steps 1550, 1552, 1554, 1556 and 1558 of FIG. 15B to present a request for a PIN to the user, accept the PIN and send the PIN or an authorization to the workflow manager 108.

Figure 22A:
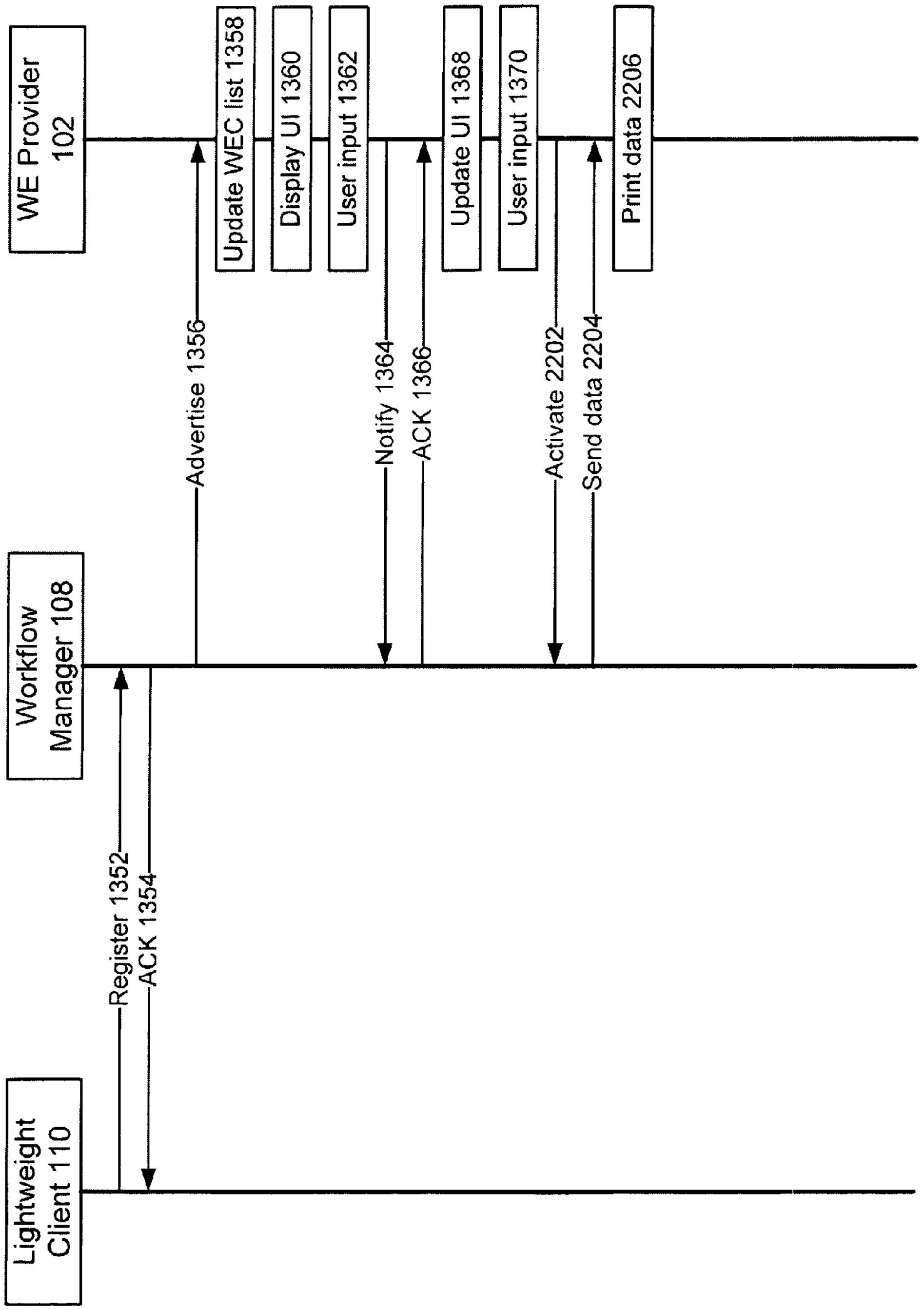
FIGS. 22A and 22B are trace diagrams of embodiments for performing a printing of daily news content in accordance with the present invention.
Figure 22B:
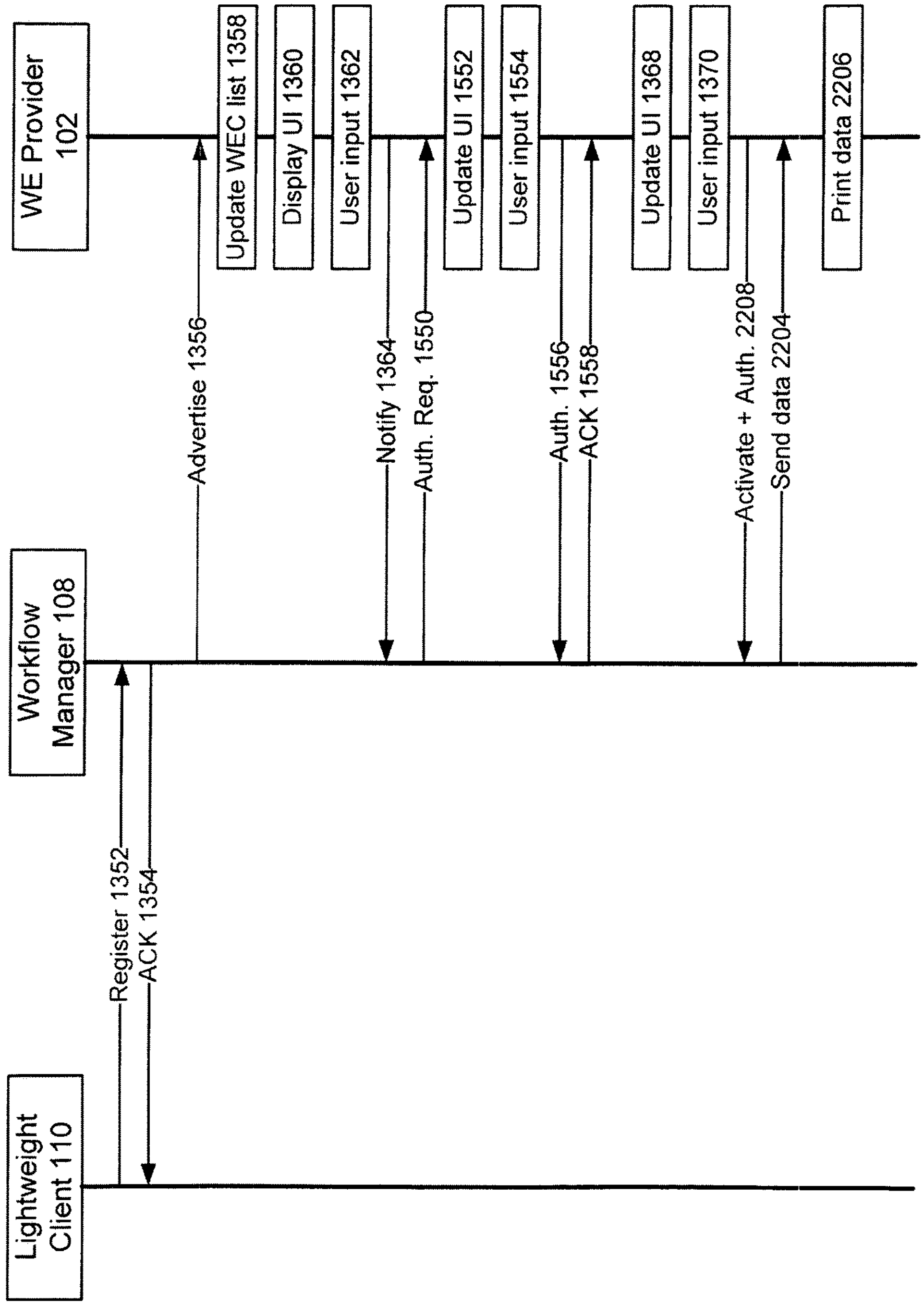

Referring now to FIGS. 22A and 22B, embodiments for printing daily news content using the second embodiment (e.g., WITH the workflow manager 108) of the distributed workflow-enabled system 100B are described.

FIG. 22A shows a first embodiment of a method for printing daily news content. The printing daily news content operation is an operation in which the lightweight client 110 provides news information for the current day such as may be retrieved from any number of online providers of news. This information is packaged into a file that can be sent to any printing device to generate a printed document. The method assumes the workflow-enabled client 106 has retrieved the news content and created a printable file including the news content. The method then registers 1352, 1354 the lightweight client 110, advertises 1356 it, updates 1358 the workflow-enabled client list, displays 1360 a GUI and receives 1362 user input, updates 1368 the GUI and receives 1370 user input. These steps are similar to those that have been described above with reference to FIG. 13B. However, since the workflow-enabled client 106 performs a print daily news operation, the step of registering 1352 includes information about the user, an indication that the operation is to print daily news, and the file to be printed. For example, the lightweight client 110 sends the request, for example, an HTTP POST encoded in multipart/form-data format with the fields "op=register", "name=Dailynews", "persistent=no", pin="1234", "printfile=myfile.pcl" to the workflow manager 108. The workflow manager 108 responds as described above with a response including a location. Likewise, the UI displayed in step 1360 is a button indicating in the username and the lightweight client name 110, in this case "Daily News." Once the user has selected 1362 the "Daily News" operation and selected 1370 the start button, the workflow-enabled provider 102 continues the process by sending 2202 an activation request to the workflow manager 108. For example, the workflow-enabled provider 102 may send an HTTP request (HTTP POST encoded as either multipart/form-data or application/x-www-url-encoded form data, with the field "op=activate" and any selected checkboxes or other form information encoded as their own fields) to the workflow manager 108. In response to the activation request, the workflow manager 108 sends 2204 a response including the data to be printed. For example, the response may be HTTP response: OK, with a printable file encoded in the body of the response. Once the workflow-enabled provider 102 receives the request and the file named "my-news.pcl," it proceeds to print 2206 the file. Those skilled in the art will recognize that this application is particularly advantageous because the registration and advertisement happen in the background and automatically without user involvement. For the user, all he needs to do is approach the workflow-enabled provider 102, select his user name, select the "Daily News," and select the start button, then workflow-enabled provider 102 prints copy of that day's news.

FIG. 22B shows a second embodiment of a method for printing daily news content where a personal identification number is also required. The second embodiment for printing daily news includes many of the same steps as described above for the first embodiment; therefore, like reference numerals are used for steps having the same or similar functionality. The second embodiment for printing daily news performs the steps of registration 1352 through notification 1364 in the same way as described above with reference to FIG. 22A. However, since a personal identification number before the daily news is printed, second embodiment for printing daily news performs authorization request an acknowledgment in the same way as has been described above for the lock print operation of FIG. 15C. In particular, the workflow manager 108 sends 1550 a notification that authorization is required to the workflow-enabled provider 102. The workflow-enabled provider 102 updates 1552 the UI and receives 1554 user input, then sends 1556 an authorization information in a request to the workflow manager 108. The workload manager 108 then sends 1558 an acknowledgment response that allows the workflow-enabled provider 102 to update on 368 its UI to show start button and accept 1554 user selection of the button. In response, the workflow-enabled provider 102 sends 2208 an activation request including the authorization information such as a PIN. The authorization information is processed by the workflow manager 108 and if valid, the workflow manager sends 220 for the data for printing. The method completes by printing 2206 the received file.

Figure 23:
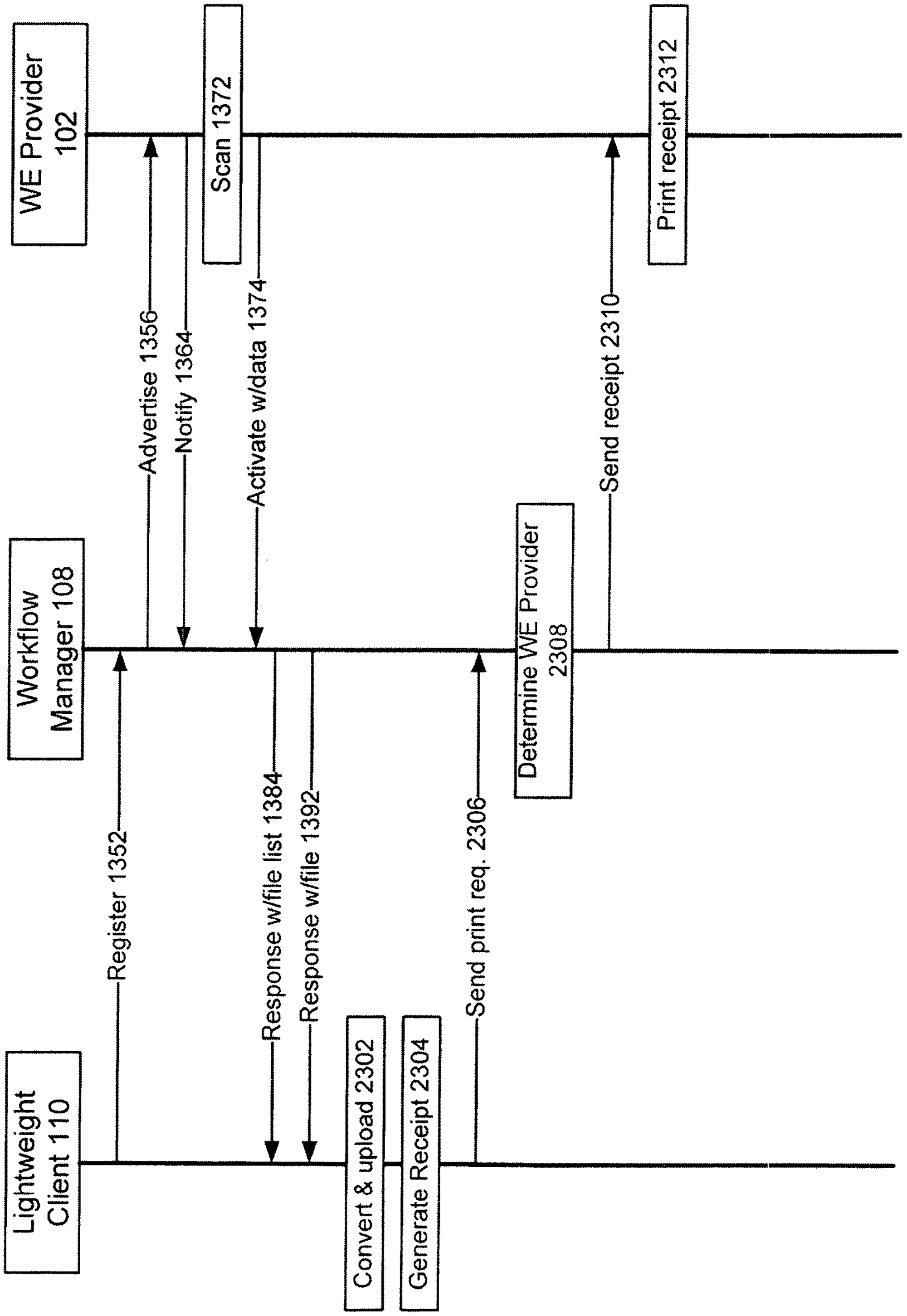
FIG. 23 is a trace diagram of an embodiment for a scan and print operation in accordance with the present invention.

FIG. 23 illustrates a method for using the distributed workflow-enabled system 100B to perform a "Scan and Print" operation. This method for printing based on something that has been scanned, e.g. scanning a document to an online repository and then printing a receipt that includes a thumbnail image of the document scanned plus a 2D barcode that can be used to identify that document for later retrieval. This process starts with the "Scan2Me" process as represented in FIG. 23 by the selected steps of registering 1352, advertising 1356, notifying 1364, scanning 1372, activating 1374 and responding with the file 1392. Even though only selected steps of FIG. 13B are shown, they are intended to represent the entire process of FIG. 13B. Once the lightweight client 110 has retrieved the scanned page(s), the lightweight client 110 converts 2302 the page image(s) to a format the online repository can accept (e.g. to a single PDF document) and uploads it to an on-line repository (not shown). Then the lightweight client 110 generates 2304 a receipt based on the images plus any information returned by the online repository. The lightweight client 110 next asks the workflow manager 108 to print the receipt on its behalf by sending 2306 a print request to the workflow manager 108. For example, the print request may be an HTTP POST to http://workflow-manager-host:port/client-internal-ID/activation-directory/with the fields "op=print" and "printfile=<receipt-print-file.pdf>" specified, where printfile.pdf contains the file contents of the receipt that should be printed. The workflow manager 108 determines 2308 the workflow enabled provider 102 that performed 1372 the scan and sent the activate 1374 request (e.g., originally performed the activation that created the <activation-directory> specified in the print request URL). The workflow manager 108 then initiates 2310 a request to the identified workflow enabled provider 102 to print the file, for example using a standard print protocol such as LPR or IPP, and the workflow enabled provider 102 prints 2312 the receipt.

User Interfaces

Referring now to FIGS. 16-21 various different user interfaces and user interface flows are shown. These user interfaces are provided only by way of example and a variety of other display formats styles and content may be included within the user interfaces generated by the user interface modules 402, 502, 452, 552.

Figure 16:
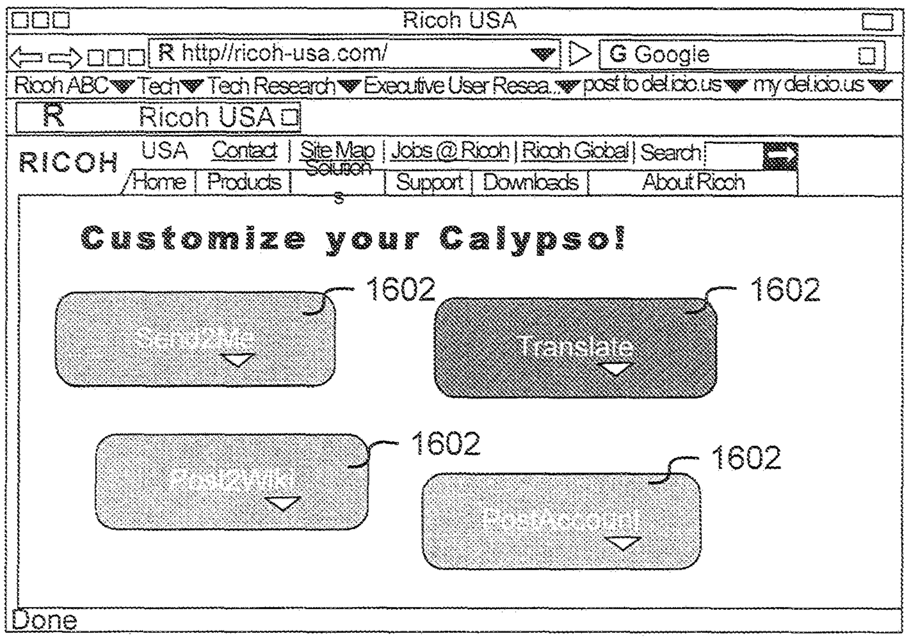
FIG. 16 is a graphical representation of an example of a user interface for a client in accordance with the present invention.

FIG. 16 is a graphical representation of an example user interface 1600 for the workflow-enabled client 106 in accordance with the present invention. The user interface 1600 is shown displayed in a browser and includes icons 1602 for the particular workflow-enabled clients 106 that are available. The user interface 1600 presents various applications from which the user can select for execution. As can be seen, different colors can be used for each icon 1602 so that each operation is distinguishable. Furthermore, each of the icons 1602 can represent a selectable area in which input such as a double-click will initiate that particular application. The user interface 1600 also inherently indicates which workflow-enabled clients 106 have been downloaded and enabled on the workflow-enabled client 106 by virtue of their presence. The display panel of the workflow-enabled provider 102 may also display the user interface 1600 in a similar fashion. For such an implementation, the display panel may be a touch screen that allows the user to select the icons 1602.

Figure 17:
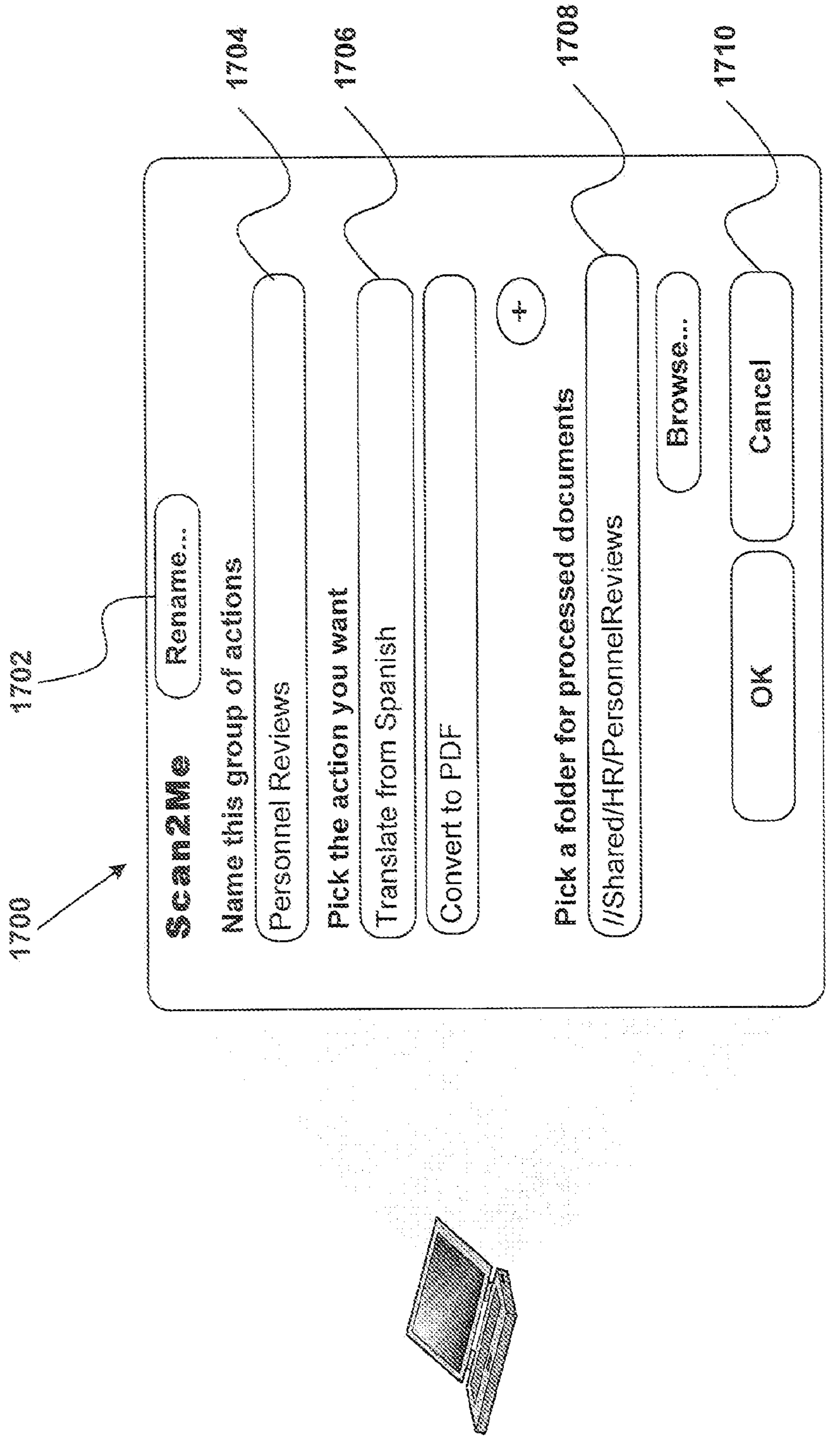
FIG. 17 is a graphical representation of an example of a user interface of a client for a scanning operation in accordance with the present invention.

FIG. 17 is a graphical representation of another example user interface 1700 of the workflow-enabled client 106 in accordance with the present invention. The user interface 1700 is representative of an interface that is presented after selection of an icon 1602 in the user interface 1600 of FIG. 16. The user interface 1700 corresponds to the Scan2me operation, and presents information as well as a number of areas to modify the workflow of the corresponding workflow-enabled client 106. For example, the user is allowed to customize the name of the workflow-enabled client 106 to any particular name that may be more relevant to the user using the rename button 1702. The operation may also be nested or grouped with other operations as desired by the user using the grouping button 1704. Additionally, beyond just scanning a document and sending it to the workflow-enabled client 106, the user can specify additional operations be performed on the scan using button 1706. The user may also specify using the interface 1700 where the output is to be stored using button 1708. Finally, the user interface includes conventional buttons 1710 for activating the operation or canceling it.

Figure 18:
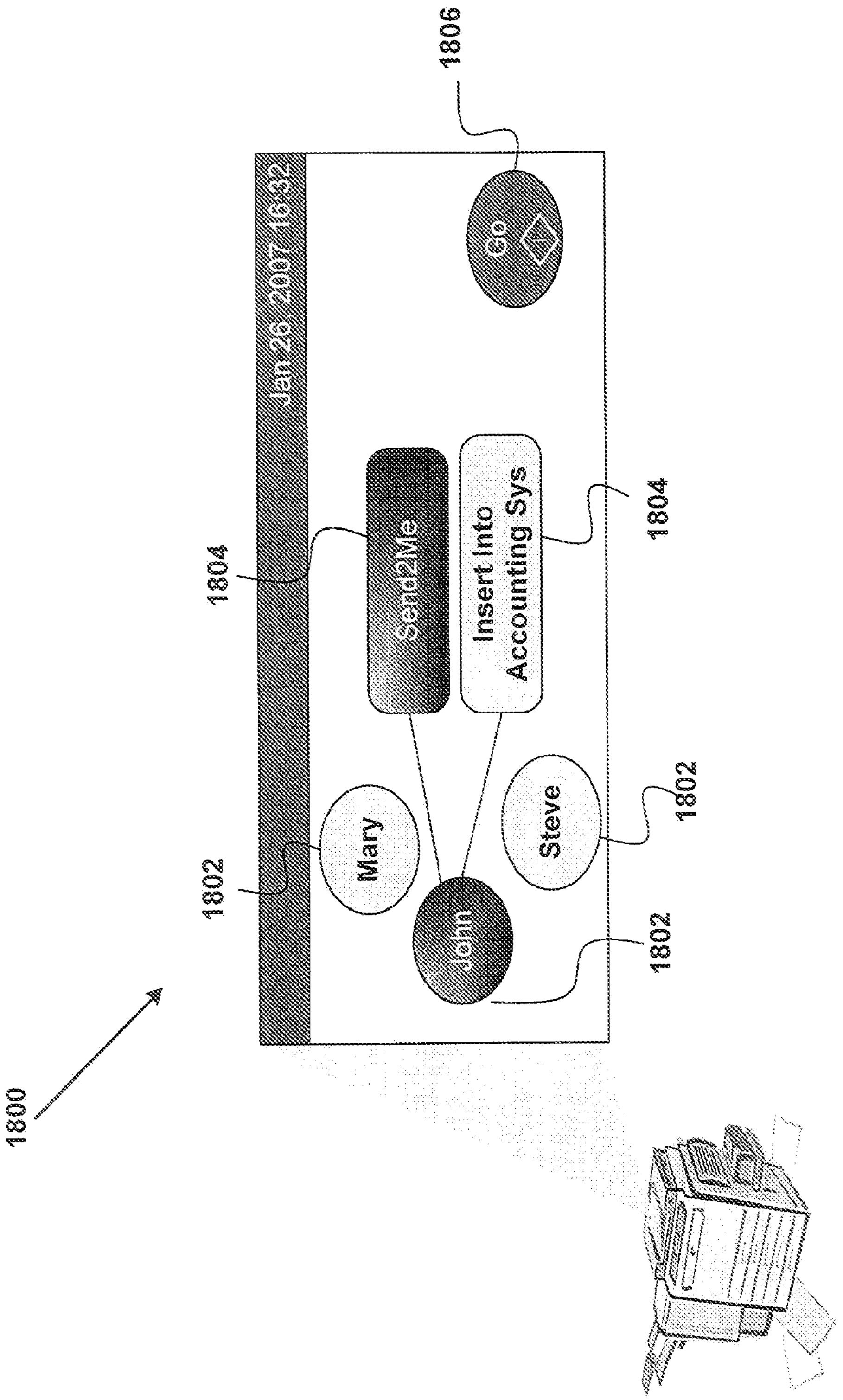
FIG. 18 is a graphical representation of an example of a user interface of a provider in accordance with the present invention.

FIG. 18 is a graphical representation of an example user interface 1800 of the workflow-enabled provider 102 in accordance with the present invention. The user interface 1800 includes three portions. In a first portion, the user interface 1800 presents a number of icons 1802 each that represents a different user. It should be noted that the icons 1802 have a similar shape but may have different colors or labels identifying the users. In a second portion the user interface 1800 another group of icons 1804 each correspond to workflow-enabled clients 106 that are enabled by the workflow-enabled provider 102 and registered. In one embodiment, the icons 1804 shown in this second portion of the user interface 1800 are specific only to those that have been enabled and registered for the selected user. In an alternate embodiment, icons 1804 shown in the second portion of the user interface 1800 include all the available workflow-enabled clients 106 for any user. In yet another embodiment, the icons 1804 are not shown, but as the user is selected, the corresponding icon 1804 are shown in a highlighted manner such as a different color, and icons 1804 representing the workflow-enabled clients 106 available to that user are shown in the second portion of the user interface 1800. After the user has selected an icon 1804 corresponding to a particular workflow-enabled client 106, that icon 1804 is displayed in a highlighted manner such as a color matching that of the user icon 1802. This specific example is shown in FIG. 18. Finally, a third portion of the user interface 1800 includes an icon 1806 selectable to initiate the execution of the workflow-enabled client 106 selected in the user interface 1800. In one embodiment, the icon 1806 does not appear until after the user has selected an icon 1804 corresponding to a specific workflow-enabled client 106.

Figure 19:
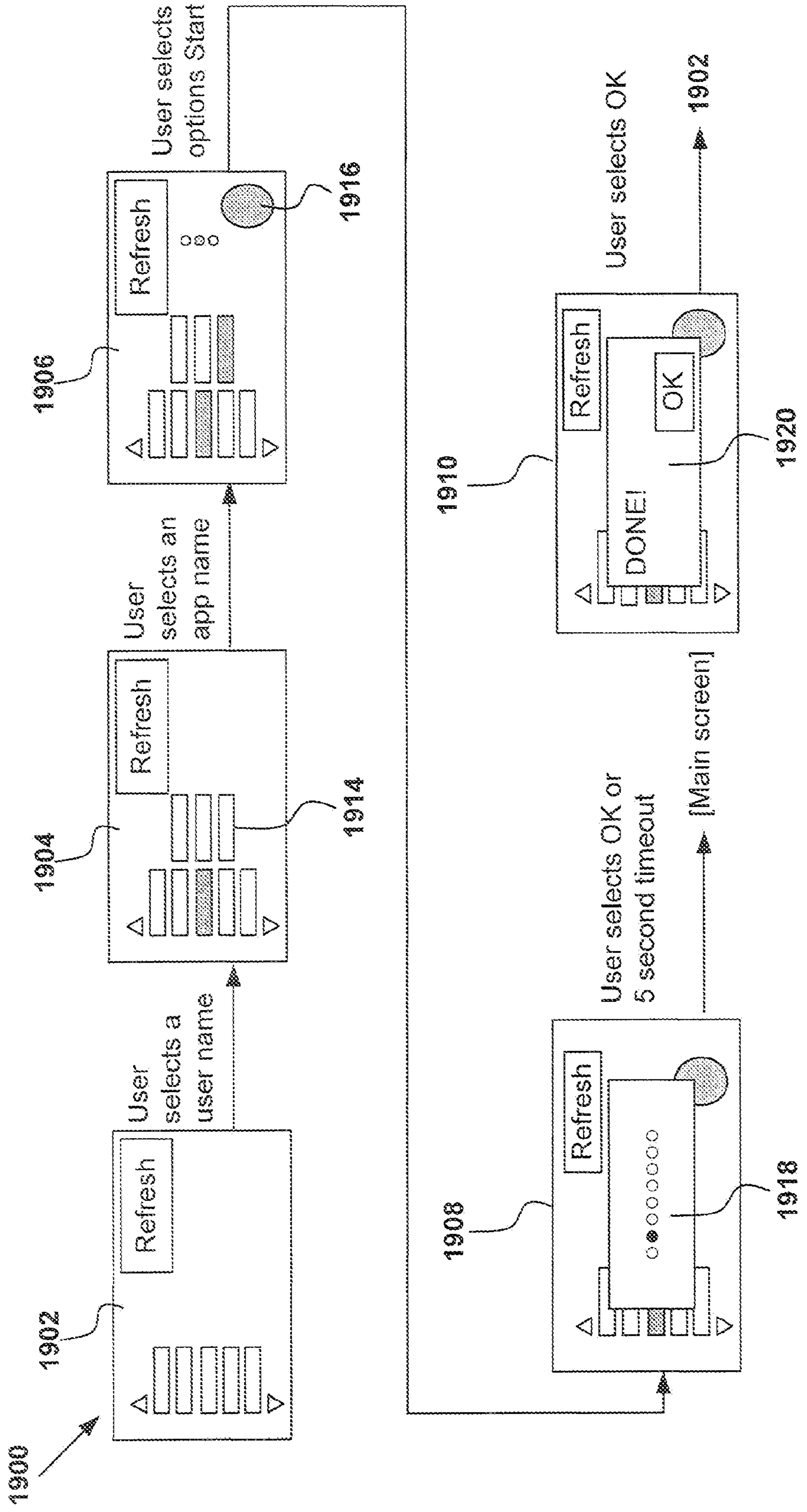
FIG. 19 is flow chart of graphical representations of example user interfaces in accordance with the present invention.

Referring now to FIG. 19, a flow chart 1900 of graphical representations of example user interfaces is shown. FIG. 19 shows the user interfaces for general operation of the present invention. Example user interfaces 1902, 1904, 1906, 1908 and 1910 generated by the present invention and the transitions between them are shown in a flow chart 1900. The dynamic user interface unit 902 first generates the main screen 1902. In this main screen 1902, the workflow-enabled provider 102 polls workflow-enabled clients 106 and displays an alphabetically ordered list of available user names as buttons 1912. In this embodiment, the buttons 1912 are centered vertically with scroll arrows if there are too many usernames for the display area. Until selection, the buttons 1912 are shown with the same visual attributes but with different identifying labels corresponding to the usernames. Once the user selects a button on the user interface 1902, the dynamic user interface unit 902 updates to display to present user interface 1904 which includes a list of available workflow-enabled clients 106 for the selected user. The list of available workflow-enabled clients 106 is presented as a series of additional buttons 1914 in a second column. The workflow-enabled provider 102 also highlights the user name that has been selected and organizes the application buttons 1914 in a manner similar to the user buttons. Other embodiments might include additional menus above user names, e.g. dividing users into separate menus based on the first letter of their name, or additional menus between users and application names, e.g. dividing applications into "for work" and "for fun". Other embodiments might also replace user name menus with an entirely different hierarchical organization, e.g. by department or type of application, or might even list application buttons with no first-level category if the number of applications is small. Once the user has selected an application, the user interface transitions from interface 1904 to interface 1906. In user interface 1906, the workflow-enabled provider 102 highlights the workflow-enabled client 106 name and displays a list of available options for that workflow-enabled client 106 along with a start button 1916. When the user selects options and the start button 1916, the workflow-enabled provider 102 transitions to display the processing user interface 1908. In the processing user interface 1908, the workflow-enabled provider 102 displays an overlay panel 1918 with the progress animation. When processing is complete, the overlay panel 1918 displays a completion message which may be unique to the application and an OK button. In one embodiment, the completion message times out after a predetermined amount of time and returns to the main screen interface 1902. If there is an error during processing, the display is updated to user interface 1910 in which a new overlay panel 1920 with an error message is displayed with an OK button. After selection of the OK button, the provider displays the main screen interface 1902.

Figure 20:
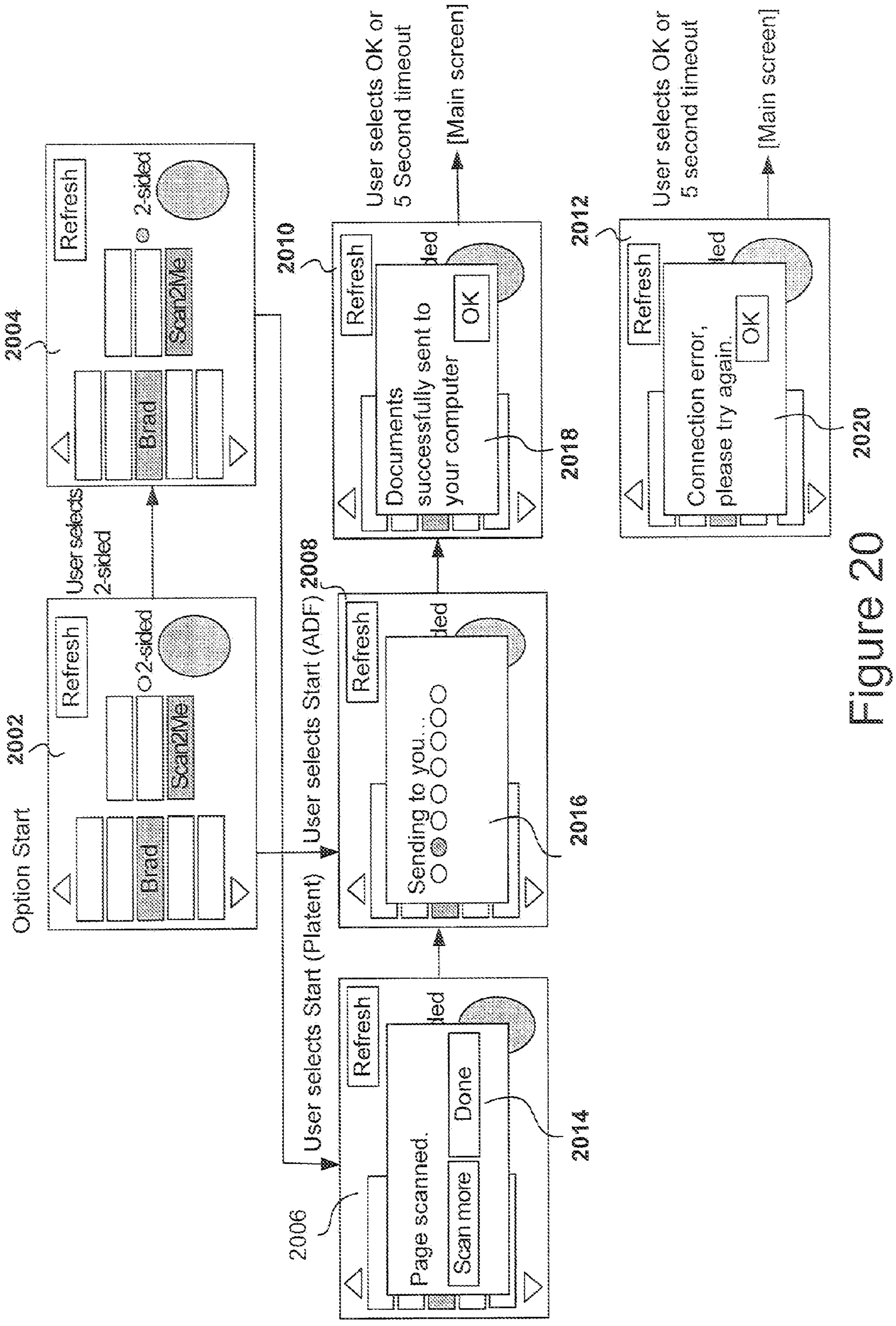
FIG. 20 is flow chart of graphical representations of example user interfaces for a scan operation in accordance with the present invention.

FIG. 20 shows a flow chart of graphical representations of example user interfaces 2002, 2004, 2006, 2008, 2010 and 2012 for a Scan2me operation in accordance with the present invention. In addition, some of the user interfaces described above with reference to FIG. 19 are also utilized, however, for ease of understanding and simplicity only the user interfaces 2002, 2004, 2006, 2008, 2010 and 2012 particular to the Scan2me operation will be described. Once the user has traversed the main menu and selected a user and the Scan2me operation, the options/start user interface 2002 is presented. If the user selects the two-sided option, the user interface is updated to reflect the selection as shown by user interface 2004. If the user has selected two-sided operation, the scanned pages must be manually fed into the workflow-enabled provider 102 and an overlay panel 2014 is provided over the user interface 2006 to provide status as to its manual scanning and provide buttons to indicate completion or additional pages to scan. Alternatively, if two-sided operation was not selected, the automatic document feeder of the workflow-enabled provider 102 is utilized and the next user interface presented to the user is user interface 2008. The user may also transition from user interface 2006 to user interface 2008 if paid scanning has been completed. User interface 2008 includes an overlay panel 2016 indicating the status of the operation such as "sending to you". Once the document has been transmitted to the workflow-enabled client 106, the workflow-enabled provider 102 transitions to user interface 2010 in which an overlay panel 2018 informs the user that the documents have been successfully sent to the workflow-enabled client 106. After a predetermined amount of time or selection of an OK button of user interface 2010, the user interface transitions to display the main user interface 1902. If an error occurs during scanning or transmission, user interface 2012 is displayed. User interface 2012 includes a display overlay informing the user of the error and presenting a confirmation button. After a predetermined amount of time or selection of an OK button of user interface 2012, the user interface transitions to display the main user interface 1902.

Figure 21:
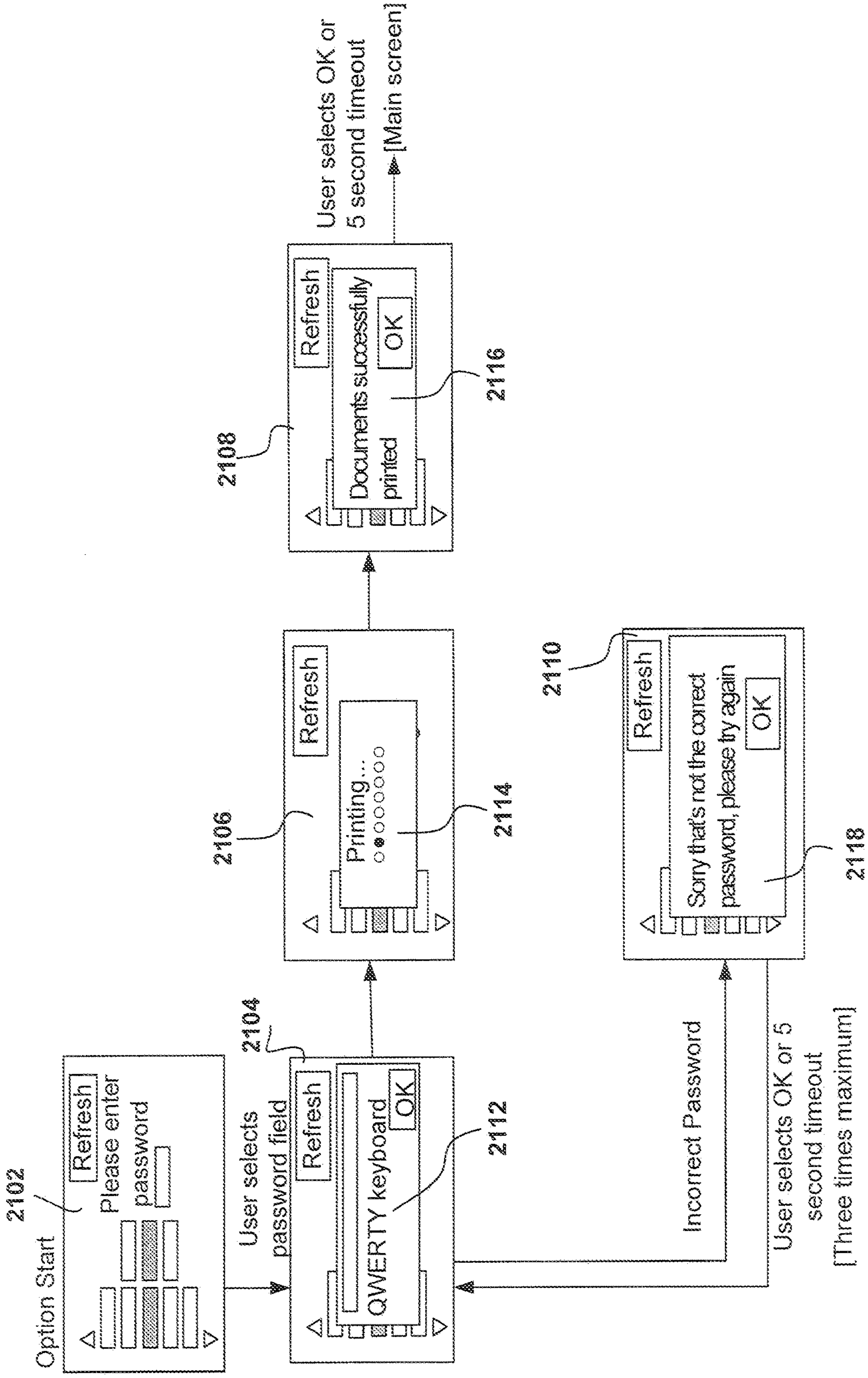
FIG. 21 is a flow chart of graphical representations of example user interfaces for a lock print operation in accordance with the present invention.

FIG. 21 is a flow chart of graphical representations example user interfaces 2102, 2104, 2106, 2108, 2110 for the lock print operation in accordance with the present invention. Once the user has traversed the main menu 1902 and selected the lock print operation, the options/start user interface 2101 is presented. The options/start user interface 2102 includes an input box for the user to input his password. The user selects the password field of the options/start user interface 2102 which causes the workflow-enabled provider 102 to update the display to show the password input interface 2104. This user interface 2104 provides an overlay panel 2112 that provides a QWERTY keyboard for inputting a password and a button. If the user inputs an incorrect password, the workflow-enabled provider 102 displays the error user interface 2110. The error interface 2110 includes an overlay panel 2118 that informs the user that the password was not correct. In one embodiment, the password input user interface 2104 is re-presented. In another embodiment, the main menu user interface 1902 is presented. If the user inputs the correct password, the workflow-enabled provider 102 displays a series of status user interfaces 2106, 2108 in which overlay panels 2114, 2116 notify the user that the document is printing and that printing has completed. Once printing is completed the main menu user interface 1902 is presented.

Figure 24:
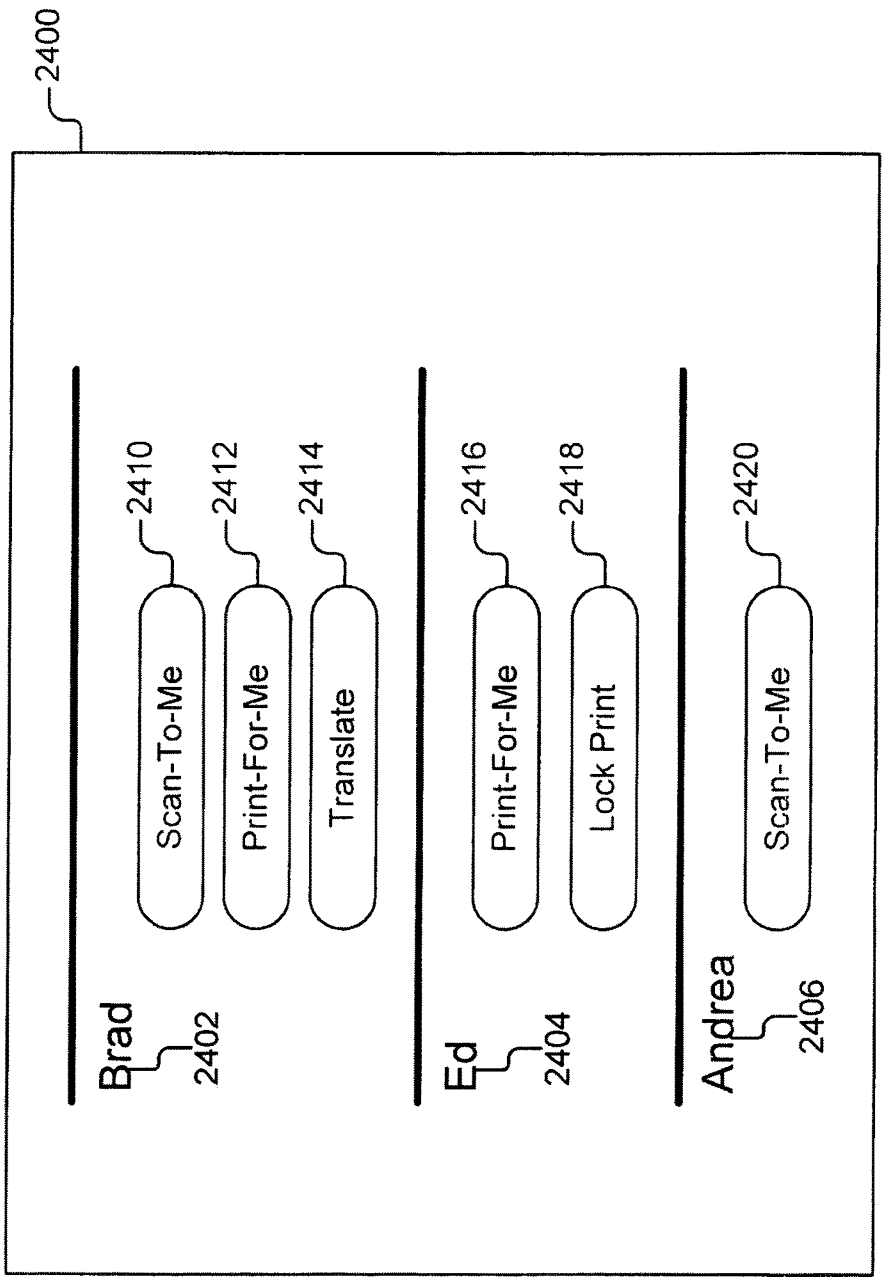
FIGS. 24-26 are a graphical representations of additional example user interfaces of a provider in accordance with the present invention.

FIG. 24 is a graphical representation of an example user interface 2400 of the workflow-enabled provider 102 in accordance with the present invention. The user interface 2400 is dynamically generated and includes a plurality of areas corresponding to users 2402, 2404 and 2406. Within each area, the user interface 2400 presents a number of icons or buttons 2410-2420. Each of each icons 2410-2420 corresponds do a different workflow-enabled client 106 that is available to the user corresponding to the area. For example, a first user 2402, Brad, has three workflow-enabled clients 106 available as represented by icons 2410, 2412 and 2414.

Each of the icons advantageously identifies the functionality available by their labels as well as serves as a button 2410, 2412 and 2414 to initiate the corresponding workflow-enabled client 106. Similarly, a second user 2404, Ed, has two workflow-enabled clients 106 available while a third user 2406, Andrea, with his own area has a single three workflow-enabled clients 106 available. The user interface 2400 is particularly advantageous because it is dynamically generated based on advertisements and groups the available workflow-enabled clients 106 by user for easy identification and selection.

Figure 25:
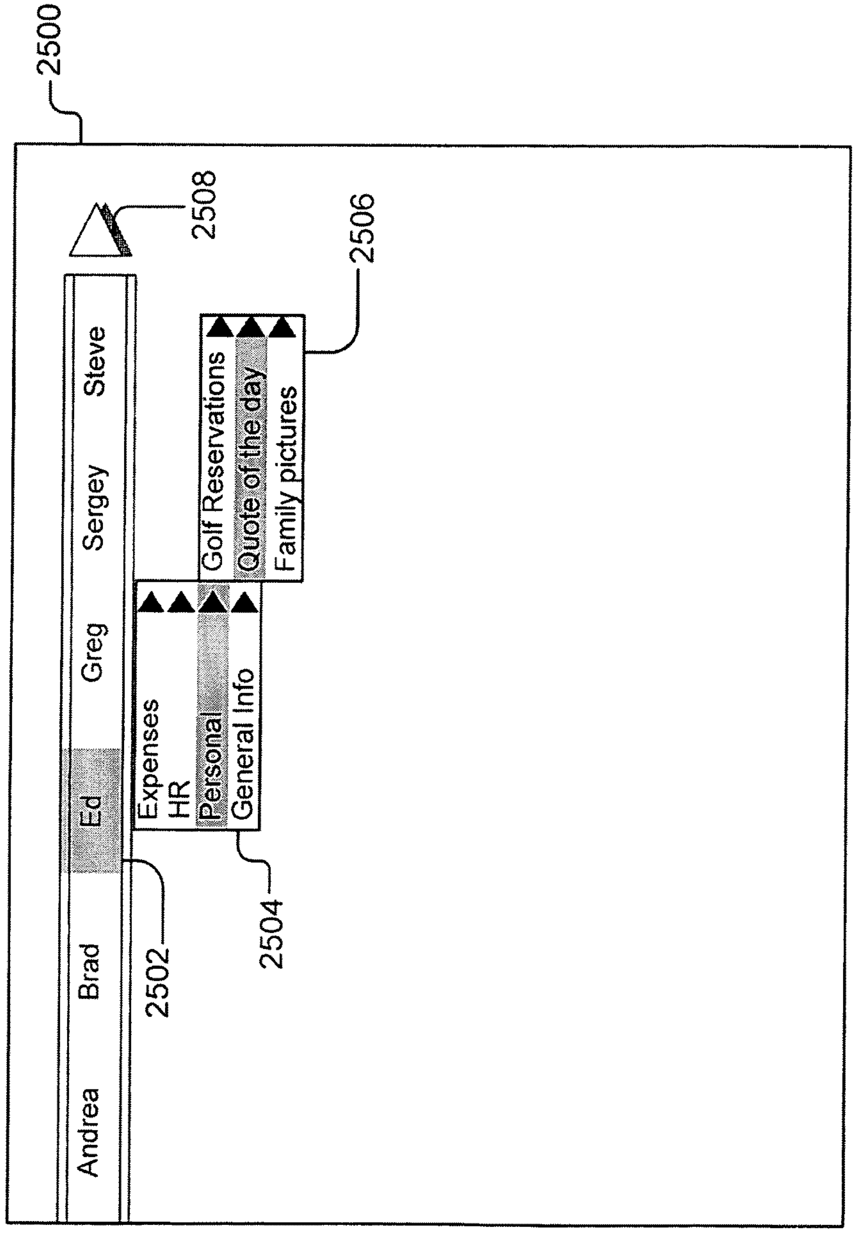

FIG. 25 is a graphical representation of yet another example user interface 2500 of the workflow-enabled provider 102 in accordance with the present invention. The user interface 2500 is also dynamically generated and includes a pull down menu bar 2502 of a plurality of users listed on the menu bar 2502. Since display space may be limited, additional user may be accessed by a scroll button 2508. As shown for a particular user, Ed, there is an initial pull down menu 2504 and second menu 2506 based on the selection in the initial pull down menu 2504. While the initial pull down menu 2504 shows broad categories of functional tasks, any type of organization may be used. While this example uses user names as the top level menu items, as described earlier other menu names, e.g. broad categories of functional tasks, may also be used for the top-level menu names.

Figure 26:
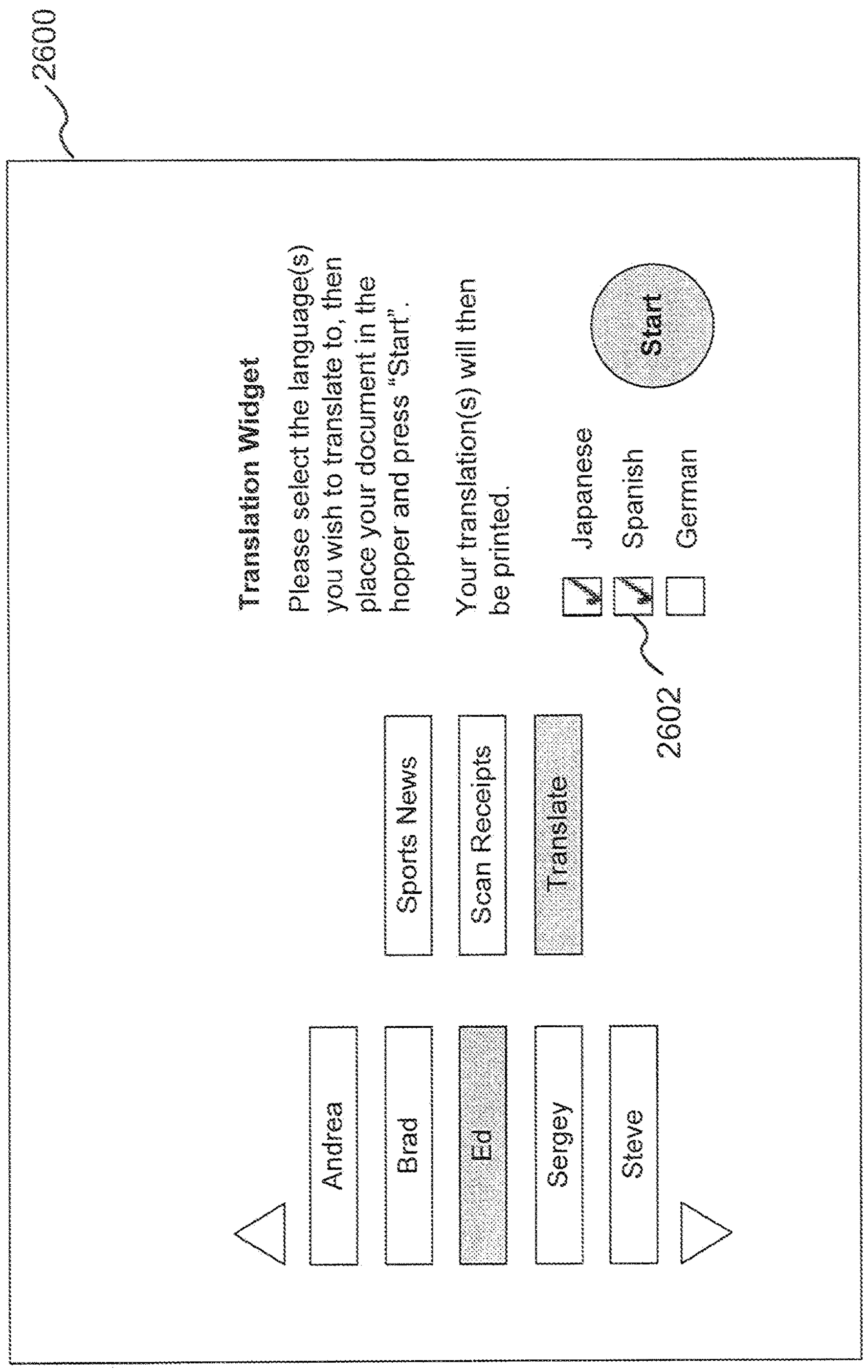

FIG. 26 is a graphical representation of yet another example user interface 2600. Like the user interface of FIGS. 19-21, three workflow-enabled clients 106 are shown. FIG. 26 also shows how the additional check boxes 2602 can be provided on the user interface 2600. These additional check boxes 2602 allow the user to input parameter that may be specific to the workflow-enabled client 106 that has been selected. This provides the present invention with an additional level of flexibility in modifying the workflow to match the exact needs and desires of the user. For example, the user interface 2600 allows the user to select the type of translation desired once the translation workflow-enabled client 106 has been selected. In accordance with the present invention the check boxes are dynamic and change depending on the workflow-enabled client 106 that has been selected, and may be dynamically generated by the workflow-enabled client 106 at the time it is selected.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A system for performing workflow services, the system comprising:

a first workflow-enabled client for allowing a user to specify a workflow service to be performed by a workflow-enabled provider and to specify parameters for performing the workflow service, the first workflow-enabled client comprising a first communication manager adapted for communication and data exchange with the workflow-enabled provider, the first communication manager configured to translate a first message into commands and data for performing the workflow service that are recognizable by the workflow-enabled provider; and an office device comprising the workflow-enabled provider for performing the workflow service, the workflow-enabled provider configured to receive broadcasts from a group of workflow-enabled clients including the first workflow-enabled client responsive to registration of the group of workflow-enabled clients, the registration including assigning a workflow-enabled client in the group an internal identifier and an external identifier, the internal identifier identifying the workflow-enabled client for communication with a workflow manager, the external identifier identifying the workflow-enabled client for communication with the workflow-enabled provider, wherein the broadcasts include the external identifier of the workflow-enabled client, indicate that a corresponding workflow-enabled client is available, and include a request for the workflow services to be performed for the corresponding workflow-enabled client; discover the first workflow-enabled client from the group of workflow-enabled clients based on determining that the workflow service specified by the first workflow-enabled client can be performed by the workflow-enabled provider; activate the first workflow-enabled client using the external identifier associated with the first workflow-enabled client; dynamically create a user interface to include information about the first workflow-enabled client; and notify the first workflow-enabled client to retrieve a result using the internal identifier associated with the first workflow-enabled client, the workflow-enabled provider adapted for communication with the first workflow-enabled client.

2. The system of claim 1 wherein the first workflow-enabled client comprises:

a conventional client for interfacing with the user and performing computations; and a workflow unit for transferring the commands and data to and from the conventional client, the workflow unit adapted for communication with the conventional client and the workflow-enabled provider.

3. The system of claim 2 wherein the conventional client includes one from the group of a personal computer, a smart phone, a laptop computer, a personal digital assistant, a portable computing device, and a cell phone.

4. The system of claim 1 wherein the first workflow-enabled client comprises a lightweight client, and wherein the system further comprises a workflow manager adapted for communication with the lightweight client and the workflow-enabled provider, the workflow manager configured to manage transfer of the commands and data between the lightweight client and the workflow-enabled provider.

5. The system of claim 2 wherein the workflow unit comprises:

a process control module for controlling operation of the workflow unit, the conventional client and the first communication manager, the process control module coupled to the conventional client and the first communication manager.

6. The system of claim 2 wherein the workflow unit comprises a user interface module for dynamically generating user interfaces associated with the conventional client, the user interface module adapted for communication with the conventional client.

7. The system of claim 1 wherein the workflow-enabled provider further comprises:

a workflow unit for transferring the commands and data to and from the office device, the workflow unit adapted for communication with the office device and the first workflow-enabled client.

8. The system of claim 7 wherein the workflow-enabled provider is capable of performing one from the group of scanning, photocopying, printing, and collating.

9. The system of claim 7 wherein the workflow unit comprises:

a second communication manager for handling the communication and data exchange with other workflow-enabled providers and the group of workflow-enabled clients, the second communication manager coupled to a network; and a process control module for controlling operation of the workflow unit, the office device and the second communication manager, the process control module coupled to the office device and the second communication manager.

10. The system of claim 7 wherein the workflow unit comprises a user interface module for dynamically generating user interfaces based on the workflow service, the user interface module adapted for communication with the office device.

11. The system of claim 1 further comprising a workflow manager for managing transfer of the commands and data between the first workflow-enabled client and the workflow-enabled provider, the workflow manager adapted for communication with the first workflow-enabled client and the workflow-enabled provider.

12. The system of claim 11 wherein the workflow manager comprises a registration module for registering the first workflow-enabled client including receiving information and a parameter for execution of the workflow service, for generating a location identifier that includes the internal identifier for the first workflow-enabled client to retrieve the result, and for sending the location identifier to the first workflow-enabled client, the registration module adapted for communication with the first workflow-enabled client.

13. The system of claim 11 wherein the workflow manager comprises:

a client response module for sending information or the result of the workflow service to the first workflow-enabled client, the client response module adapted for communication with the first workflow-enabled client; and a provider response module for sending the information and commands received from the first workflow-enabled client to the workflow-enabled provider, the provider response module adapted for communication with the workflow-enabled provider.

14. The system of claim 11 wherein the workflow manager comprises an advertising module for sending a second message indicating presence of a registered first workflow-enabled client, the advertising module adapted for communication with a network and the workflow-enabled provider.

15. The system of claim 11 wherein the workflow manager comprises an information directory for storing information for delivery to the workflow-enabled provider or the first workflow-enabled client.

16. A method for providing workflow services, the method comprising:

connecting a first workflow-enabled client for communication with a network;

translating, from the first workflow-enabled client, a first message into commands and data that are recognizable by a workflow-enabled provider, the commands and data including parameters of a workflow service to be performed by the workflow-enabled provider;

transmitting the commands and data to the workflow-enabled provider;

registering a group of workflow-enabled clients including the first workflow-enabled client by assigning an internal identifier and an external identifier to the first workflow-enabled client, the internal identifier identifying the first workflow-enabled client for communication with a workflow manager, the external identifier identifying the first workflow-enabled client for communication with the workflow-enabled provider, wherein the internal identifier is included in a location identifier to determine a location from which data related to the workflow service is retrieved;

receiving, at an office device comprising a workflow-enabled provider, broadcasts from the group of workflow-enabled clients including the first workflow-enabled client responsive to registration of the group of workflow-enabled clients, wherein the broadcasts identify a workflow-enabled client using a corresponding external identifier, indicate that a corresponding workflow-enabled client is available, and include a request for the workflow services to be performed for the corresponding workflow-enabled client;

discovering the first workflow-enabled client from the group of workflow-enabled clients by the workflow-enabled provider based on determining that the workflow service specified by the first workflow-enabled client can be performed by the workflow-enabled provider;

activating, by the workflow-enabled provider, the first workflow-enabled client using the external identifier associated with the first workflow-enabled client;

displaying a user interface by the workflow-enabled provider, the user interface specifying a user and identifying the first workflow-enabled client;

receiving input at the workflow-enabled provider;

processing the input at the workflow-enabled provider to perform the workflow service and to produce results as prescribed by the parameters; and communicating the results from the workflow-enabled provider to the first workflow-enabled client for the first workflow-enabled client to retrieve the results using the internal identifier associated with the first workflow-enabled client.

17. The method of claim 16 comprising downloading the first workflow-enabled client from a defined location and running the first workflow-enabled client on a first device.

18. The method of claim 16 comprising configuring the first workflow-enabled client.

19. The method of claim 16 comprising determining whether the workflow-enabled provider is available based on monitoring signals sent from the workflow-enabled provider.

20. The method of claim 16 comprising generating and updating the user interface.

21. The method of claim 16 comprising performing additional processing on the results at the first workflow-enabled client.

22. The method of claim 16 comprising receiving authentication information before processing the input at the workflow-enabled provider.

23. A method for providing workflow services, the method comprising:

registering a group of workflow-enabled clients including a first workflow-enabled client with a workflow manager including:

assigning an internal identifier and an external identifier to the first workflow-enabled client, the internal identifier identifying the first workflow-enabled client for communication with the workflow manager, the external identifier identifying the first workflow-enabled client for communication with a workflow-enabled provider;

allocating a location identifier based on the internal identifier to the first workflow-enabled client, wherein the location identifier is used for retrieving information from the workflow manager; and specifying a workflow service to be performed by the workflow-enabled provider and specifying a parameter for performing the workflow service;

translating a first broadcast of the first workflow-enabled client into commands and data;

transmitting the commands and data over a network;

receiving, at an office device comprising the workflow-enabled provider, broadcasts, including the first broadcast, from the group of workflow-enabled clients responsive to registration of the group of workflow-enabled clients, wherein the broadcasts identify a workflow-enabled client using a corresponding external identifier, indicate that a corresponding workflow-enabled client is available, and include a request for the workflow services to be performed for the corresponding workflow-enabled client;

discovering the first workflow-enabled client from the group of workflow-enabled clients by the workflow-enabled provider based on determining that the workflow service specified by the first workflow-enabled client can be performed by the workflow-enabled provider;

activating, by the workflow-enabled provider, the first workflow-enabled client using the external identifier associated with the first workflow-enabled client;

displaying the first workflow-enabled client as being available at the workflow-enabled provider;

receiving user input at the workflow-enabled provider;

processing the user input at the workflow-enabled provider to perform the workflow service and to produce results as prescribed by the parameter; and notifying, by the workflow-enabled provider, the first workflow-enabled client to retrieve the results using the internal identifier associated with the first workflow-enabled client.

24. The method of claim 23 comprising downloading the first workflow-enabled client from a defined location and running the first workflow-enabled client on a first device.

25. The method of claim 23 wherein the displaying presents a user interface specific to the first workflow-enabled client that identifies a user and the first workflow-enabled client.

26. The method of claim 23 comprising filtering and aggregating information about the group of workflow-enabled clients that the workflow-enabled provider can service.

27. The method of claim 23 comprising sending the results from the workflow-enabled provider to the workflow manager.

28. The method of claim 23 comprising sending the results from the workflow manager to the first workflow-enabled client.

29. The method of claim 28 comprising performing additional processing on the results at the first workflow-enabled client.

30. The method of claim 16 comprising:

receiving authentication information at the workflow-enabled provider;

sending the authentication information to a workflow manager;

verifying the authentication information at the workflow manager; and sending a file for processing from the workflow manager to the workflow-enabled provider.

* * * * *